Jan. 26, 1954 W. J. ZENNER 2,667,533

AUTOMATIC MESSAGE SWITCHING SYSTEM

Filed May 10, 1950 25 Sheets-Sheet 1

INVENTOR
WALTER J. ZENNER
BY Emery Robinson
ATTORNEY

Jan. 26, 1954 W. J. ZENNER 2,667,533

AUTOMATIC MESSAGE SWITCHING SYSTEM

Filed May 10, 1950 25 Sheets-Sheet 2

INVENTOR
WALTER J. ZENNER
BY Emery Robinson
ATTORNEY

Jan. 26, 1954 W. J. ZENNER 2,667,533

AUTOMATIC MESSAGE SWITCHING SYSTEM

Filed May 10, 1950 25 Sheets-Sheet 3

INVENTOR
WALTER J. ZENNER
BY Emery Robinson
ATTORNEY

Jan. 26, 1954 W. J. ZENNER 2,667,533

AUTOMATIC MESSAGE SWITCHING SYSTEM

Filed May 10, 1950 25 Sheets-Sheet 4

INVENTOR
WALTER J. ZENNER
BY Emery Robinson
ATTORNEY

Jan. 26, 1954 W. J. ZENNER 2,667,533

AUTOMATIC MESSAGE SWITCHING SYSTEM

Filed May 10, 1950 25 Sheets-Sheet 5

INVENTOR
WALTER J. ZENNER
BY Emery Robinson
ATTORNEY

Jan. 26, 1954 W. J. ZENNER 2,667,533

AUTOMATIC MESSAGE SWITCHING SYSTEM

Filed May 10, 1950 25 Sheets-Sheet 6

INVENTOR
WALTER J. ZENNER
BY Emery Robinson
ATTORNEY

Jan. 26, 1954 W. J. ZENNER 2,667,533

AUTOMATIC MESSAGE SWITCHING SYSTEM

Filed May 10, 1950 25 Sheets-Sheet 7

INVENTOR
WALTER J. ZENNER
BY Emery Robinson
ATTORNEY

INVENTOR
WALTER J. ZENNER
BY Emery Robinson
ATTORNEY

INVENTOR
WALTER J. ZENNER
BY Emery Robinson
ATTORNEY

Jan. 26, 1954 W. J. ZENNER 2,667,533

AUTOMATIC MESSAGE SWITCHING SYSTEM

Filed May 10, 1950 25 Sheets-Sheet 10

INVENTOR
WALTER J. ZENNER
BY Emery Robinson
ATTORNEY

Jan. 26, 1954 W. J. ZENNER 2,667,533
AUTOMATIC MESSAGE SWITCHING SYSTEM
Filed May 10, 1950 25 Sheets-Sheet 11

INVENTOR
WALTER J. ZENNER
BY Emery Robinson
ATTORNEY

INVENTOR
WALTER J. ZENNER
BY Emery Robinson
ATTORNEY

Jan. 26, 1954 W. J. ZENNER 2,667,533

AUTOMATIC MESSAGE SWITCHING SYSTEM

Filed May 10, 1950 25 Sheets-Sheet 13

INVENTOR
WALTER J. ZENNER
BY Emery Robinson
ATTORNEY

Jan. 26, 1954 W. J. ZENNER 2,667,533

AUTOMATIC MESSAGE SWITCHING SYSTEM

Filed May 10, 1950 25 Sheets-Sheet 14

INVENTOR
WALTER J. ZENNER
BY Emery Robinson
ATTORNEY

Jan. 26, 1954 W. J. ZENNER 2,667,533

AUTOMATIC MESSAGE SWITCHING SYSTEM

Filed May 10, 1950 25 Sheets-Sheet 15

INVENTOR
WALTER J. ZENNER
BY Emery Robinson
ATTORNEY

INVENTOR
WALTER J. ZENNER
BY Emery Robinson
ATTORNEY

Jan. 26, 1954 W. J. ZENNER 2,667,533

AUTOMATIC MESSAGE SWITCHING SYSTEM

Filed May 10, 1950 25 Sheets-Sheet 17

INVENTOR
WALTER J. ZENNER
BY Emery Robinson
ATTORNEY

Jan. 26, 1954 W. J. ZENNER 2,667,533

AUTOMATIC MESSAGE SWITCHING SYSTEM

Filed May 10, 1950 25 Sheets-Sheet 18

INVENTOR
WALTER J. ZENNER
BY Emery Robinson
ATTORNEY

Jan. 26, 1954 W. J. ZENNER 2,667,533

AUTOMATIC MESSAGE SWITCHING SYSTEM

Filed May 10, 1950 25 Sheets-Sheet 19

INVENTOR
WALTER J. ZENNER
BY Emery Robinson
ATTORNEY

Jan. 26, 1954 W. J. ZENNER 2,667,533

AUTOMATIC MESSAGE SWITCHING SYSTEM

Filed May 10, 1950 25 Sheets-Sheet 20

INVENTOR
WALTER J. ZENNER
BY Emery Robinson
ATTORNEY

INVENTOR
WALTER J. ZENNER
BY Emery Robinson
ATTORNEY

Jan. 26, 1954 W. J. ZENNER 2,667,533

AUTOMATIC MESSAGE SWITCHING SYSTEM

Filed May 10, 1950 25 Sheets-Sheet 22

SYSTEM E

INVENTOR
WALTER J. ZENNER
BY Emery Robinson
ATTORNEY

AUTOMATIC MESSAGE SWITCHING SYSTEM

Filed May 10, 1950 25 Sheets-Sheet 23

INVENTOR
WALTER J. ZENNER
BY Emery Robinson
ATTORNEY

Jan. 26, 1954 W. J. ZENNER 2,667,533

AUTOMATIC MESSAGE SWITCHING SYSTEM

Filed May 10, 1950 25 Sheets-Sheet 24

SYSTEM G

INVENTOR
WALTER J. ZENNER
BY Emery Robinson
ATTORNEY

INVENTOR
WALTER J. ZENNER
BY Emery Robinson
ATTORNEY

Patented Jan. 26, 1954 2,667,533

UNITED STATES PATENT OFFICE 2,667,533

AUTOMATIC MESSAGE SWITCHING SYSTEM

Walter J. Zenner, Des Plaines, Ill., assignor to Teletype Corporation, Chicago, Ill., a corporation of Delaware Application May 10, 1950, Serial No. 161,165

47 Claims. (Cl. 178—2)

This invention relates to printing telegraphy and more particularly to automatic switching systems therefor.

The system is designed to accommodate a relatively large number of telegraph transmitting and receiving stations. The basic system described herein consists of a central office and ten lines having up to ten stations on each line. It is to be expressly understood, even though the basic system is described in this manner, that this is not to be construed in any way as a limitation on the system as it is contemplated that the principles disclosed by the invention will be used in systems either larger or smaller than the basic system herein described. It is further contemplated that the system may be used with either simplex or full duplex systems, or a mixture of both.

It is contemplated that each outlying station in the system is provided with a printing telegraph receiver, preferably of the type shown in the copending application of W. J. Zenner, Serial No. 22,653, filed April 22, 1948, now Patent No. 2,505,729, issued April 25, 1950, on the receiving side of the line, and on the transmitting side of the line, a local printing receiver of the type just mentioned, a keyboard transmitter of the type disclosed in the copending application of W. J. Zenner, Serial No. 95,964, filed May 28, 1949, now U. S. Patent No. 2,607,848, dated August 19, 1952, a perforating unit of any well known design, and a transmitter of the type shown in the patent to E. A. Gubisch, 2,348,214, which issued May 9, 1944. All of the printers on the receiving side of the line at the outlying stations are equipped with a selective control unit of the type shown in the copending application of W. J. Zenner, Serial No. 739,747, filed April 7, 1947, now U. S. Patent No. 2,568,264, dated September 18, 1951. For a more complete understanding of the telegraph equipment mentioned above, reference should be had to the above mentioned patents and copending applications for patents, all of which are hereby incorporated by reference into the present disclosure.

The central office is provided with a multiple reperforator transmitter and a transmitter controller associated with each outgoing line. These units are of such construction and design that they are capable of being housed in a single cabinet together with appropriate tape storage bins. It is therefore possible to package the apparatus at the central office, thus facilitating maintenance and increasing the efficiency of operation.

Switching systems in present day use ordinarily utilize a minimum number of standard telegraph machines loaded to maximum capacity and consequently the switching circuits become complex and involved. It is, therefore, an important object of the invention to provide a telegraph switching system which is greatly simplified as compared with systems currently in use.

In the present invention the incoming message from any of the outlying stations contains an address signal corresponding to the station in the system to which the message is to be delivered. This address signal actuates a series of code bars in the multiple reperforator transmitter to cause the reperforator, associated with the line on which is located the station to which the message is addressed, to reperforate this message in a tape. Upon the completion of the message, an end-of-message signal causes the code bars in the multiple reperforator transmitter to return to a condition whereby they can respond to a subsequent message from an outlying station. Therefore, it is possible to sort all messages from a single line in accordance with the lines to which the messages are addressed, such sorting being accomplished before the body of the message is received. A feature of the invention is the timing, which permits the character that controls the sorting to be retained in the reperforated message tape.

The multiple reperforator transmitter has a transmitter associated with each individual reperforator therein. Each of these transmitters has an operate magnet associated therewith, which when energized, operably connects the corresponding transmitter to an oscillating bail to cause the transmitter to transmit the message previously reperforated in the tape by the corresponding reperforator. The operate magnets are controlled by the transmitter controller associated with the line to which the message is addressed.

The message transmitted by the transmitter in the multiple reperforator transmitter commences with the address signal which was originally included in the message when it was transmitted by the outlying transmitting station. The address signal then causes the code bars to be actuated in each receiving printer on the line to which the message is addressed. Each of these receiving printers, as has already been stated, is equipped with a selective control unit, and these mechanisms function in a manner whereby the printing mechanisms of each of the printers are locked out of operation. Immediately thereafter the address impulses actuate the selective control mechanism to condition for operation the printer at the station to which the message is addressed. Subsequent signals of the message continue to actuate the code bars in all of the stations on the receiving line, however, the printing mechanism operates only at the station which has been conditioned for operation by the address signal, and the printing mechanism at all the other stations remains locked out.

The transmitter controller associated with each line of the system controls the transmission from all the transmitters at the outlying stations on the line. The selective control unit at all of the outlying receivers has a special function mechanism which enables the transmitter controller to control the outlying transmitters. Whenever a message is transmitted from an outlying station, such message is concluded with an end-of-message signal in response to which the transmitter controller performs a switching sequence. Upon initiation of such a switching sequence a message being currently transmitted to an outlying receiver is interrupted, a special mechanism in the transmitter controller "remembering" whether the last signal transmitted of such interrupted massage was an upper or lower case signal. The transmitter controller then transmits automatically a special sequence of signals which conditions all of the receivers for a switching operation. Immediately thereafter an address sequence switch in the transmitter controller transmits sequentially address signals corresponding to the stations on the line. If the station transmitter has a message ready for transmission when the address corresponding to that station is transmitted by the address sequence switch, then a circuit is completed at the outlying station from the receiver to the transmitter, to cause the transmitter to transmit the message. If the station transmitter does not have a message ready for transmission when the address corresponding to that station is transmitted by the address sequence switch, then another circuit is established between the receiver and the transmitter to cause the transmitter to send a signal indicative of the fact that there is no message in the transmitter. In response to this latter signal from the outlying station transmitter the address sequence switch functions to transmit the next address in sequence. Each time that the address sequence switch is advanced a step in order to transmit an address signal, a round counter sequence switch is also advanced a step. When the addresses corresponding to all of the stations on the line have been transmitted with negative responses from each station, indicating that none of the outlying transmitters have a message ready for transmission, the round counter sequence switch causes the switching sequence to be completed to thereby permit resumption of transmission of the message which was previously interrupted. The round counter sequence switch at this time also causes a circuit to be completed to a recycle timer sequence switch, which after a predetermined interval of time, of the order of two to five minutes, initiates another switching operation. The switching operation initiated by the recycle timer sequence switch is identical with the switching operation initiated by an end-of-message signal in the message being transmitted by one of the outlying stations.

The transmitter controller also controls the operate magnets of all the transmitters of the multiple transmitters which are adapted to transmit messages over the line with which the transmitter controller is associated. Control of these transmitters is accomplished by means of a multiple transmitter switching unit, one of which is located in each of the transmitter controllers. A set of code bars in the transmitter controller responds to all signals transmitted out over its associated line, and in response to an end-of-message signal in a message transmitted to an outlying station on the line there is a circuit completed which initiates operation of the multiple transmitter switching unit. The multiple transmitter switching unit responds by conditioning a circuit to the operate magnet of another transmitter and to de-energize the operate magnet of the transmitter transmitting the immediately preceding message. If the transmitter, whose operate magnet has just been conditioned, has a message ready for transmission, such operate magnet is energized and the message is transmitted. If, however, this transmitter does not have a message ready for transmission a second operate magnet is conditioned in order to test another transmitter. All of the transmitters adapted to transmit messages over any particular outgoing line are sequentially tested in this manner to thereby permit them to transmit sequentially their stored messages.

By this invention there is provided numerous special features designed to facilitate the efficient operation of the system. One of these features is an extra reperforator corresponding transmitter in the multiple reperforator transmitter unit which functions to intercept all improperly addressed messages. Therefore, no message from an outlying station can be lost. This intercept reperforator, as it is called for convenience, is operable at all times that none of the other reperforators are operating. To render the intercept reperforator inoperable it is necessary that one of the other reperforators be selected for operation. When such other reperforator is selected, and only then, the intercept reperforator is inoperable.

Another feature of the invention provides for priority and deferred message service. This is accomplished by means of extra reperforators and transmitters in the multiple reperforator transmitter unit. Deferred or priority messages are addressed by a special signal preceding the normal station address, and this special signal actuates the multiple reperforator transmitter whereby the priority or deferred message reperforator is selected instead of the normal reperforator. The transmitter controller is constructed so as to test the priority transmitters for the presence of messages therein awaiting transmission after the transmission of each message before any normal transmitter is permitted to function. Similarly all normal transmitters are tested before any of the deferred message transmitters are tested.

Another feature of the invention is the provision of means for accomplishing group and broadcast transmission. For enabling this desirable function of the system the selective control unit in each outlying receiving printer is provided with means responsive to group or broadcast address signals for conditioning the receivers to print the subsequent message. Each reperforator of the multiple reperforators is also similarly provided with means responsive to group or broadcast signals for conditioning the reperforators to reperforate the subsequent message.

An additional feature of the invention is the provision of a line monitor. Whenever the transmitter controller sends a signal to start an outlying transmitter, a response is received at the transmitter controller from the called station.

The outlying transmitter functions to send either its message if it has one ready or a signal indicative of the fact that there is no message ready for transmission. In order for the transmitter at the outlying station to respond in this manner, the delivery side of the line to the outlying station, the receiver and transmitter at the outlying station, and the pickup side of the line from the outlying transmitter to the central office all must be functioning properly. In the event that the station does not respond to its call, a failure has occurred. To bring such failure to the attention of the operator an alarm circuit is established when the outlying station is tested which initiates a timer mechanism. When the station responds with either a message or a signal indicating it has no message ready for transmission, this stops and recycles the timer to prepare it for the next testing operation. If the station response is not received by the transmitter controller, the timer completes its cycle, closes a contact, and operates an alarm to notify the attendant.

A further desirable feature of the invention is the provision of a message delivery time inserter. When transmission of a message is completed from one of the transmitters to the delivery side of the line, the transmitter controller tests the other transmitters sequentially until it finds one with a message awaiting transmission. The message delivery time inserter prevents the immediate actuation of the awaiting transmitter and permits time characters to be transmitted as picked up from a master clock, after which the message is transmitted.

An alarm is provided for indicating when the supply of tape is running out in any of the positions in the multiple reperforator. It then becomes necessary for the attendant to insert a new roll of tape, and in order to insure that part of the incoming signals will not be lost, it is necessary to stop temporarily the message pickup from the outlying transmitters. This is accomplished by means of a manually operated switch by means of which no further selection of outlying transmitters is made until the switch is restored.

Tight-tape alarms for each transmitter of the multiple reperforator transmitter are provided for indicating when a transmitter circuit is being held up because of slow incoming traffic.

The outlying station transmitters are expected to cease transmitting after an end-of-message signal is sent. A line relay in the central office is provided for checking the line for incoming signals following such end-of-message signal and is connected to the transmitter controller in a manner so that the next address call is not initiated until incoming signals actually cease. Therefore, the simultaneous operation of two outlying station transmitters is effectively prevented.

Means are also provided for controlling the outlying station motors. Each station is provided with a timer which releases a power relay if no signals are received for a predetermined period. Normally, the transmitter controller tests all stations for ready traffic every few minutes, and this keeps all stations operating as long as the central office operates. When the central office is shut down this results in the release of the above mentioned power relay at all stations which in turn breaks the motor circuits at the outlying stations.

A further feature of the invention is the flexibility it offers in that it is readily adaptable to a multiple central office system. For enabling such adaptation there is added to the normal central office equipment, a transmitter controller and a multiple reperforator transmitter for each trunk line. The multiple reperforator transmitter associated with the basic system also includes units controlled by such additional transmitter controllers.

The general object of the invention is to provide a comprehensive telegraph switching system wherein switching operations are expedited by an economical and efficient switching system which functions automatically.

Automatic telegraph switching systems in use generally at the present time employ telephone switching methods which become highly complex and accordingly it is an important object of the present invention to materially simplify the electrical circuits utilized therein.

Another object of the invention is to utilize apparatus units designed to accomplish specific purposes thereby eliminating to a large degree the troubles caused by circuit complexity.

The basic units included in the present system are designed so as to lend themselves to "packaging" of the equipment. By thus "packaging" various ones of the units involved in the system, basic installation of the equipment is facilitated, operations in the stations and central office are rendered more efficient and maintenance of the equipment is facilitated. It is a further object of the invention to combine the basic units so as to form a simple system, and to then combine the simple systems into a larger system for handling the more extensive traffic problems.

Another object of the present invention is to provide a transmitter controller suitable for location at a central office which is adapted to control transmission of all traffic to and from a telegraph line associated therewith.

A further object of the invention is to provide a multiple reperforator transmitter having means for selecting one or more of the reperforators therein to reperforate a message transmitted to the multiple reperforator transmitter.

A more specific object is to provide a multiple reperforator transmitter having means therein responsive to an address signal of an incoming message for selecting one or more of the reperforators to receive such incoming message.

A further object of the invention is to provide a multiple reperforator transmitter having an extra code bar movable in response to a first signal to permit the selection of one or more of the reperforators and movable in response to a second signal to retain the selection of the reperforators.

Another object is to provide a multiple reperforator transmitter having an extra reperforator which functions to receive all improperly addressed messages.

Another object of the invention is to provide a multiple reperforator transmitter wherein an intercept reperforator is invariably selected upon failure of selection of any other of the reperforators.

Another object of the invention is to provide a multiple reperforator transmitter wherein the transmitters thereof transmit their stored messages only when they are selected by a selecting mechanism in a transmitter controller.

A further object of the invention is to provide a multiple reperforator transmitter wherein each transmitter has an operate magnet which, when energized, causes the transmitter to be coupled with a source of power to thereby cause the transmitter to transmit a stored message.

Another object of the invention is to provide a transmitter controller having a transmitter distributor mechanism which receives and retransmit signals received from a transmitter and also senses all signals retransmitted.

Another object of the invention is to provide a transmitter controller which is designed to test sequentially a plurality of outlying stations associated therewith for determining whether or not the outlying stations have messages awaiting transmission. In connection with this object of the invention it is a further object to enable those stations, having messages awaiting transmission, to transmit the awaiting messages. And still another object in this connection is to automatically monitor the circuits between the transmitter controller and the outlying stations.

A further object of the invention is to interrupt a message being transmitted to an outlying station in order to sequentially test the outlying stations for messages awaiting transmission.

It is another object of the invention to provide means for remembering the condition (shift or unshift) of the outlying receivers when a message is interrupted in order to sequentially test the outlying stations for messages awaiting transmission.

Another object of the invention is to restore the outlying receivers to the condition in which they were found, when interrupted, after the sequential testing or switching operation is completed.

Another object of the invention is to provide a transmitter controller having a plurality of sequence switches for controlling all transmission to or from an associated telegraph line.

A further object of the invention is to provide an end-of-message sequence switch for automatically transmitting a special signal when an outgoing message is interrupted for conditioning all outlying receivers for the testing or switching operation.

Another object is to provide an address sequence switch to transmit address signals over the outgoing line in order to call or test the outlying station transmitters sequentially for messages awaiting transmission.

Another object is to provide a round counter sequence switch for insuring that the address sequence switch will call each outlying station but once when there are no messages thereat awaiting transmission.

A further object is to provide a recycle timer sequence switch, operable when the round counter sequence switch has determined that all outlying stations have been called and found to have no message awaiting transmission, for initiating another round of calls to the outlying stations after a predetermined interval of time.

Another object of the invention is to provide a multiple transmitter sequence switch in the transmitter controller for sequentially calling all transmitters adapted to transmit messages to the outgoing line with which the transmitter controller is associated.

A further object of the invention is to provide a transmitter controller wherein a transmitter start sequence switch is responsive to an end-of-message signal in an incoming message from an outlying station transmitter for initiating automatically the sequential calling of all the rest of the outlying stations associated with such transmitter controller.

Another object of the invention is to provide a transmitter controller wherein a transmitter start sequence switch is responsive to an end-of-message signal in an incoming message from an outlying station transmitter for initiating the automatic operation of the end-of-message sequence switch, the address sequence switch, the round counter sequence switch, and the recycle timer sequence switch.

There are numerous advantages offered by this invention, among which are the following:

Central office drag is shortened due to the fact that all incoming messages are immediately reperforated in tapes containing messages for a single outgoing line instead of all incoming messages being stored in a single tape.

Multiple address messages and broadcast messages can be readily handled in an economical, efficient, and fully automatic manner.

The basic system can be very readily changed in accordance with the invention to provide for as many classes of priority or deferred message service as are desired.

Because switching is done immediately upon receipt of the message, no central office switching gear is needed, as is required in telegraph switching systems in use at the present time.

All central office apparatus operates at the same speed as the line apparatus, no increased cross office speed being necessary.

Messages are normally recorded in perforated tape form only once.

The basic system can very readily be expanded from single office to multiple office systems while the basic apparatus package remains substantially unchanged.

Another object of the invention is to provide for a line monitor which is simple and automatic in operation.

A further object is to provide a telegraph system having a message delivery time inserter.

A still further object is to provide a telegraph system for handling automatically, normal, priority, and deferred traffic.

The foregoing and other objects, features and advantages of the invention will be more readily understood from the following detailed description when read in conjunction with the accompanying drawings wherein.

Figures 1, 2:
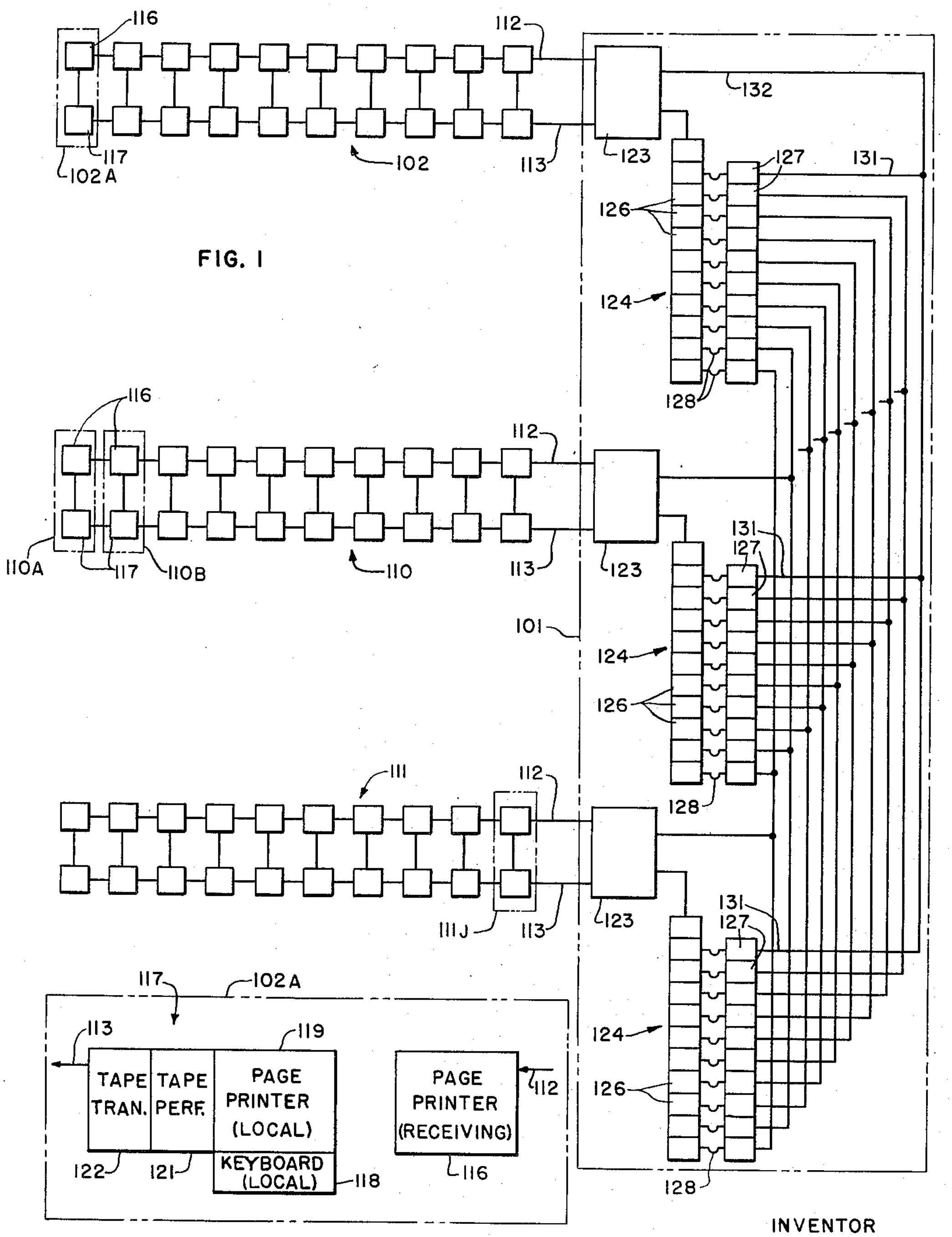
Fig. 1 is a schematic representation of the basic system forming the subject matter of the present invention.
Fig. 2 is a block diagram representing the telegraph apparatus at an outlying station as contemplated by the invention.

Referring now to Fig. 1 of the drawings, the basic telegraph switching system forming the subject matter of the invention is therein shown. Reference numeral 101 represents a central office having a plurality of lines 102 through 111 associated therewith, all of which broadly forms the basic switching system of the invention. Each of the lines 102 through 111 has a message delivery side 112 and a message pickup side 113. The lines are represented as duplex channels; however, it is fully within the realm of the invention to utilize simplex lines instead, or a mixture of simplex and duplex.

Each of the lines 102 through 111 has a plurality of outlying stations, a few of which are represented schematically in Fig. 1 by reference numerals 102A, 110A, 110B, 111J. Fig. 2 represents a schematic block diagram of any one of these outlying stations and for the sake of convenience will be considered as outlying station 102A. Each of the outlying stations has a printing telegraph receiver 116 in circuit with the delivery side 112 of the line. On the pickup side of the line each outlying station is equipped with telegraph sending apparatus 117 consisting of a keyboard 118, a page printer 119, a tape perforator 121, and a tape transmitter 122. An operator at the outlying station types out the message by means of the keyboard 118 and the tape perforator 121 perforates this message in a tape. The operator undoubtedly will desire to have a printed record of the message as it is being perforated, and for this purpose the page printer 119 may be used. Having completed perforating the message in the tape, the operator places the leading end of the tape in the tape transmitter 122 to await transmission. When the message in the tape is transmitted it is contemplated that a home record thereof will be made by the page printer 119.

The central office 101 is equipped with a plurality of transmitter controllers 123, one of which is provided for each of the lines 102 through 111 of the system. Also associated with each line is a multiple reperforator transmitter 124. The multiple reperforator transmitter 124 is provided with a plurality of individual reperforators 126, each of which has a transmitter 127 associated therewith for transmitting the messages perforated in the tape by the corresponding reperforator.

The transmitter controller 123, one of which is provided for each line of the system, controls all transmission to or from its associated line. The transmitter controller 123 is designed to sequentially call each outlying station on the line with which it is associated, and in response to this call the station responds by transmitting its message if it has one awaiting transmission, and if there is no message awaitng transmission the station responds by sending a blank signal. Obviously it is not to be construed as a limitation that a blank signal is transmitted at this time, for it is entirely within the invention and contemplated thereby that any other signal could be used for indicating that the outlying station transmitter 117 has no message awaiting transmission. When such a signal, indicating the absence of an awaiting message, is transmitted the transmitter controller 123 calls the next station in sequence.

When the outlying station transmitter 117 responds by sending an awaiting message, the first few signals of such message contain a set of address signals. One of these signals indicates the line and another indicates the station on that line to which the message is addressed. To signal indicating the line to which the message is addressed causes the reperforator 126 which is adapted to reperforate messages addressed to that line to reperforate such message in the form of a tape 128. The transmitter controller 123 associated with the line to which the message is to be transmitted sequentially establishes activating circuits to each transmitter adapted to transmit messages to that line.

At this point it should be noted that the transmitter controller 123 associated with the line 102 controls the uppermost transmitters 127 in Fig. 1 and the transmitter controller 123 associated with the line 111 controls the lowermost transmitters 127. Leads 131 from the uppermost transmitter 127 of each multiple reperforator transmitter 124 are connected to a lead 132 extending to the transmitter controller 123 associated with line 102. Similarly the rest of the transmitters 127 are connected to the proper transmitter controller 123. The leads 131 and 132 connecting the transmitters 127 with the transmitter controllers 123 are not single leads but are merely schematic representations of all of the leads between the transmitters 127 and the transmitter controllers 123.

The activating circuits for the various transmitters 127 extend over the leads 132 and 131. When one of the transmitters 127 is thus activated it transmits its message if it has one ready and if it does not have a message ready to be transmitted the next transmitter 127 in sequence is activated. As has been stated heretofore all messages stored in the multiple reperforator transmitters 124 include an address signal at the beginning thereof which indicates the station on the line to which the message is being sent. This address signal, when received by all the stations on the line to which the message is being sent, causes mechanism in all the stations to function which operates to permit the printer 116 at the station to which the message is addressed to print the message and prevents all other station receiving printers 116 from printing the message. Mechanism in the transmitter controller 123 senses the message and in response to an end-of-message signal therein activates the next transmitter 127 in sequence.

*Basic function mechanism*

Figure 3:
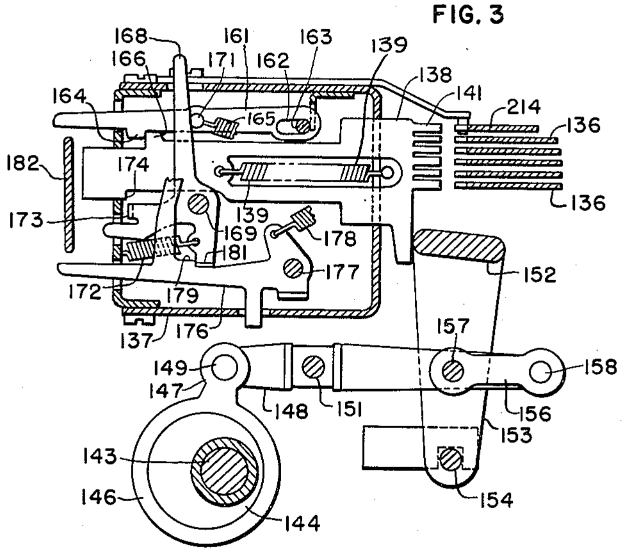
Fig. 3 is a side elevational view, partly in section, of a selective control unit.

Referring now to Fig. 3, a description follows of the basic function mechanism located in the receiving page printers 116 at all outlying stations, in all multiple reperforator transmitters 126 and in all transmitter controllers 123. For a more thorough description of the printer with which the basic function mechanism shown in Fig. 3 is designed to be used, reference should be had to the aforementioned Patent No. 2,505,729, the disclosure of which has been incorporated herein by reference.

A set of five code bars 136 is suitably mounted within the receiver 116, multiple reperforator transmitter 126, or transmitter controller 123. Each of the code bars 136 is movable longitudinally to one of two positions in accordance with the marking and spacing impulses of the well known Baudot code. A housing 137 for the function mechanism is also mounted suitably within the printer or other apparatus within which it is contained. A plurality of function bars 138 are mounted within the housing 137 and are urged to the right towards the code bars 136 by means of springs 139 individual to each function bar 138. Each function bar 138 has a plurality of projections 141 which cooperate with notches 142 in each of the code bars.

A continuously rotating power shaft 143 carries an eccentric cam 144. A collar 146 is mounted rotatably on the eccentric 144 and has an arm 147 to which a lever 148 is secured pivotally at 149. The lever 148 is mounted pivotally on a stationary shaft 151. A bail 152 has a pair of arms 153 which are mounted pivotally on a stationary shaft 154. A pair of toggle links 156 are secured pivotally at 157 to the arms 153, and are secured at the other ends thereof to a shaft 158 to which the lever 148 is also secured. As the shaft 143 rotates, the lever 148 is oscillated about the shaft 151 to thereby, through the toggle links 156, oscillate the bail 152. It will be noted that the bail 152 moves back and forth twice during each revolution of the shaft 143.

A function pawl 161 has an elongated slot 162 by means of which the function pawl 161 is mounted for longitudinal movement on a shaft 163. A spring 165 continuously urges the function pawl 161 to the right (Fig. 3) and counterclockwise about the shaft 163. The function pawl 161 has a latch 164 which cooperates with a shoulder 166 on the function bar 138. Normally the latch 164 rides on the top of the shoulder 166 thereby permitting the spring 165 to retain the function pawl in its right hand position. A function operating lever 168 is mounted pivotally on a shaft 169 and cooperates with a stud 171 on the function pawl 161. The function operating lever 168 is biased in a clockwise direction by a spring 172 and has a latch 173 which cooperates with a shoulder 174 on another one of the function bars 138. A latch member 176 is mounted pivotally on a shaft 177 and is urged continuously in a clockwise direction by a spring 178. The latch member 176 has a projecting portion 179 which cooperates with a shoulder 181 on another of the function operating levers 168.

Assuming that the permutation of positions of the code bars has been set up which corresponds to the function bar 138, the bail 152 moves to the right and all of the projections 141 are opposite notches 142. The spring 139 is thereby permitted to move the function bar 138 to the right, the projections 141 entering the notches 142, and the shoulder 166 underriding the latch 164. Thereafter as the bail 152 moves back to the left during its return stroke it moves the function bar 138 also, the function bar 138 in turn moving the function pawl 161 to the left. As the function pawl 161 moves to the left in this manner the stud 171 thereon engages and pivots the function operating lever 168 counterclockwise. This permits the unblocking of any other function bars 138 retained in blocked position by the latch 173. The bail 152 remains in its leftward position, thereby retaining the function pawl 161 in its leftward position, and retaining in turn, the function operating lever 168 in its unlatched position until after a bail 182 moves downwardly to trip the latch member 176. After the bail 182 returns to the position thereof shown in Fig. 3, the projecting portion 179 on the latch 176 engages the shoulder 181 on the function operating lever 168 to retain the function operating lever 168 in unblocking position. Thereafter as a new selection is being made in the code bars 136 the bail 182 moves upwardly to strip the function pawls 161 from latching engagement with their corresponding function bars 138.

Figure 4:
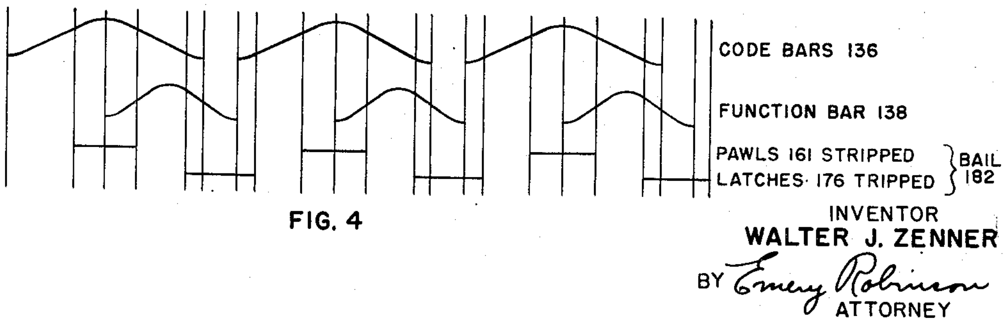
Fig. 4 is a timing diagram for the selective control unit.

Fig. 4 is a timing diagram showing the timing of the various parts in the function mechanism shown in Fig. 3. The upper row of curves represents the code bars 136 which are being positioned in accordance with signal impulses during the rise in the first curve, and remain set in this position until they are repositioned as indicated by the rising portion of the second curve. As indicated by the third set of curves, the bail 182 strips the function pawls 161 from engagement with their corresponding function bars 138 just as the code bars 136 are selected. This stripping of the function pawls 161 just as the code bars 136 are selected means that the last previous selection of one of the function pawls 161 is retained until the last possible moment. The function bars 138, indicated by the second row of curves, move forward during the rise of these curves, that is, they move to selected position at this time. The one of the function bars 138, which corresponds to the permutation of positions of the code bars 136, moves to the right until the projections 141 thereon enter the notches 142, as indicated by the peaks in the second row of curves. The bail 152 pushes the function bars 138 to the left as indicated by the fall in the second row of curves. As the function bars 138 and selected function pawls 161 are being moved to the left the bail 182 trips the latches 176 and retains them in tripped condition, as indicated in Fig. 4, until slightly after the pawls 161 and function bars 138 are moved completely to the left. The selected function pawls 161 remain in their leftward position until the bail 152 moves to the right again which is after the next selection of the code bars 136. Therefore, the stud 171 retains the function operating lever 168 in unblocking position while the latch 176 is being held tripped and when the latch 176 returns to normal position it retains the function operating lever 168 in unblocking position. If the next subsequent permutation of the code bars 136 corresponds to the function bar 138 which has been unblocked, such function bar 138 is permitted to become selected so that it can perform its assigned function. If the next subsequent permutation of the code bars 136 does not correspond to the unblocked function bar 138, then as the bail 182 trips the latch 176, such unblocked function bar 138 again becomes blocked.

It is, therefore, readily seen that the selective control mechanism shown generally in Fig. 3 enables the selection of a certain function bar 138 only if such function bar is unblocked due to the immediately previous selection of another function bar 138. This principle is readily extended so that the selection of a first function bar 138 unblocks a second function bar; the selection of the unblocked second function bar unblocks a third function bar, etc. This progressive selection can be extended further and is limited only by the number of function bars in the selective control unit. It is also apparent that the progressive selection stops and the entire unit is returned to normal condition as soon as a selection is set up in the code bars 136 which does not correspond to the unblocked function bar 138. This is due to the tripping of all latches 176 by the bail 182 during each cycle. If, when the latches 176 are tripped, there are no function pawls 161 in selected position, there will be no stud 171 in a position to retain the function operating lever 168 in unblocked position during the tripping of the latches 176.

*Station selector function mechanism*

Reference should now be made to Figs. 5–11 inclusive wherein the mechanism for selecting the outlying station receivers is shown. In this connection it should be noted that certain convenient signals have been assigned, in response to which the function mechanism performs the desired switching functions. The switching signals which have been assigned in the present description have been selected with a view towards eliminating as many errors as possible which would occur, for example, if the same signals happened to be sequentially transmitted within the body of a message being transmitted. In such a case a switching sequence would be initiated and it is desirable to avoid this condition. It is to be understood however, that the particular signals chosen for switching functions have been chosen arbitrarily and it is contemplated that any other signals could just as readily be used. In this description therefore: Fig.–Fig. is the start-of-address signal, Letters is the end-of-address signal, and Fig.–Fig.–Y is the end-of-message signal. In the basic system described herein the station addresses are two-letter addresses, the first letter representing the line and the second letter representing the station on the line. The letters indicating the lines include letters from A through J, and those indicating the stations on the lines include the letters K through T. By using this selection of letters there is no problem presented in the case of multiple address messages due to the unblocking of a function bar on the second letter of one address and the selection of a station on the first letter of an immediately following address. If however, it is desired to have more than ten stations on one line or more than ten lines in the system it is only necessary to insert a signal, such as a blank, to break up any progression started by the second address letter. The last six letters of the alphabet have been reserved for switching functions according to the present disclosure; however, any other letters can be assigned for the switching functions when so desired.

Figure 5B:
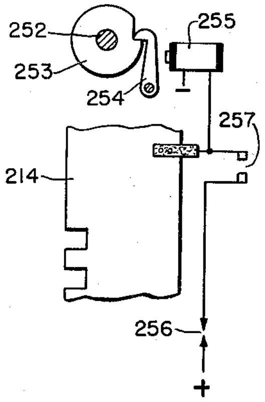
Fig. 5B is a schematic representation of the mechanism in a station printer for suppressing printing during a switching operation.
Figure 5:
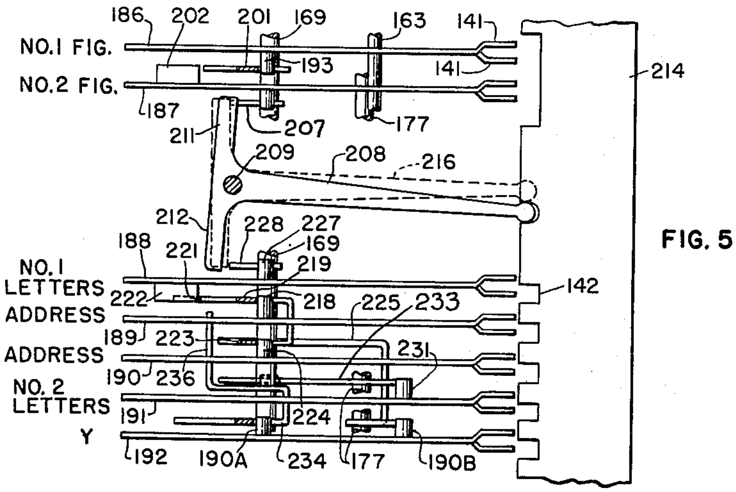
Fig. 5 is a fragmentary plan view of the selective control unit located in the outlying station telegraph receivers.
Figure 8:
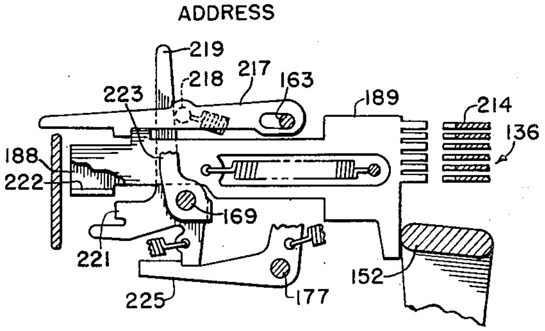

Referring to Figs. 5–11, a No. 1 Fig. function bar 186, a No. 2 Fig. function bar 187, a No. 1 Letters function bar 188, an Address function bar 189, a second Address function bar 190, a No. 2 Letters function bar 191, and a Y function bar 192 are provided in the positions thereof as shown in Fig. 5 in the outlying station selective control units. It is to be noted that two Address function bars 189 and 190 are shown in Fig. 5 whereas only the Address function bar 189 is shown in Fig. 8. In order to avoid complicating the drawings and description only the two separately acting Address positions are shown. It is understood, however, that in actual practice the one Address position, as represented by the Address function bar 189, may comprise a pair of progressively acting Address function bars. Similarly, in the second Address position, represented by the Address function bar 190, there may also be a pair of progressively acting Address function bars. This second Address mechanism, represented by the Address function bar 190, is designed to operate in response to a group or broadcast signal to thereby render the telegraph apparatus responsive to a group or broadcast message.

Figures 6, 7:
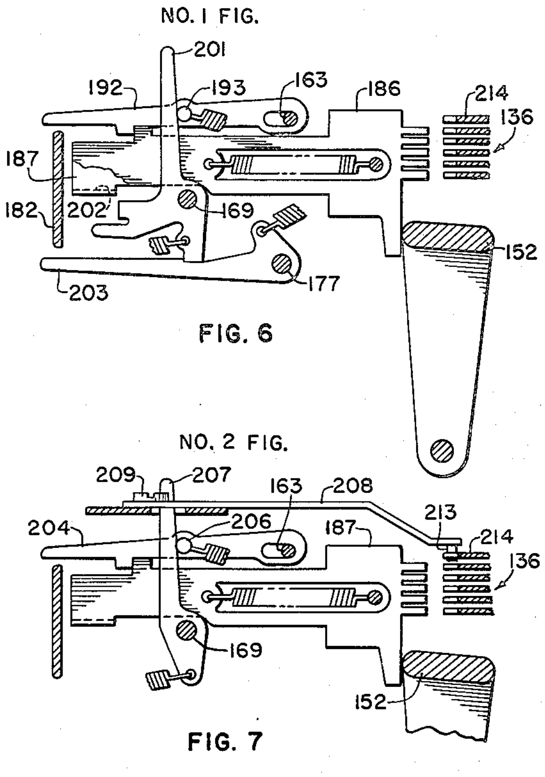
Figs. 6–11 are side elevational views of the station selector function mechanism of the selective control unit.
Figure 9:
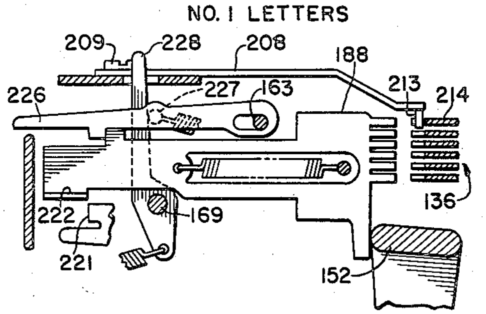
Figure 10:
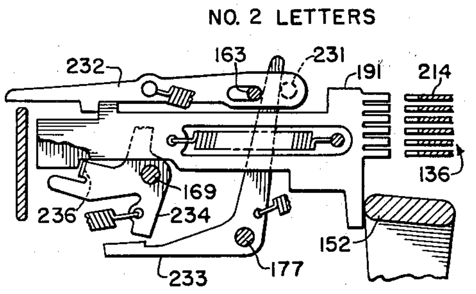

The No. 1 Fig. function bar 186 (as shown in Fig. 6) has the usual cooperating No. 1 Fig. function pawl 192 to which is secured a stud 193. When the No. 1 Fig. function bar 186 is selected in response to the Figures permutation of the code bars 136 the pawl 192 is moved to the left as the bail 152 returns and during such movement the stud 193 pivots a No. 1 Fig. function operating lever 201 counterclockwise to unblock a bent over portion 202 on the No. 2 Fig. function bar 187. When the bail 182 subsequently is raised to the normal position thereof a latch 203 retains the No. 1 Fig. function operating lever 201 in its unblocking position.

If the next permutation of the code bars 136 is a Figures permutation both the No. 1 and No. 2 Fig. function bars 186 and 187 (Figs. 6 and 7) are selected. At this time the selection of the No. 1 Fig. function bar 186 is immaterial, but as the bail 152 returns to the left a No. 2 Fig. function pawl 204 is returned to the left with the No.

2 Fig. function bar. A stud 206 on the No. 2 Fig. function pawl 204 engages and pivots a No. 2 Fig. operating lever 207 counterclockwise (Fig. 7).

A T-lever 208 (Fig. 5) is suitably mounted for pivotal movement on a bolt 209 and has a pair of arms 211 and 212. The T-lever 208 has a pin 213 which cooperates with a printer suppressor code bar 214. When the T-lever 208 is in the solid line position as shown in Fig. 5, the printer, with which the selective control unit is associated, is in printing condition and all of the switching function bars 188, 189, 190, 191, and 192 are blocked due to the fact that notches 142 in the printer suppressor code bar 214 are not aligned with the projections 141 on the switching function bars. When the T-lever 208 is in the dotted line position 216 (Fig. 5) the notches 142 in the printer suppressor code bar 214 are aligned with the projections 141 on the switching function bars. Under this condition the switching function bars 188–192 are selected in response to the corresponding permutations of the code bars 136.

Fig. 5B shows schematically how the movement of the printer suppressor code bar or switching code bar 214 to switching position (the position occupied by the code bar 214 when the T-lever 208 assumes its dotted position 216) suppresses printing operations in the telegraph printer. A continuously rotating shaft 252 supplies the necessary power for the printing operations through a start-stop clutch 253. Normally the clutch 253 is held stationary by a clutch lever 254, but upon the momentary energization of a clutch operating magnet 255, it pulls the clutch lever 254 from engagement with the clutch 253 thereby releasing the clutch 253 for rotation with the power shaft 252. Normally the energizing circuit for the clutch operating magnet 255 extends from positive battery through a contact pair 256, through the clutch operating magnet 255, to negative battery, so that upon closure of the contact pair 256, which occurs after the code bars have been set for a particular character permutation, the clutch 253 is released. Another contact pair 257 has been included in the clutch operating magnet circuit, the movable member of which contact pair 257 is carried by the printer suppressor code bar 214. When the printer suppressor code bar 214 occupies its switching position (as shown in Fig. 5B) the contact pair 257 is open and thus the further opening and closing of the contact pair 256 is ineffective to energize the clutch magnet 255 and thereby permit a printing cycle. However, when the code bar 214 occupies its printing position the contact pair 257 is closed and the contact pair 256 functions in its normal manner to start the clutch 253 and enable the performance of printing operations. The switching code bar 214 may also carry blocking wards to suppress printer functions such as line feed and carriage return.

When the bail 152 returns the No. 2 Fig. function bar 187 and pawl 204, the No. 2 Fig. operating lever 207, pivoted therewith, engages the arm 211 on the T-lever 208 to move the printer suppressor code bar 214 into the position where printing is blocked and switching is permitted. This position of the printer suppressor code bar 214 is hereinafter referred to as its switching position as distinguished from its printing position.

When the printer suppressor code bar 214 is thus moved to switching position the selective control mechanism is in condition to respond to address signals. The Address function bar 189 (Fig. 8) has a cooperating function pawl 217 which carries the usual stud 218. Upon movement of the stud 218 to the left (Fig. 8) an Address function operating lever 219 is pivoted counterclockwise about the pivot shaft 169 whereby a latch 221 unblocks a bent over portion 222 on the No. 1 Letters function bar 188. The Address function operating lever 219 is U-shaped (shown best in Fig. 5) and has a second upstanding arm 223 with which a stud 224 on an Address function bar 190 cooperates. Having been unblocked due to the selection of one of the Address function bars 189 and 190, the No. 1 Letters function bar 188 remains in unblocked condition because the Address function operating lever 219 is held in unblocking position by a latch member 225. It is, therefore, apparent, when the printer suppressor code bar 214 is in switching position with its notches 142 aligned with the projections 141 on the switching function bars 188–192, that permutation of the code bars 136 corresponding to either of the Address function bars 189 or 190 enables unblocking of the No. 1 Letters function bar 188.

Assuming that one of the Address function bars 189 or 190 has been selected, the next permutation of the code bars 136 in the switching sequence of signals is a Letters permuation or an end of address signal. In response to a Letters signal, the No. 1 Letters function bar 188 (Fig. 9), having been unblocked, becomes selected. On the return stroke of the bail 152 the No. 1 Letters function bar 188 in turn moves a cooperating No. 1 Letters function pawl 226 having a stud 227 thereon. As the stud 227 is moved in this manner it pivots a No. 1 Letters function operating lever 228 counterclockwise (Fig. 9) which in turn pivots the T-lever 208 clockwise (Fig. 5) to thereby move the printer suppressor code bar 214 to printing position. It is readily apparent unless and Address signal, corresponding to the address of the particular station, is received that the No. 1 Letters function bar cannot be selected whereby the printer suppressor code bar 214 is not moved to printing position but remains in switching position.

Also in response to a Letters permutation of the code bars 136, the No. 2 Letters function bar 191 (Fig. 10) is selected invariably. As the No. 2 Letters function bar 191 is moved to the left by the bail 152, a stud 231 on a corresponding No. 2 Letters function pawl 232 engages and pivots counterclockwise a latching member 233 to release a blocking pawl 234. The blocking pawl 234 has an arm 236 which cooperates with shoulders on each of the Address function bars 189 and 190 to block them from being selected. The combined effect of both Letters function bars 188 and 191 is to return the printer suppressor code bar 214 to printing position only at the stations where one or the other of the Address function bars 189 and 190 have been selected, the No. 1 Letters function bar 188 causing movement of the printer suppressor code bar 214 and the No. 2 Letters function bar 191 causing blocking of further selection of any Address function bars. Therefore, at this time each station receiving printer 116 on the line is either selected for receiving the message to follow or blocked from receiving the message following.

Following the transmission of the end-of-address signal the text of the message is transmitted. Since only those printers whose address has been transmitted are in printing condition, it is only those printers which print the message. The code bars 136 in all receivers are actuated in response to the text signals but because the printer suppressor code bar 214 in all non-selected stations is in switching position, printing by these receivers is blocked. Upon completion of the text of the message an end of message sequence of signals, Fig.–Fig.–Y, is normally transmitted. It is necessary that Fig.–Fig. be transmitted at this time in order to return to switching position the printer suppressor code bar 214 at the selected station which has been actually printing the immediately preceding message. The Y following Fig–Fig. then effects the release of all previous selections by clearing all Address function bars and restoring the blocking pawl for the No. 1 Letters function bar.

Figure 11:
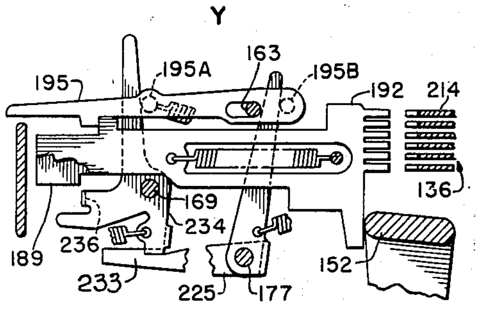

Fig. 11 shows the Y function mechanism which is rendered operable in response to a Y signal following the Fig.–Fig. signal sequence. When the Y function bar 192 is moved to the left by the bail 152 after it has been selected, it latches with its function pawl 195 and also moves the pawl 195 to the left. The Y function pawl 195 has a pair of lugs 195A and 195B which engage and pivot counterclockwise the blocking pawl 234 and the latching member 225 respectively. When the blocking pawl 234 is pivoted in this manner the projecting arm 236 thereon unblocks the Address function bars 189 and 190 thereby enabling them to become selected if corresponding address signals are received subsequently. When the latching member 225 is pivoted counterclockwise it unlatches the blocking pawl 219 (Fig. 8) thereby enabling the blocking pawl 219 to be pivoted clockwise under the urging of its spring whereby the projection 221 on the blocking pawl 219 blocks the No. 1 Letters function bar 188. It will be recalled that the No. 1 Letters function bar 188 is released for selection only when one of the Address function bars 189 or 190 is previously selected and therefore it is apparent that after the Y signal is received the No. 1 Letters function bar 188 remains blocked from selection until the Address signal corresponding to either of the Address function bars 189 or 190 is received.

*Station transmitter start function mechanism*

Figures 12, 13:
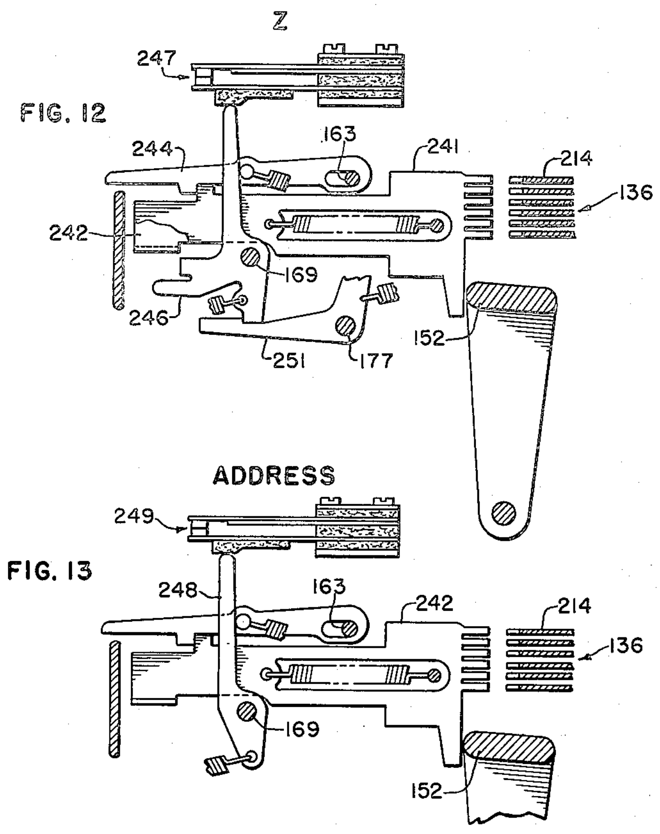
Figs. 12–14 are side elevational views of the transmitter start function mechanism of the selective control unit.
Figure 14:
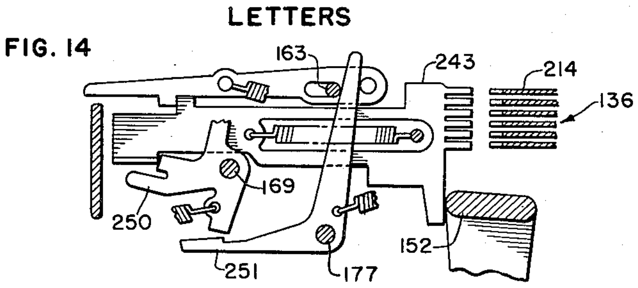

A function mechanism similar to the station selector function mechanism heretofore described, is provided in each of the outlying station selective control units. This mechanism is designated the station transmitter start function mechanism and is provided in order to enable the central office to control the transmission of messages from the outlying station transmitters. The station transmitter start function mechanism is shown in Figs. 12–14, and following is a description thereof. The timing is the same as that already described with reference to Fig. 3, so further description thereof is deemed unnecessary.

As was necessary, in order to initiate selection of the proper outlying station to which a message is addressed, it is likewise similarly necessary, in order to select an outlying station transmitter, that the printer suppressor code bar 214 in the outlying station receivers be moved first to switching position. It will be recalled that Fig.–Fig. transmitted from the central office over a line causes the printer suppressor code bars 214 to be moved to switching position at all outlying stations. A complete transmitter start sequence of signals, therefore, must include Fig.–Fig. The remaining signals necessary for initiating and causing the completion of a transmitter start sequence are, Z, Address, and Letters. Accordingly the transmitter start function mechanism includes both No. 1 and No. 2 Fig. function bars 186 and 187 as well as three additional function bars, a Z function bar 241 (shown in Fig. 12), an Address function bar 242 (shown in Fig. 13), and a Letters function bars 243 (shown in Fig. 14).

Referring first to Fig. 12 the Z function bar 241 has a cooperating Z function pawl 244 and a Z function operating lever 246. Selection of the Z function bar 241 causes the Z function operating lever 246 to be pivoted in a counterclockwise direction about shaft 169 to thereby unlatch the Address function bar 242. This pivotal movement of the Z function operating lever 246 also causes the closure of a contact pair 247, hereafter referred to as the transmitter start contact. The transmitter start contact 247 will be mentioned hereinafter in the description of the outlying station transmitter control circuits.

The Address function bar 242 (shown in Fig. 13) has a cooperating Address function operating lever 248, which, when actuated by an Address signal following a Z signal, pivots counterclockwise about the shaft 169 and causes the closure of the contact pair 249. The contact pair 249 will be referred to later in the specification as the Address contact 249 in the transmitter control circuit.

When the transmitter start sequence has been transmitted, if the transmitter whose address signal has been given has a message ready to transmit, such message will be transmitted. However, if such transmitter does not have a message ready to transmit, another Address will be transmitted by the central office, in order to test another outlying transmitter. When the central office determines that the outlying transmitter has a message to transmit, a Letters signal is transmitted over the outgoing side of the line. In response to the Letters signal the Letters function bar 243 (shown in Fig. 14) is selected which causes a latch 251 to be pivoted counterclockwise about shaft 177 to unlatch the Z function operating lever 246 and through simultaneous selection of bar 188, Fig. 5, release the printer suppressor code bar 214 at all stations selected for reception at the time the Address sequence of signals was initiated.

It is to be noted that even though the function mechanism comprising the Z function bar 241 (shown in Fig. 12), the Address function bar 242 (shown in Fig. 13), and the Letters function bar 243 (shown in Fig. 14), is located in the selective control unit of each receiving printer together with the function mechanism comprising the Nos. 1 and 2 Fig. function bars 186 and 187 (shown in Figs. 6 and 7), the Address function bar 189 (shown in Fig. 8), the Nos. 1 and 2 Letters function bars 188 and 191 (shown in Figs. 9 and 10), and the Y function bar 192 (shown in Fig. 11), there is no interference between the operations of these sets of function mechanism. As has already been shown the function mechanism for selecting an outlying station to receive a message includes the function bars 188, 189, 190, 191, and 192 whereas the function mechanism for actuating an outlying station transmitter includes the function bars 241, 242, and 243. To condition either of these sets of function mechanism for operation a Fig.–Fig. sequence is necessary which moves the printer suppressor code bar 214 to print supressing position. If a station receiver is being selected, a Y signal follows the Fig.–Fig. sequence inasmuch as a different station receiver is not selected until the conclusion of a message which ends with a Fig.–Fig.–Y sequence. As has been stated heretofore the Y signal causes all Address function bars 189 and 190 to be released for selection and the No. 1 Letters function bar 188 to be blocked. The No. 1 Letters function bar 188 remains blocked until one of the associated Address function bars 189 or 190 is selected. When a station transmitter is being selected a Z signal follows the Fig.–Fig. sequence. The Z signal unblocks the Address function bar 242 (Fig. 13) and after the Address signal is received a Letters signal is received. During a station transmitter selection the Nos. 1 and 2 Letters function bars 188 and 191 (Figs. 9 and 10) as well as the Letters functions bar 243 (Fig. 14) may all respond. Under this condition the No. 1 Letters function bar 188 at a station which was previously receiving a message operates to restore that station to receiving condition by moving the printer suppressor code bar 214 to printing condition whereas at all other stations the No. 1 Letters function bar 188 remains blocked by the Address function operating lever 219 (Fig. 8). The No. 2 Letters function bar 191 (Fig. 10) at all stations responds to the Letters signal but is ineffective inasmuch as the operating lever 234 associated therewith is already blocking the Address function bars 189 and 190. The Letters function bar 243 (Fig. 14) responds to the Letters signal to allow its associated operating lever 246 to block all Address function bars 242 (Fig. 13).

*Station transmitter control*

Figure 15:
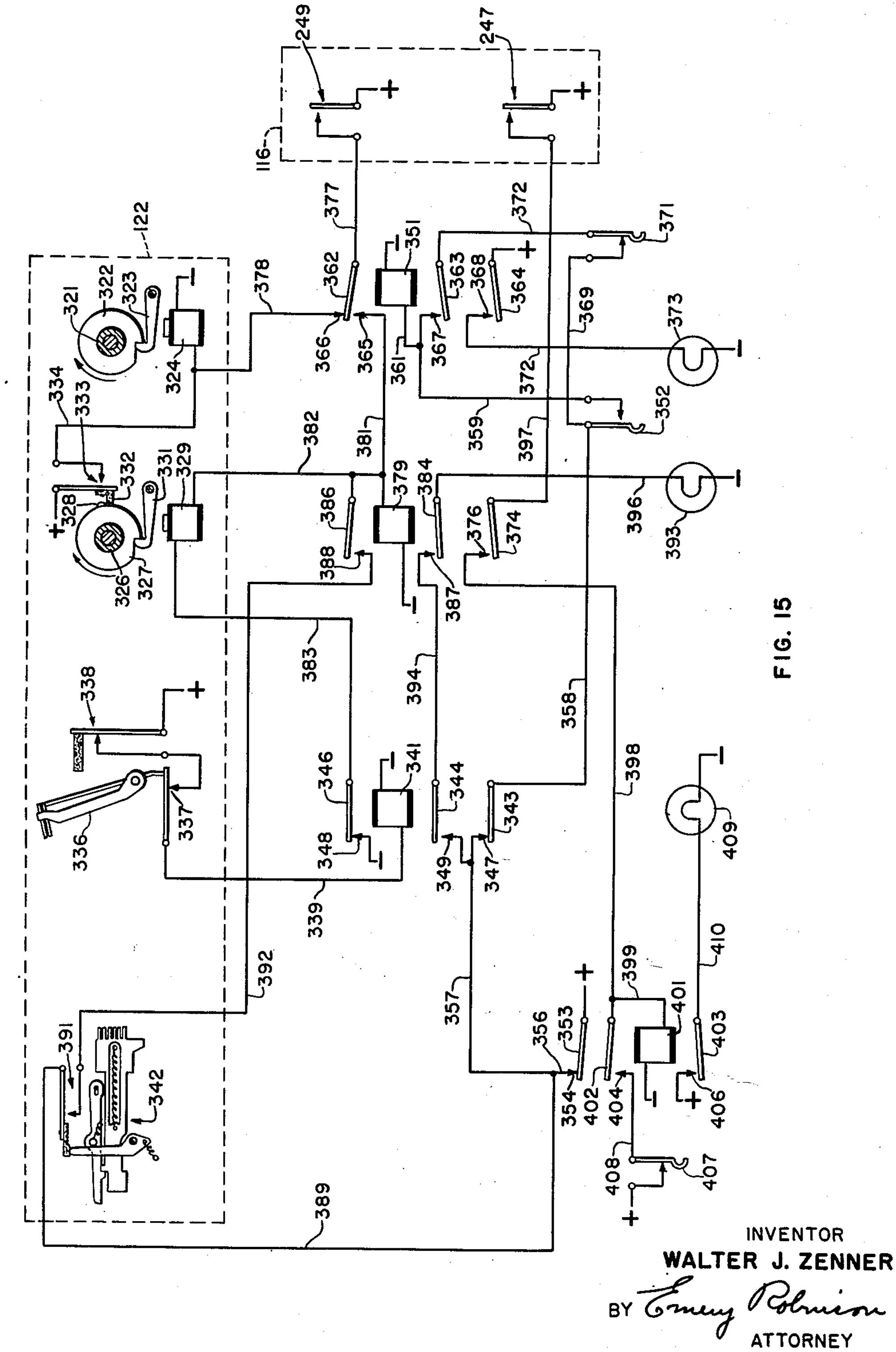
Fig. 15 is a diagram of the outlying station transmitter control circuit.

Reference should now be had to Fig. 15 of the drawings wherein the control circuit for the outlying station transmitters 122 is shown. As has already been shown in the description of the transmitter control mechanism located in the selective control unit of the outlying station receiving printers 116 a transmitter start contact 247 is closed upon the receipt of the transmitter start signal Fig.–Fig.–Z and a transmitter address contact 249 is closed upon receipt of the Address signal immediately following the transmitter start signal. Both of these contacts 247 and 249 are shown in the schematic representation of the outlying receiving printer 116 in Fig. 15.

In the schematic representation of the outlying station transmitter 122 in Fig. 15 there are shown only those elements deemed essential to a complete understanding of the invention. It will be recalled that the transmitter 122 is like that shown in the U. S. patent to E. A. Gubisch, 2,348,214 which is modified only to the extent necessary to adapt it to the purposes of the present invention. In the transmitter 122, the transmitter distributor is represented by a distributor cam sleeve 321 having a clutch release cam 322 integral therewith. Cooperable with the clutch release cam 322 is a clutch release pawl 323 which is magnetically operated by a clutch release magnet 324. Energization of the magnet 324 causes the pawl 323 to be pulled away from the cam 322 to thereby release the cam sleeve 321 for rotation.

A tape reader cam sleeve 326 has a clutch release cam 327 and a distributor release cam 328 integral therewith. Energization of a magnet 329 causes it to pull up a clutch release pawl 331 to thereby release the tape reader cam sleeve 326 for rotation. The cam 328 cooperates with a contact follower 332 whereby a contact pair 333 is closed once during each revolution of the cam 328. Closure of the contact pair 333 completes a circuit from positive battery, through the closed contact pair 333, over a lead 334, through the magnet 324 to negative battery, to thereby cause the release of the cam sleeve 321 for rotation.

The transmitter 122 is of the well known pivoted or climbing type having a pivoted tape sensing mechanism 336. The tape sensing mechanism 336 is provided with the usual extra tape sensing finger (not shown) which controls an end of tape contact 337. The tape sensing mechanism 336 is also provided with a tight tape contact 338. When a tape is positioned in transmitting position in the transmitter both contacts 337 and 338 are closed which completes a circuit from positive battery, through the closed contacts 338 and 337, over a lead 339, through a magnet 341, to negative battery. When the end of the tape is reached the contact 337 opens and when the tape becomes too tight between the perforator (not shown) and the tape sensing mechanism 336 the contact 338 is opened, in either of which cases the circuit to the magnet 341 is broken.

The transmitter 122 is also provided with a selective control unit which is represented by only a Y function mechanism 342. The purpose of this selective control unit is to monitor the messages transmitted and to recognize an end-of-message signal Fig.–Fig.–Y in the messages being transmitted. Upon recognizing this end-of-message signal the Y function mechanism 342 opens a circuit to the tape reader release magnet 329 to thereby render the transmitter 122 inoperative.

When the attendant at the outlying station 122 prepares a message for transmission, he perforates this message in a tape. In order to render the transmitter operable to transmit this tape message, the operator first places the tape in the tape sensing mechanism, which automatically closes the contact 337. Assuming that the length of tape between the tape perforator 121 and the tape sensing mechanism 336 is sufficient to prevent the opening of the contact 338, there is established at this time the aforementioned circuit from positive battery, through the closed tight tape contact 338, through the closed tape out contact 337, over lead 339, through the tape out magnet 341, to negative battery.

Energization of the tape out magnet 341 causes this magnet to pull up all of its armatures 343, 344 and 346 to thereby close contacts 347 and 348, and open a contact 349. Closure of the contact 347 prepares a circuit to a ready magnet 351. When the operator, having placed the message tape in the tape sensing mechanism 336, closes manually a normally open ready switch 352, a circuit is established from positive battery, through an armature 353 and its normally closed contact 354, over a pair of leads 356 and 357, through the now closed contact 347 and armature 343, over a lead 358, through the closed ready switch 352, over a lead 359, over a lead 361, through the ready magnet 351, to negative battery. Energization of the ready magnet 351 causes it to pull up all of its armatures 362, 363 and 364 which breaks the connection between the armature 362 and a contact 366, and makes connections between the armature 362 and a contact 365, between the armature 363 and a contact 367 and between the armature 364 and a contact 368. Closure of the armature 363 with the contact 367 completes a locking circuit for the ready magnet 351 over a circuit from positive battery, through an armature 353 and its normally closed contact 354, over a pair of leads 356 and 357, through the now closed contact 347 and armature 343, over a lead 358, over a lead 369, through a normally closed not-ready switch 371, over a lead 372, through the armature 363 and contact 367, over the lead 361, through the ready magnet 351, to negative battery. Closure of the armature 364 with the contact 368 completes a circuit from positive battery, through the closed armature 364 and contact 368, over a lead 372, through a ready lamp 373, to negative battery. The outlying station transmitter is, therefore, in condition to respond to a call signal transmitted thereto from the central office. If, for some reason, the operator decides not to transmit the message in the transmitter, he depresses the not-ready switch, thereby breaking the locking circuit to the ready magnet, and the message cannot be transmitted due to the opening of armature 362 from the contact 365.

Assuming that either there is no tape positioned for transmission in the tape sensing mechanism 336 or the operator, having positioned a tape in the tape sensing mechanism 336, has not yet depressed the ready switch 352 or has depressed the not-ready switch 371, the operation of the transmitter is as follows. At this time the armature 362 and the contact 366 are closed. The central office, in calling the transmitter 122, transmits Fig.–Fig.–Z–Address. The contact 247 closes temporarily on the Z signal, as has been heretofore described, but this is immaterial for at this time the only circuit in which contact 247 is located is open at an armature 374 and contact 376. On the Address signal in this sequence of signals the contact 249 closes and a circuit is established from positive battery, through the closed contact 249, over a lead 377, through the closed armature 362 and contact 366, over a lead 378, through the distributor clutch release magnet 324, to negative battery. Energization of the magnet 324 causes the pawl 323 to be pulled up thereby releasing the distributor cam sleeve 321 for rotation. At this time, due to the fact that no tape is being sensed the distributor cam sleeve 321 will cause a blank signal to be transmitted back to the central office. Such blank signal causes the central office to transmit the next Address signal in the sequence of stations on the line. Upon receipt of this next Address signal, at the receiving printer 116, a bail 182 (Fig. 3) in the receiving printer 116 is caused to strip the Address function pawl at that station from the Address function bar to thereby open the contact 249. Opening of the contact 249 causes the distributor cam sleeve clutch release magnet 324 to be de-energized which stops the rotation of the distributor cam sleeve 321 in the station transmitter 122.

Assuming that the attendant has positioned a message tape in the tape sensing mechanism 336, and has depressed the ready switch 352, the operation of the transmitter 122 is as follows. It should be recalled that under these conditions the ready magnet 351 is energized and locked up in its energized condition whereby the armature 362 and contact 365 are closed. As in the case where the ready magnet 351 is de-energized, the armature 374 is not closed with the contact 376 when the contact 247 closes in response to the Z signal of the Fig.–Fig.–Z–Address calling signal sequence, so that nothing happens on receipt of the Z signal. Upon receipt of the Address signal of the transmitter calling sequence, the contact 249 closes to thereby energize the tape reader clutch magnet 329 and a send magnet 379. The energizing circuit for the send magnet 379 extends from positive battery, through closed contact 249, over the lead 377, through closed armature 362 and contact 365, over a lead 381, through the send magnet 379, to negative battery. The energizing circuit for the tape reader clutch magnet 329 extends from positive battery, through closed contact 249, over the lead 377, through closed armature 362 and contact 365, over the lead 381, over a lead 382, through the magnet 329, over a lead 383, through the presently closed armature 346 and contact 348, to negative battery.

Energization of the magnet 329 causes the pawl 331 to be pulled up to thereby release the tape reader cam sleeve 326 for rotation. Rotation of the tape reader cam sleeve 326 causes the high part of the cam 328 to close the contact pair 333 which results in the energization of the distributor clutch release magnet 324 over a circuit from positive battery, through the closed contact pair 333, over the lead 334, through the magnet 324, to negative battery. Energization of the magnet 324 causes the pawl 323 to be pulled up to thereby release the distributor cam sleeve 321 for rotation whereby signals being sensed in the tape sensing mechanism 336 are transmitted.

Energization of the send magnet 379 causes all of its armatures 374, 384 and 386 to be pulled up to cause these armatures to make with their respective cooperating contacts 376, 387 and 388. Closure of the armature 386 with the contact 388 completes a circuit from positive battery, through presently closed armature 353 and contact 354, over the lead 356, over a lead 389, through a presently closed contact pair 391 associated with the Y function mechanism 342 of the transmitter selective control unit, over a lead 392, through the presently closed contact 388 and armature 386, over the lead 382, over the lead 381, through the send magnet 379, to negative battery. This circuit serves as a locking circuit for the send magnet 379 to thereby retain the armature 386 and contact 388 in closed relation.

Retention of the armature 386 and contact 388 in closed relation also completes a circuit over the path described immediately above to the lead 382, and thence over lead 382, through the tape reader clutch release magnet 329, over the lead 383, through the closed armature 346 and contact 348, to negative battery. It is, therefore, apparent so long as the tight tape contact 338 and the end of tape contact 377 remain closed, that the tape reader clutch release magnet 329 retains the pawl 331 disengaged from the cam 327 and transmission of the message continues. At the end of the message a Fig.–Fig.–Y sequence of signals is monitored by the selective control unit represented by the Y function mechanism 342 in the transmitter, and the contact pair 391 is opened which immediately breaks the circuit to send magnet 379 and clutch magnet 329. At this time, therefore, transmission of signals ceases due to the de-energization of the magnet 329 and resulting sustained de-energization of the distributor clutch release magnet 324.

If during transmission of a message, the tape sensing mechanism 336 runs out of tape so that the tape out contact 337 opens or the tape becomes too tight, that is if transmission from the tape takes place faster than perforation of additional tape, so that the tight tape contact 338 opens, the tape out magnet 341 is de-energized. De-energization of the magnet 341 permits the armatures 343, 344 and 346 to fall back thereby causing the closure of the armature 344 with the contact 349 and the opening of the armatures 346 and 343 with their respective contacts 348 and 347. At this time the magnet 329 becomes de-energized so that transmission ceases; however, the send magnet 379 remains energized so that if the tape is repaired promptly transmission is resumed. Closure of the armature 344 with the contact 349 completes a circuit to a tape out indicator lamp 393 from positive battery, through the presently closed armature 353 and contact 354, over the leads 356 and 357, through the closed contact 349 and armature 344, over a lead 394, through the presently closed contact 387 and armature 384, over a lead 396, through the tape out indicator lamp 393, to negative battery.

When the transmitter 122 ceases transmitting without having transmitted an end-of-message signal, Fig.-Fig.-Y, an automatic timer mechanism is initiated at the central office, which, after a predetermined interval initiates a switching operation. As the signals of all outlying transmitter switching sequences are Fig.-Fig.-Z-Address, the contact 247 closes on the Z signal of all of these sequences. Due to the fact that the send magnet is energized at this time, a circuit is completed from positive battery through the presently closed contact 247, over a lead 397, through the presently closed armature 374 and contact 376, over leads 398 and 399, through a break magnet 401, to negative battery. Energization of the break magnet 401 causes its armatures 353, 402 and 403 to be pulled up to thereby break the circuit over the armature 353 and contact 354, and to close the armatures 402 and 403 with their respective contacts 404 and 406. The closure of the armature 402 with the contact 404 completes a locking circuit for the break magnet 401 from positive battery, through a normally closed restart key 407, over a lead 408, through the closed contact 404 and armature 402, over the leads 398 and 399, through the break magnet 401, to negative battery. The closure of the armature 403 with the contact 406 completes a circuit from positive battery, through the closed contact 406 and armature 403, over a lead 410, through a break indicator lamp 409, to negative battery. The attendant is thereby notified, due to the illumination of the break indicator lamp 409 and the tape out indicator lamp 393, that transmission from his station has ceased, that the cause of cessation of transmission is due either to no tape or a tight tape in the tape sensing mechanism 336, and that his transmitter is no longer the selected transmitting station. After taking care of the cause of the trouble it is necessary that the attendant depress the restart key 407 in order to de-energize the break magnet 401 to enable the closure of the armature 353 and contact 354. The attendant must also depress the ready key 352 in order to again energize the ready magnet 351 so that the message will be transmitted when the station is subsequently called.

It should be noted that depression of the not ready key 371 while a message is being transmitted does not interrupt transmission of a current message due to the fact that the send magnet 379 remains energized over its locking circuit independently of the condition of the ready magnet 351.

*Multiple reperforator transmitter*

Figure 16:
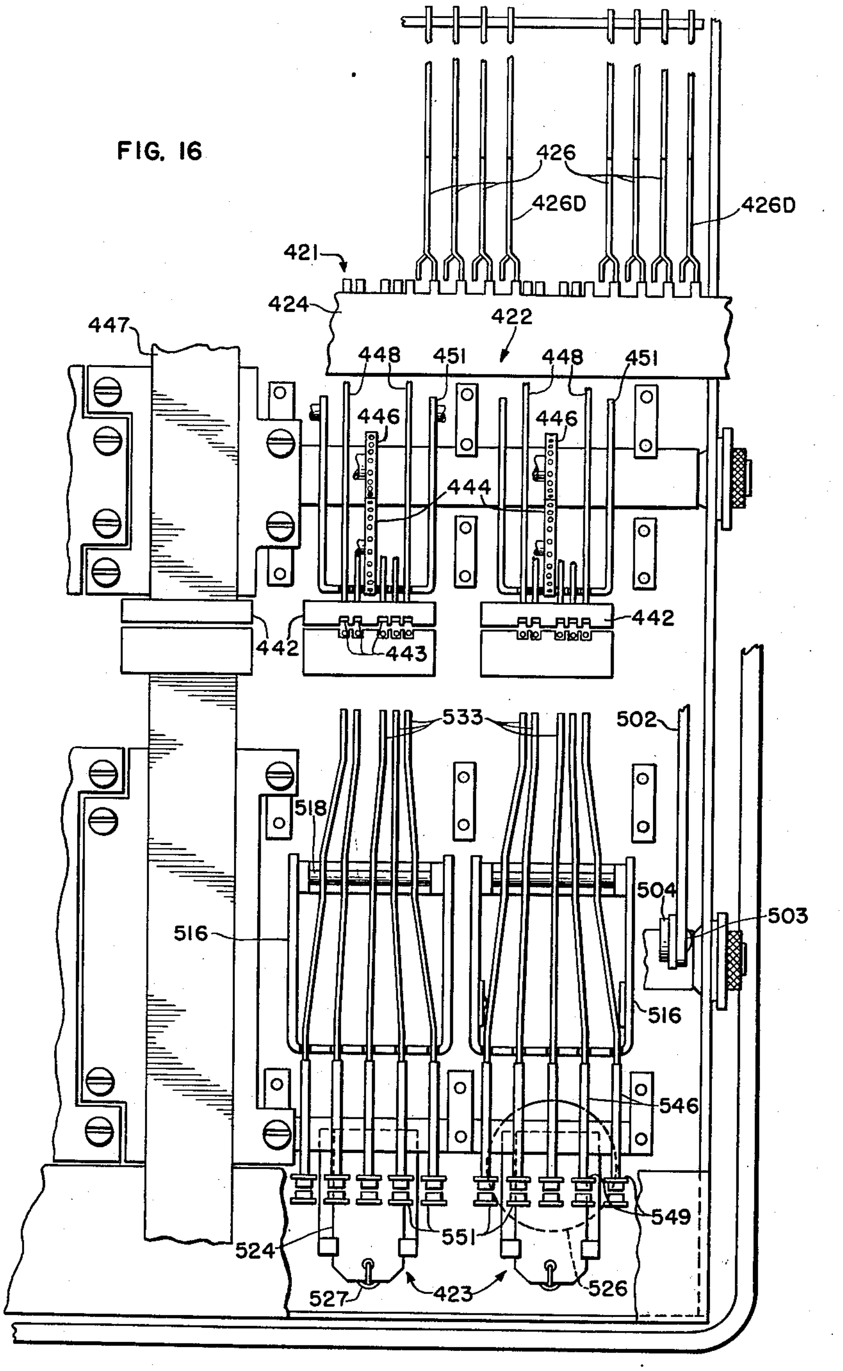
Fig. 16 is a fragmentary plan view of a multiple reperforator transmitter, partly cut away to show the apparatus more clearly.
Figure 17:
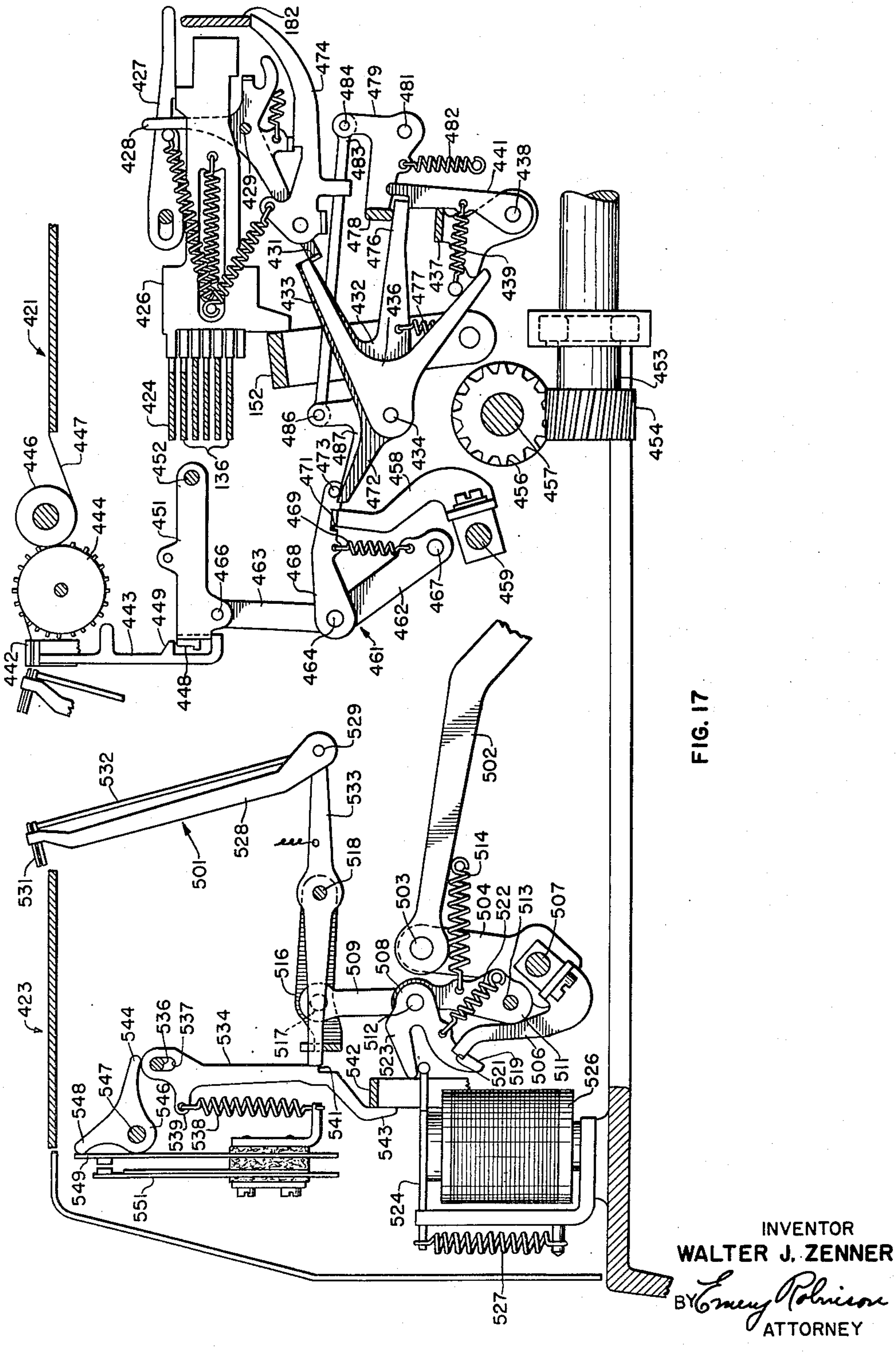
Fig. 17 is a side elevational view showing the principal parts of the multiple reperforator transmitter.

Turning now to Figs. 16 and 17 a description of the multiple reperforator transmitter follows. It is to be borne in mind that one of these units is provided for each line of the system and is located at the central office. In accordance with the design of the basic system, it is contemplated that the multiple reperforator transmitter will have ten reperforator units 421 for receiving the messages addressed to any of ten outgoing lines, and an intercept reperforator 422 for reperforating all improperly addresed messages. Also included in the multiple reperforator transmitter are a plurality of transmitter units 423, one corresponding to each reperforator 421 and 422, for transmitting all messages reperforated by the reperforators 421 and 422.

The multiple reperforator transmitter includes a selective control unit having the usual series of five code bars 136; however, the sixth code bar 424, instead of being a printer suppressor code bar, is in this selective control unit termed a punch select code bar 424. The selector mechanism for each reperforator comprises one or more function bars 426 adapted to respond to the appropriate setting of the code bars 136. The additional function bars 426 are provided so as to enable group or broadcast transmission or progressive selection of the reperforators in response to messages addresed with group or broadcast addresses which consist of two or more address identifying signals in the case of a more complex system. Each function bar 426 has a cooperating function pawl 427 and function operating lever 428. A Letters function bar 426D is also provided in each position. An intercept function bar (not shown separately) also is provided with an associated function pawl and operating lever.

Upon receipt of an Address signal which causes one of the function bars 426 to be selected, the intercept function bar is also selected. Selection of the intercept function bar causes a function operating lever 428 in the intercept position to be pivoted clockwise whereby a bent over projection 431 thereon engages a bell crank 436 to pivot the bell crank 436 counterclockwise about a shaft 434. Such pivotal movement of the bell crank 436 causes the lower arm thereof to engage and pivot a bail 437 clockwise about a shaft 438 against the bias of a spring 439. As the bail 437 moves clockwise it engages and pivots a plurality of latches 441 clockwise about the shaft 438. A latch 441 is provided in each of the reperforator positions in the multiple reperforator transmitter except the intercept reperforator.

Selection of the Address function bar 426 causes an operating lever 428 in the appropriate reperforator position to be pivoted clockwise about a shaft 429 whereby a bent over projection 431 on such operating lever engages an arm 433 of a three armed lever 432 to pivot the three armed lever 432 counterclockwise about the shaft 434.

Each reperforator 421 has a punch block 442 within which five reciprocable punches 443 are mounted. A tape feed mechanism consisting of a punch wheel 444 and die wheel 446 are adapted to be rotated in a manner so as to perforate feed holes in a tape 447 and to advance it through a guide (not shown) in the punch block 442. Each reperforator is provided with a plurality of punch select fingers 448, one of which cooperates with each of the punches 443 to control the operation thereof. The punch select fingers 448 are positioned in accordance with incoming signals in a manner whereby they are in the position shown in Fig. 17 in response to a marking impulse and are moved to the right from beneath the lugs 449 in response to a spacing impulse. Each of the punch select fingers 448 is carried in a bail 451 mounted pivotally on a shaft 452.

A continuously rotating power shaft 453 has a gear 454 which meshes with a gear 456 on a shaft 457. The shaft 457 carries a cam (not shown) which is operably connected with a bail 458 mounted oscillatably on a shaft 459. Due to the continuous rotation of the shaft 457, the bail 458 is a continuously oscillating bail. A toggle 461 consisting of links 462 and 463 is provided for operably connecting the punch bails 451 to the continuously oscillating bail 458. The links 462 and 463 are fastened together pivotally at 464, the link 463 being secured pivotally to the bail 451 at 466 and the link 462 being mounted pivotally on a stationary shaft 467. Secured to the two links 462 and 463 is a link 468 which is biased in a clockwise direction by a spring 469 secured suitably at its other end to the link 462. The link 468 has a notch 471 with which the bail 458 cooperates in order to impart motion to the punch bail 451. There is a separate toggle mechanism 461 for connecting each of the punch bails 451 to the continuously oscillating bail 459.

It will be recalled that upon selection of an address function bar 426, the corresponding operating lever 428 pivots the three armed lever 433 counterclockwise. When the three armed lever 433 is moved in this manner an arm 472 thereon permits the link 468 to move downwardly into operable connection with the bail 458, the link 468 normally being retained in an upward position due to a stud 473 engaging the arm 472.

At the same time that an address function bar 426 is selected the function bar in the intercept position is also selected, which results in the pivotal movement of all the latches 441 clockwise through the medium of the bail 437, as was heretofore described. Upon selection of the address function bar 426, its operating lever 428 becomes latched temporarily by a latch 474 to thereby retain the corresponding three armed lever 432 in its counterclockwise position. When the intercept operating lever 428 is selected there is no latch thereon so that as soon as the bail 182 strips the address function pawl 427 and intercept function pawl 427 from latching engagement with their respective cooperating function bars 426, the intercept operating lever 428 immediately pivots counterclockwise permitting the bell crank 436 to pivot clockwise. The bail 437 is therefore pivoted counterclockwise due to the action of all the springs 439. The latch 441 is thus moved into latching engagement with a horizontal arm 476 of the three armed lever 432 to thereby permit the spring 469 to retain the link 468 in operative connection with the bail 458. The subsequent tripping of the latch 474 from engagement with the address operating lever 428 therefore has no effect on the three armed lever 432.

Whenever the operating lever 428 associated with any of the function bars 426 is actuated, the Letters function bar 426D is unblocked. In the case of messages addressed to more than one destination the address portion of the message contains address signals for each destination. Upon the receipt of the second Address the bell crank 436 is actuated and causes the bail 437 to pivot clockwise and thus unlatch the three armed lever 432 which had been previously latched by the latch 441. Thus the second Address signal will not be reperforated by the punch selected by the first Address. At the end of each complete Address sequence there is an end-of-address or Letters signal. In each punch position where the Letters function bar 426D has been unblocked, due to the actuation of the associated operating lever 428, such Letters function bar 426D operates upon receipt of the end-of-address signal and actuates an operating lever similar to the operating lever 428 to again cause the previously selected punch to be coupled.

In case the code bars 136 are selectively positioned in response to a signal which does not correspond to the address signal for actuating one of the reperforators 421, obviously no address function bar 426 will be selected. The intercept function bar 426 nevertheless is selected at such time and, as has been already described, the bail 437 is actuated in response thereto in order to move all the latches 441 from engagement with their cooperating three armed levers 432. The three armed levers 432 are all pivoted clockwise due to the action of the springs 477, and the arms 472 by engaging the studs 473 on all of the links 468 prevent the selection of any of the address reperforators. As the three armed levers 432 are all moved clockwise in this manner a bail 478 secured to a pair of bell cranks 479 mounted pivotally at 481 pivots counterclockwise under the urging of springs 482. A link 483 is secured pivotally at 484 to the bell crank 479 and is secured pivotally at its other end at 486 to a bell crank 487 mounted pivotally at 434. As the bail 478 pivots counterclockwise under the urging of the springs 482 the bell crank 487 is pivoted counterclockwise to thereby permit the link 468 cooperating therewith to pivot clockwise under the urging of the spring 469 in order to operably connect the intercept reperforator to the continuously oscillating bail 458.

The punch select code bar 424 is caused to move to punch select position in response to an end-of-message signal (Fig.–Fig.–Y) in an incoming message from a station on the outlying line. As a subsequent outlying station is tested for determining whether or not it has a message ready to be transmitted, the first signal in such message is an Address signal. This Address signal causes one of the function bars 426 to be selected to in turn cause the selection of the proper reperforator 421. Following the Address signal in the message is an end-of-address (Letters) signal which causes the punch select code bar 424 to be restored to reperforating position whereby the selected reperforator 421 reperforates the message and all other reperforators 421 are locked out. The movement of the punch select code bar 424 to punch select or reperforating position is accomplished in the same manner as the movement of the printer suppressor code bar 214 to station selecting or station printing positions.

As has been heretofore pointed out, each reperforator 421 of the multiple reperforator transmitter has a cooperating transmitter 423 adapted to transmit the messages reperforated in the tapes 447. The details of the tape sensing portions 501 of the transmitters 423 are of the type shown in the aforementioned patent to E. A. Gubisch, 2,348,214, and will be described herein only insofar as is necessary for an understanding of the present invention.

The continuously rotating shaft 457 has a cam (not shown) which is operably connected to a link 502. The link 502 is secured pivotally at 503 to a lever 504 in order to impart continuous oscillatory motion to a bail 506 pivotally mounted on a shaft 507. The bail 506 is common to all of the transmitters 423 and is adapted to be engaged by bell crank 508 associated with each of the transmitters 423. The description following immediately hereinafter refers to only one of the transmitters 423, for the reason that the description will be simplified if they are described singularly. It is to be understood that each transmitter 423 is like the one next to it and that there is one of them provided for each reperforator 421 in the multiple reperforator transmitter unit.

The bell crank 508 is secured pivotally to a pair of links 509 and 511 by a bolt 512, which links together comprise a toggle mechanism. The link 511 is secured pivotally on a fixed shaft 513 and is biased thereabout in a clockwise direction by a spring 514. The link 509 is secured pivotally to a bail 516 by a shaft 517, the bail 516 being mounted pivotally on a stationary shaft 518. The bell crank 508 has an arm 519 having a notch 521 therein within which the bail 506 fits when the bail 506 and bell crank 508 are operably connected with one another. The spring 522 tends to retain the operable connection between the bail 506 and the toggle comprising the links 509 and 511. The bell crank 508 has another arm 523 with which an armature 524 associated with an operate magnet 526 cooperates. A spring 527 retains the armature 524 in its upward position whenever the magnet 526 is de-energized to thereby retain the bail 506 and bell crank 508 in disengaged relation.

The tape sensing mechanism 501 is of the pivoted type having a pair of arms 528 pivoted at 529 and a tape guide 531. A plurality of tape sensing pins 532 are vertically reciprocable within the tape sensing mechanism for sensing the perforations in the tape 447. A plurality of interponents 533 are mounted pivotally on the shaft 518 and cooperate with the sensing pins 532 to enable the transfer of the signals from the sensing pins 532.

A plurality of transfer levers 534 are mounted pivotally on a shaft 536 and are adapted to cooperate with the interponents 533. Each of the transfer levers 534 is provided with an elongated slot 537 whereby the transfer levers 534 are permitted to reciprocate slightly vertically. Individual springs 538 are attached to projecting arms 539 on each transfer lever 534 and operate to retain the transfer levers 534 in their lower position and biased counterclockwise slightly. The transfer levers 534 are provided with shoulders 541 which cooperate with the interponents 533 to enable the transfer of signals to the transfer levers 534. If a sensing pin 532 senses a spacing signal (no perforation) in the tape 447, the corresponding interponent 533 remains in the position shown in Fig. 17 and the transfer lever 534 and interponent 533 occupy the same relative positions as shown. If the sensing pin 532 senses a marking signal (perforation) in the tape 447, the interponent 533 pivots counterclockwise slightly on the shaft 518 to a position where the shoulder 541 is permitted to move to the right over the left end of the interponent 533. A bail 542 cooperates with a lower extremity 543 on each transfer lever 534 to retain the transfer levers 534 in the position shown until the tape 447 is sensed, and while the sensing pins 532 remain in sensing position the bail 542 moves counterclockwise to permit the transfer of the signal to the transfer levers 534. Thereafter the toggle comprising the links 509 and 511 straightens to the position shown which raises the bail 516. As the bail 516 moves up, those transfer levers 534 with their shoulders 541 positioned on top of the interponents are also moved up whereas the interponents 533 whose corresponding sensing pins 532 have sensed spacing impulses in the tape 447 are merely moved up slidably along the corresponding transfer levers 534.

The transfer levers 534 are adapted to cooperate with horizontal arms 544 of a corresponding group of bell cranks 546 mounted pivotally on a shaft 547. The bell cranks 546 are provided with vertical arms 548 which cooperate with a group of spring contact members 549. The spring contact members 549 cooperate with fixed contact members 551 to convert the signals into electrical impulses. When the transfer levers 534 are raised the bell cranks 546 are pivoted counterclockwise to close the contact member 549 against the fixed contact member 551. Upon the completion of the transfer of the signals to the contact members 549 and 551, the bail 542 is moved to the left to strip all of the transfer levers 534 from engagement with the interponents 533.

The operate magnets 526, which control the operation of the transmitters 423, are sequentially operated under control of the transmitter controller, to be hereinafter explained.

*Transmitter controller*

Figures 18, 22:
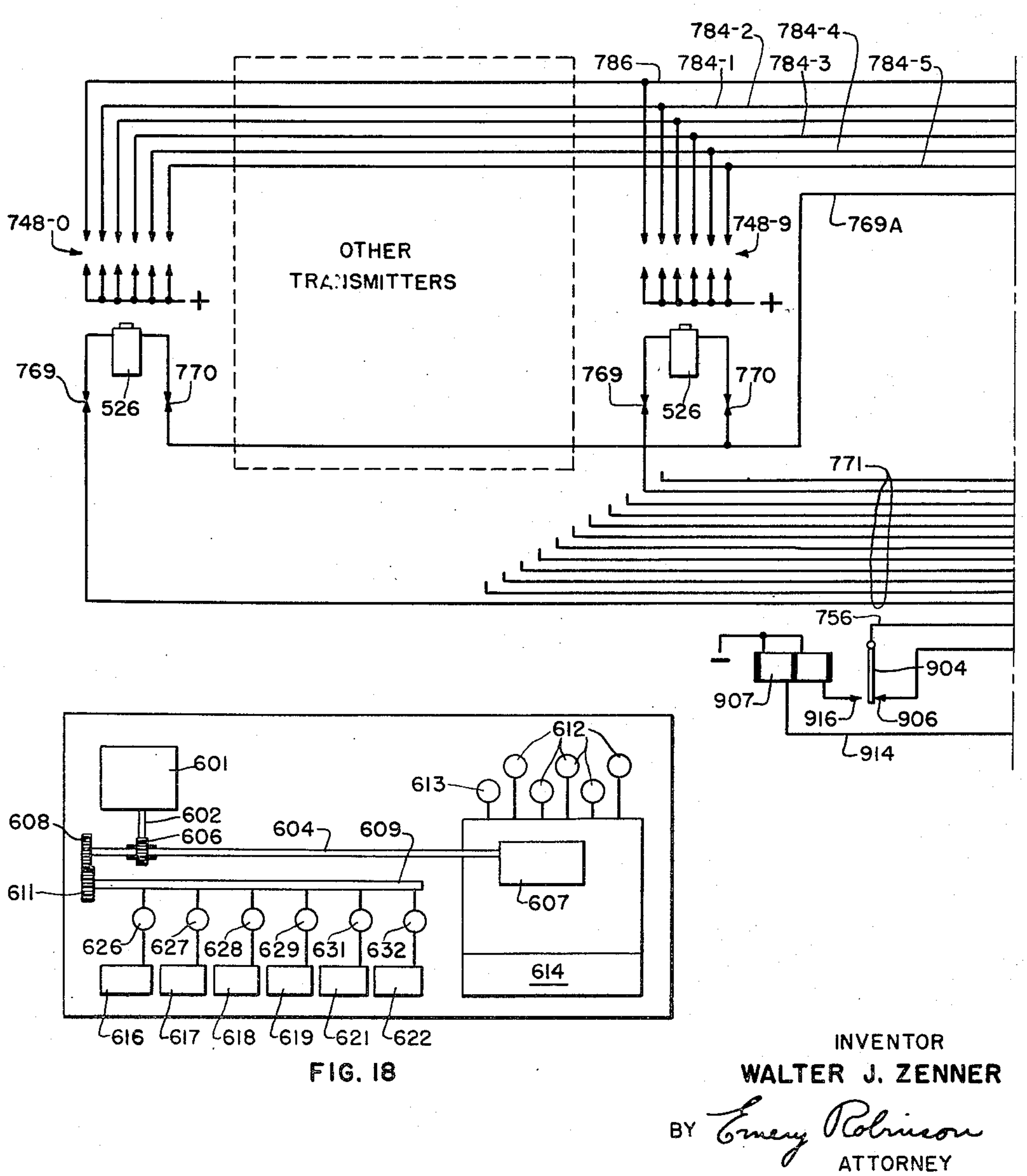
Fig. 18 is a schematic view of the transmitter controller.
Figs. 22–24 are schematic electrical circuit diagrams showing the circuits in the transmitter controller.
Figures 19, 20:
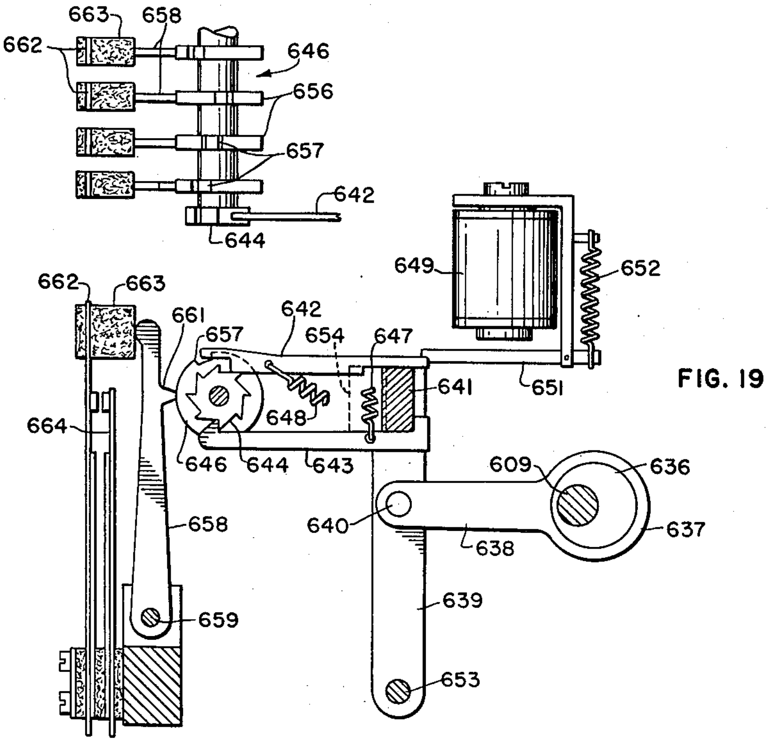
Fig. 19 is a sectional view of a typical sequence switch used in the transmitter controller.
Fig. 20 is a fragmental view showing a portion of a typical sequence switch.

The transmitter controller is shown schematically in Fig. 18. The transmitter controller has a motor 601 with a power shaft 602 to which is secured a gear 603 for continuously rotating a shaft 604 by means of a gear 606. The shaft 604 affords the power for a distributor mechanism 607 and has a gear 608 for continuously driving a shaft 609 through a gear 611. A group of five magnets 612 and a start magnet 613 are provided for receiving the impulses transmitted by one of the transmitters 423 in the multiple transmitter to control the distributor mechanism 607 and a function mechanism 614. A plurality of sequence switches are provided, the details of which are shown in Fig. 19. The sequence switches are a transmitter start sequence switch 616, an address sequence switch 617, an end-of-message sequence switch 618, multiple transmitter sequence switch 619, recycle timer sequence switch 621, and a round counter sequence switch 622, each of which has its stepping magnet identifiable respectively by the reference numerals 626, 627, 628, 629, 631, and 632.

Turning to Fig. 19, a typical sequence switch will be described. The shaft 609 is a continuously rotating shaft and is adapted to drive the sequence switches as described immediately hereinafter with reference to the typical sequence switch. The shaft 609 is provided with an eccentric cam 636 which rotates within a collar 637 having an arm 638. The arm 638 is secured pivotally at 640 to one lever 639 of a pair of levers which carry a bail 641 common to all sequence switches. A pair of pawls 642 and 643 cooperate with a ratchet 644 to rotate a cam assembly 646 in a stepped counterclockwise manner (Fig. 19). The pawls 642 and 643 are urged towards one another at their right ends by a spring 647 and the pawl 642 is urged to the right while the pawl 643 is urged to the left by a spring 648. A stepping magnet 649 has a spring biased armature 651 which is retained in blocking position relative to the pawl 642 by a spring 652 while the magnet 649 is de-energized.

Recalling that the shaft 609 is a continuously rotating shaft and due to the action of the eccentric cam 636, the bail 641 continuously pivots about a shaft 653 between the position shown and the dotted position 654. During such movement of the bail 641 the pawl 642 is normally restrained from movement to the right by the armature 651 which blocks any movement of the pawl 642 to the right; however, the pawl 643 follows the movement of the bail 641. So long as the armature 651 blocks the pawl 642, the pawl merely slides slightly on one tooth of the ratchet 644 and at this time the lower pawl 643 also merely slides on one tooth of the ratchet. When the magnet 649 is energized the pawl 642 is unblocked and as the bail 641 moves to the right the pawl 642 follows and slips past a tooth on the ratchet 644. As the bail 641 moves to the left subsequently, the ratchet 644 is rotated counterclockwise a half step, during which rotation the pawl 643 slips over a tooth on the ratchet 644. Upon the return of the bail 641 to the right the pawl 643 rotates the ratchet a half step. It is, therefore, obvious that the cam assembly 646 is rotated a step, at least, with each energization of the stepping magnet 649.

The cam assembly 646 has a plurality of cams 656 each of which has one or more notches 657. A plurality of switching levers 658 mounted pivotally on a shaft 659 each have a cam follower 661 for cooperating with the cams 656. A plurality of movable spring contacts 662, each having insulated portions 663 for cooperating with the switching levers 658, urge the switching levers 658 towards corresponding cams 656. When the cams 656 advance to the position where the notches 657 are opposite the followers 661, the spring contact 662 is permitted to move to the right (Fig. 19) sufficiently to make contact with corresponding stationary contacts 664. As will be clearly brought out in the description of the transmitter controller electrical circuits, numerous circuits are controlled by the controlled energization and de-energization of the stepping magnet 649.

Figure 21:
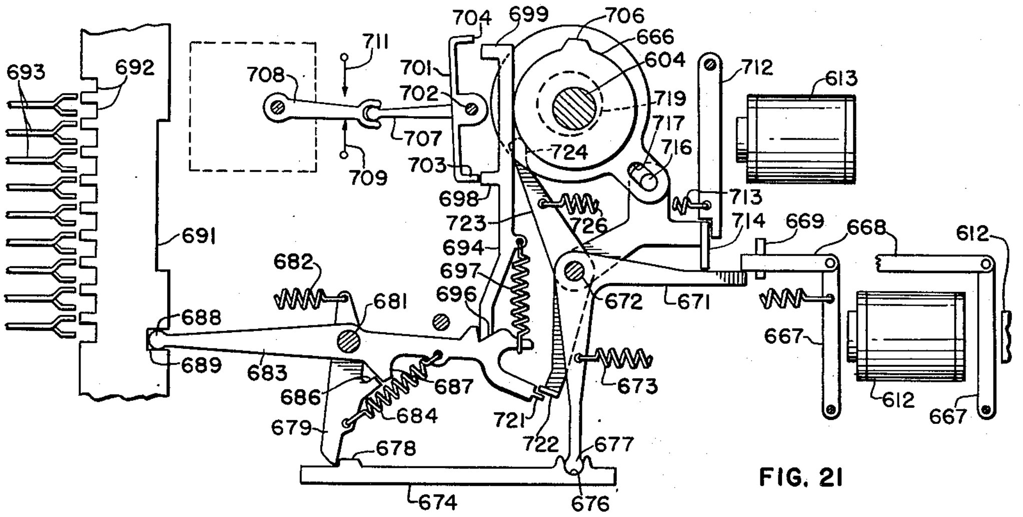
Fig. 21 shows the distributor mechanism of the transmitter controller.
Figure 24:
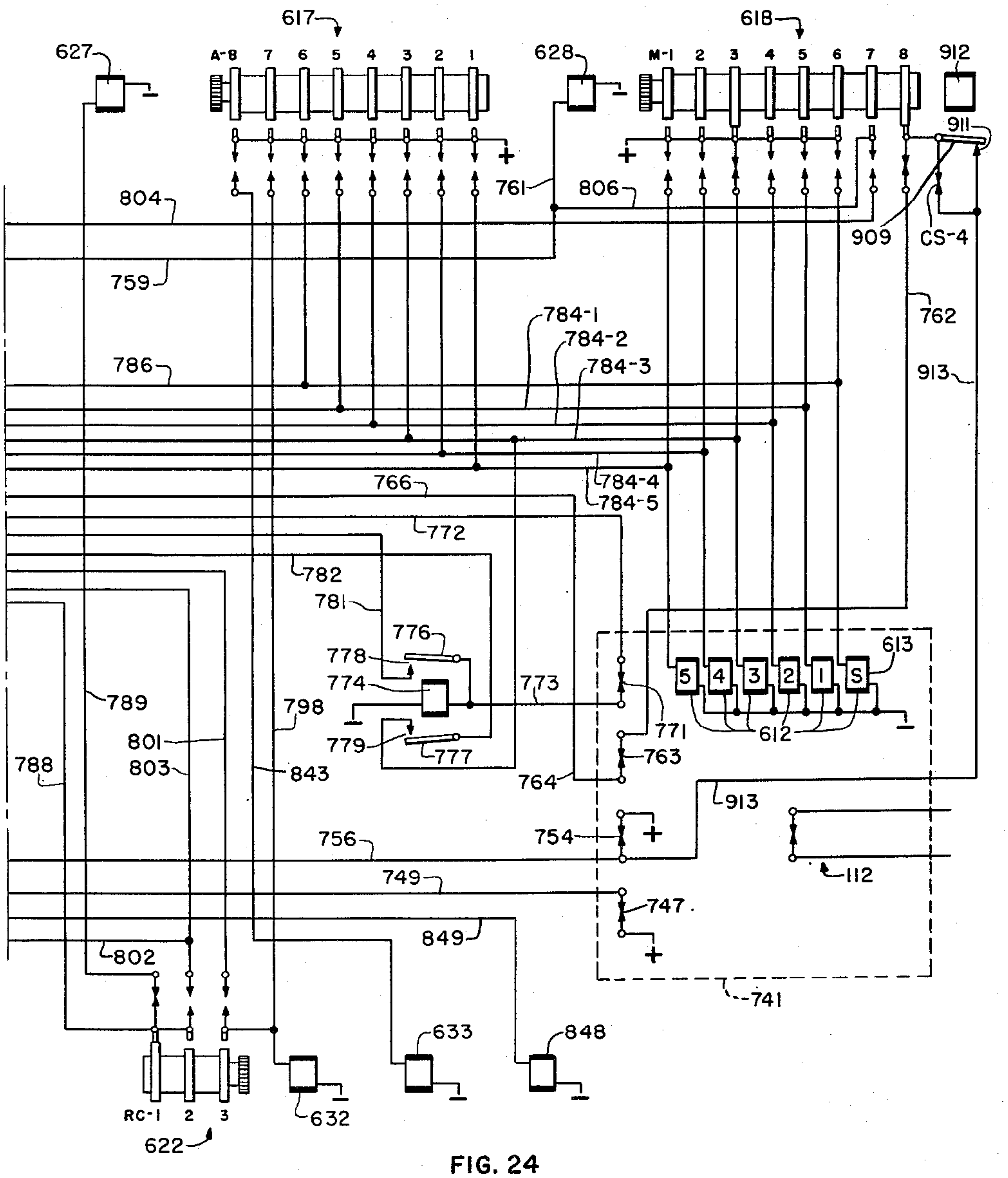

As was stated previously the transmitter controller is provided with a distributor mechanism 607, shown in detail in Fig. 21 and represented schematically in Fig. 24 by the magnets 612 and 613. The shaft 604, as has been stated, is a continuously rotating shaft and has a cam sleeve 666 therearound adapted to be clutched to the shaft 604 by a clutch (not shown) which is rendered effective in response to the energization of the start magnet 613.

The selector magnets 612 are all provided with spring biased armatures 667 having operating levers 668 secured pivotally thereto. The operating levers 668 are guided by a comb bar 669 and cooperate with a corresponding group of bell cranks 671 mounted pivotally on a shaft 672. The bell cranks 671 are spring biased counterclockwise by springs 673 individual to each bell crank. A set of longitudinally slidable transfer levers 674 are provided with socket notches 676 within which ball portions 677 on the bell cranks 671 ride. The transfer levers 674 are also provided with shoulders 678 which, when the transfer levers 674 are moved to the left or spacing position (the position as shown), engage corresponding levers 679 to move them clockwise about their supporting shaft 681. The levers 679 are provided with springs 682 which urge the levers counterclockwise on the shaft 681 towards marking position. Also mounted pivotally on the shaft 681 are a set of interponents 683 which are urged continuously clockwise about shaft 681 by springs 684 secured between the interponents 683 and levers 679. Shoulders 686 on the levers 679 cooperate with projections 687 on the interponents 683 whereby counterclockwise movement of the levers 679 is transferred to counterclockwise movement of the interponents 683 and not merely taken up by the springs 684. The interponents 683 are provided with ball portions 688 which are positioned within notches 689 of code bars 691, each code bar 691 being provided with a plurality of notches 692 for controlling the selection of one of a plurality of function bars 693.

A plurality of selector levers 694 are secured pivotally to the interponents 683 within notches 696 in the interponents by means of bias springs 697 secured to the selector levers 694 and interponents 683. Each of the selector levers 694 has faces 698 and 699 adapted to cooperate with a bail 701. The bail 701 is secured pivotally on a shaft 702 and has faces 703 and 704 adapted to be engaged respectively by the faces 698 and 699 on the selector levers 694. When the selector lever 694 is positioned as shown (in its lower or spacing position), a cam on the cam sleeve 666 will rotate until the apex 706 of such cam engages the selector lever 694 approximately midway between the two faces 698 and 699 thereby urging the selector lever 694 to the left whereupon the face 698 engages the face 703 to pivot the bail 701 clockwise. This movement of the bail 701 causes an arm 707 thereon to move in a manner so that a contact swinger 708 connected thereto moves from a marking contact 709 to a spacing contact 711. The contact swinger 708 is connected to the outgoing transmission line (not shown) so that closure of the contact swinger with contact 709 puts marking current on the line and closure with the contact 711 puts spacing current on the line.

The positions of the various parts in the distributor illustrate a stop condition. When the start magnet 613 is energized by a signal from one of the transmitters in the multiple reperforator transmitter it pulls up its armature 712 against the action of a retaining spring 713. When the armature 712 is moved thusly it unblocks a bail 714. Also when the magnet 613 is energized the cam sleeve 666 is clutched to the continuously rotating shaft 604. Immediately after the unblocking of the bail 714, those bell cranks 671, associated with operating levers 668 which have been moved to the right due to the energization of the corresponding magnets 612, pivot counterclockwise under the urging of their springs 673 to thereby pivot the bail 714 about the shaft 672 upon which it is supported pivotally. A stud 716 on the bail 714 moves in an elongated slot 717 in collar 718 whose movement is controlled by an eccentric 719 secured to the cam sleeve 666.

In response to the movement of the bell cranks 671 according to the energization of the magnets 612, the transfer levers 674 are longitudinally positioned in accordance therewith, the levers 679 are accordingly positioned, and the interponents 683 are positioned. The interponents 683 each have a locking finger 721 which cooperates with a finger 722 on a locking lever 723 pivoted on the shaft 672. The locking lever 723 has a follower portion 724 which is continuously urged against a locking cam (not shown) on the cam sleeve 666 due to the action of a spring 726. When the distributor is in stopped position and for a portion of a revolution thereafter the follower 724 rests upon the apex of the locking cam thereby permitting the locking fingers 721 to be clear of the finger 722 on the locking lever 723 so that the setting of the bell cranks 671 may be transferred to the interponents 683. Thereafter the follower 724 rides to a low portion of the locking cam to position the finger 722 above the locking finger 721 of the interponents 683 which are in spacing position, and below the locking finger of the interponents 683 which have been moved to marking position. Following the locking of the interponents 683 in their respective selected positions the function bars 693 are selected and the selector levers 694 are caused to sequentially move the bail 701.

After the interponents 683 have been positioned and locked into position the eccentric cam 719 has rotated sufficiently to cause the slot 717 in the collar 718 to be moved to a position to cause the bail 714 to pivot all of the bell cranks 671 to spacing or clockwise position. By this time the start magnet 613 has become deenergized and its armature 712 is permitted to withdraw which causes the bail 714 to become latched as shown in Fig. 21. The locking cam does not cause the withdrawal of the finger 722 from engagement with the locking fingers 721 until after the signal is transmitted which is very nearly at the end of the revolution of the cam sleeve 666; however, because of the yield afforded by the springs 684 between the interponents 683 and levers 679 no harm is done to the mechanism when the bail 714 pivots all of the bell cranks clockwise to spacing or stop position.

*Transmitter controller circuit*

Figure 23:
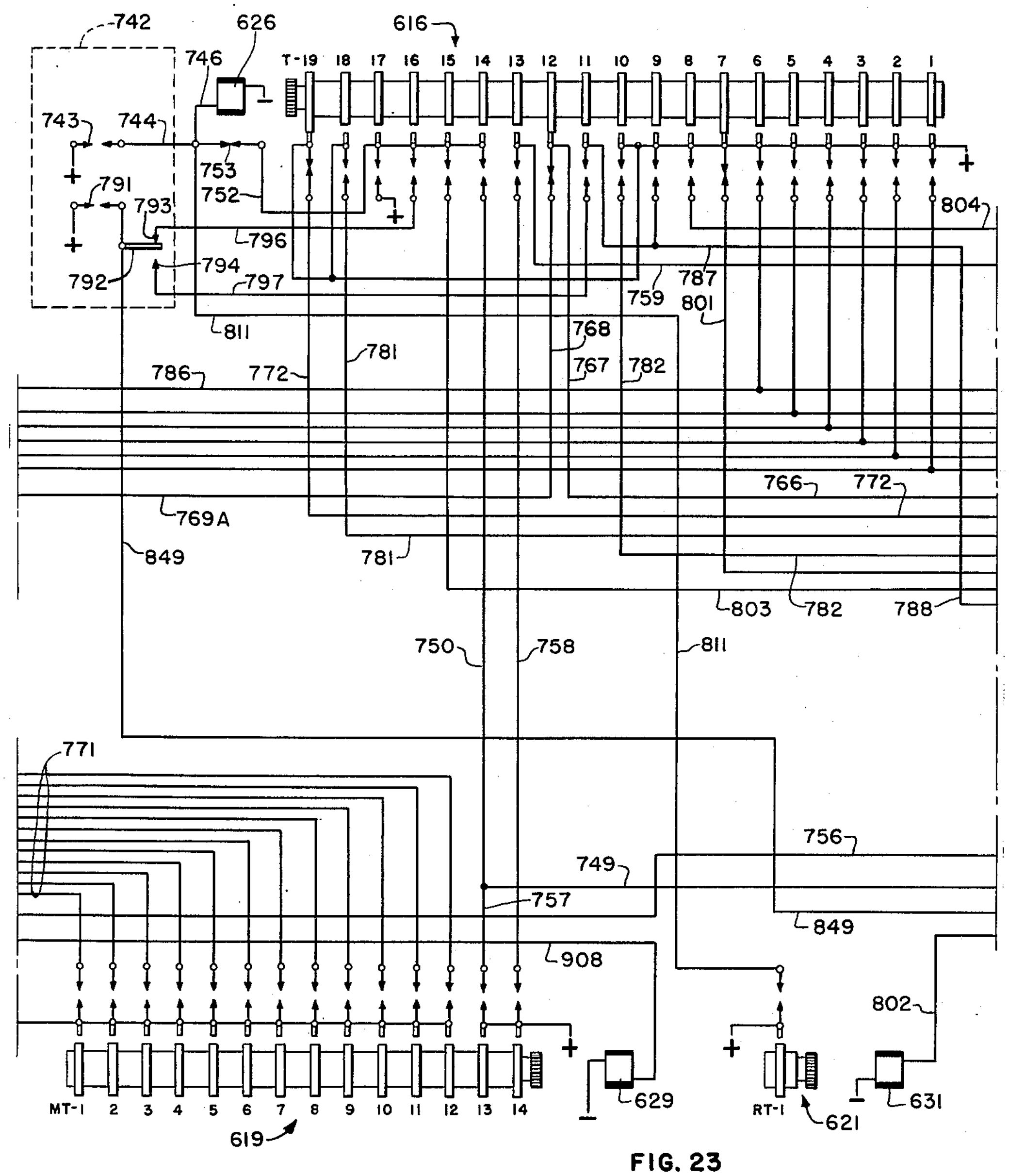

The transmitter controller circuit diagram is shown in Figs. 22, 23 and 24, and includes the transmitters 423 adapted to transmit over the line which the transmitter controller controls. Also included in the circuit diagram are the various sequence switches 616—622 and a distributor mechanism represented schematically by reference numeral 741. The various sequence switches 616—622 are of the type shown in Figs. 19 and 20, and for convenience and ease of understanding and to avoid a multiplicity of reference numerals the cams of the transmitter start sequence switch 616 will be identified as T-1 through T-19; the cams of the address sequence switch 617 as A-1 through A-8; those of the end-of-message sequence switch 618 as M-1 through M-8; those of the multiple transmitter sequence switch 619 as MT-1 through MT-14; the cam of the recycle timer sequence switch 621 as RT-1; and the cams of the round counter sequence switch 622 as RC-1 through RC-3. The contacts associated with the various cams of the sequence switches will be identified as "contact" followed by the reference numeral used to identify the corresponding cam, such as "contact T-1" which identifies the contact associated with the cam T-1. Reference should also be had to Figs. 26 through 31 wherein there is shown a schematic representation of the open and closed conditions of the contacts of the various sequence switches, the blackened portions representing periods or steps of closure of the indicated contacts.

As has already been pointed out the transmitter controller controls the transmission from and to all stations on its associated line. When an outlying station concludes the transmission of a message the last signals in such message constitute an end-of-message signal which initiates a switching operation at the transmitter controller. If a message is being transmitted over the outgoing line it is interrupted and the outlying stations are tested in order to ascertain whether or not one of them has a message to transmit. After the testing operation transmission of the interrupted message is resumed. If, at the time when the switching operation is initiated, there is a switching sequence in progress among the associated multiple transmitters, such switching sequence is permitted to conclude and thereafter the switching operation goes forward. If, at the time when the switching operation is initiated there is no message in any of the multiple transmitters being transmitted or awaiting transmission, there is a condition of a continuous switching sequence in progress. Under these conditions the switching sequence does not conclude, so in order to enable the switching operation to go forward, means are provided in the transmitter controller which function, after all of the associated multiple transmitters are tested, to enable the completion of a switching operation.

The different pieces of apparatus found in the transmitter controller have already been described, however, in order to facilitate an understanding of the invention a brief general description of the operation of the transmitter controller will be made. As has already been stated the transmitter controller is for the purpose of controlling all transmission to or from its associated line. The multiple transmitter sequence switch 619 (Fig. 23) is for the purpose of controlling transmission of all messages to outlying stations on the line associated with the transmitter controller. All of the transmitters designed for the purpose of transmitting messages to outlying stations are like the transmitter 423 shown in Fig. 17. The multiple transmitter sequence switch 619 controls the operation of its associated transmitters by sequentially testing each of them. During these testing operations the multiple transmitter sequence switch 619 is stepped after the completion of transmission by each transmitter. The cams MT-1 to 12 sequentially close their associated contacts MT-1 to 12 and in so doing sequentially condition energizing circuits to the operate magnets 526 of the transmitters associated with the multiple transmitter sequence switch 619. The operate magnets 526 are energized only when the associated transmitter has a message awaiting transmission. If no message is awaiting transmission by one of the tarnsmitters the operate magnet 526 therein is not energized and the stepping magnet 629 steps the multiple transmitter sequence switch 619 to test the next successive transmitter.

The remainder of the apparatus and circuits in the transmitter controller, other than the multiple transmitter sequence switch 619, is principally for the purpose of controlling transmission of messages from outlying stations on the line associated with the transmitter controller. Normally a switching operation, which consists of initiating transmission by an outlying station transmitter upon completion of transmission by a different station transmitter, occurs while one of the central office transmitters is transmitting a message to an outlying station. Under this condition an end-of-message signal (Fig.–Fig.–Y) occurring at the end of the last message transmitted to the central office is received by the selective control unit in a multiple reperforator 742 (Fig. 23) at the central office and causes a contact pair 743 to close. When the contact pair 743 is closed, the transmitter start sequence switch 616 is advanced from its zero to its No. 1 position. Under the condition being described, that is, with a message being transmitted from a central office transmitter, a transmitter start contact 747 in the distributor 741 is closed and because of this a circuit is established which advances the transmitter start sequence switch 616 to its No. 2 position. When the transmitter start sequence switch 616 occupies its No. 2 position its contact T–12 opens thereby breaking a circuit common to all central office transmitters operate magnets 526. This breaking of the circuit to the operate magnets 526 causes transmission by the selected transmitter to cease. When the transmitter start sequence switch 616 advances to its No. 2 position the contact T–17 is closed, as is apparent from Fig. 26, and remains closed through the No. 6 position of the transmitter start sequence switch 616. Because of the fact that the contact T–17 is closed from the No. 2 to the No. 6 positions of the transmitter start sequence switch 616, the switch is stepped automatically from the No. 2 to the No. 7 position thereof. Step No. 3 of the transmitter start sequence switch 616 is an idle step which enables the last signal transmitted by the interrupted central office transmitter to clear through the distributor 741. During steps Nos. 4, 5, 6 and 7 of the transmitter start sequence switch 616, contacts T–1 through T–6, which are connected in series respectively with the code magnets 612 and start magnet 613 in the distributor 741, control the operation of these magnets and cause the distributor to transmit Letters–Fig.–Fig.–Z to cause the outlying station selective control units to prepare for a transmitter Address signal.

While the transmitter start sequence switch 616 occupies its position No. 7, the address sequence switch 617, whose contacts A–1 through A–6 are connected in series respectively with the magnets in the distributor 741, is stepped to cause the transmission of Address signals. The address sequence switch 617 generates successive Address signals upon successive steps thereof. If the station corresponding to a particular Address signal has a message ready for transmission such message is transmitted; however, if it does not have a message ready for transmission such station transmits a special signal back to the central office which is received by the multiple reperforator transmitter 742 (Fig. 23). In response to this special signal the next successive Address signal is transmitted. Simultaneously with each step of the address sequence switch 617, a round counter sequence switch 622 is advanced a step. When the address sequence switch 617 tests all outlying transmitters by transmitting Address signals corresponding thereto, the round counter sequence switch 622 causes a recycle timer 621 to be initiated and immediately causes the transmitter start sequence switch to be advanced to its No. 8 position. A predetermined time interval later the recycle timer 621 initiates a new switching operation by causing the transmitter start sequence switch 616 to be stepped from its zero to its No. 1 position.

When the transmitter sequence switch 616 occupies its position No. 8 its contacts T–1 to T–6 cause a Letters signal to be transmitted by the distributor 741 which restores the outlying station receivers to the condition existing immediately prior to the initiation of the switching operation. In position No. 8 of the transmitter start sequence switch 616 the contact T–17 closes and thereby completes a circuit for stepping the sequence switch 616 to positions No. 9 and zero. In position No. 9 of the transmitter start sequence switch 616 contacts T–1, 2, 4, 5, and 6 close to thereby energize the start magnet 613, and Nos. 1, 2, 4, and 5 of the code magnets 612 in the distributor 741. Also in position No. 9 of the transmitter start sequence switch 616 contact T–10 closes to complete a circuit to the No. 3 code magnet 612 in the distributor 741 through an armature of a shift relay 774 if the shift relay 774 is energized. Whether or not the shift relay 774 is energized depends upon whether the last signal transmitted by the interrupted central office transmtiter prior to the switching operation was an upper case or lower case character. If such signal was lower case then the shift relay 774 is energized and the No. 3 magnet 612 is energized along with the Nos. 1, 2, 4, and 5 code magnets 612 so that a Letters signal is transmitted to the selected outlying station receiver. If the last signal transmitted by the interrupted transmitter was upper case then the shift relay 774 is not energized and the circuit to the No. 3 code magnet 612 cannot be completed. Under this condition a Figures signal is transmitted by the distributor 741 which places the selected outlying station receiver in condition to receive upper case signals.

When a switching operation is started in order to select a different outlying station transmitter, at a time when a switching sequence is taking place between two central office transmitters, the transmitter start contact 747 in the distributor 741 is open and the transmitter start sequence switch 616 cannot advance to its No. 2 position until this contact 747 closes, ordinarily. Therefore, inasmuch as the contact 747 closes and remains closed throughout the transmission of a message by one of the central office transmitters, the switching operation is merely delayed until after a different central office transmitter is selected.

When a switching operation starts at a time when none of the central office transmitters has a message to transmit, the contact 747 in the distributor 741 remains open so that the normal circuit through this contact for stepping the transmitter start sequence switch 616 to its No. 2 position is not available. To remedy this condition and render it possible to complete a switching operation the multiple transmitter sequence switch 619 is provided with the contacts MT–13 and MT–14. These contacts close once during each complete revolution of the multiple transmitter sequence switch 619 and upon closure of the contact MT–13 a circuit is completed which causes the transmitter start sequence switch 616 to be stepped to its No. 2 position to thereby enable the switching operation. Closure of the contact MT–14 causes the end-of-message sequence switch 618 to be stepped to its position No. 1. Later in the switching operation cycle when the transmitter start sequence switch 618 moves to its No. 9 position a circuit is closed through the contacts T–8 and M–8 which causes the end-of-message sequence switch to be stepped through its positions Nos. 1, 2, 3, and 4, coming to rest in its zero position. When the end-of-message sequence switch 618 is stepped in this manner, because of its contacts M–1, 2, 3, 4, 5, and 6 being connected in series respectively with the code magnets 612 and start magnet 613 in the distributor 741, the signal sequence Fig.–Fig.–Y is transmitted by the distributor 741. Inasmuch as no central office transmitter had a message to be transmitted when the switching operation, presently being discussed, was commenced, the last signal sequence transmitted prior to the start of the switching operation was the Fig.–Fig.–Y sequence signifying the end of the message being transmitted by the last operable central office transmitter. It will be recalled that this Fig.–Fig.–Y sequence effects all outlying station receivers by placing all of them in condition to receive switching signals. After the completion of the switching operation whereby a new outlying station transmitter is selected it is necessary to restore the receiving line to the condition it occupied prior thereto, namely the condition for receiving switching signals. The Fig.–Fig.–Y sequence caused to be transmitted by the end of message sequence switch 618 has the effect of so restoring the outlying station receiver to switching signal receiving condition.

Having in mind the general principles of the operation of the transmitter controller circuit diagram disclosed in Figs. 22–24, the following detailed description of the operation thereof will be more readily understood.

Figure 26:
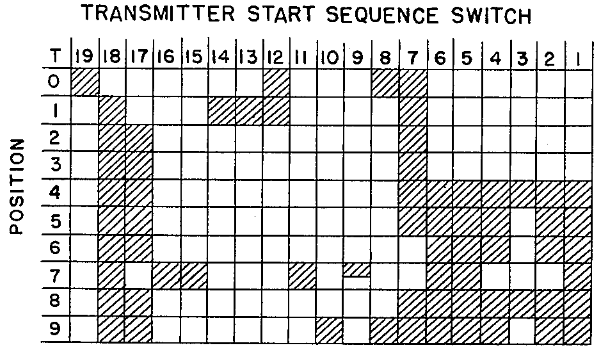
Figs. 26–31 are schematic diagrams of the various sequence switches shown in Figs. 22–24, the darkened portions representing periods of closure of the associated contacts.

The multiple reperforator transmitter, which receives the messages from the associated incoming line which is represented schematically by reference numeral 742 in Fig. 23, has a special function mechanism, similar to that already described, which, in response to an end-of-message signal (Fig.–Fig.–Y) in an incoming message from an outlying station, causes the contact pair 743 to close. Closure of contact pair 743, which is the first event in the switching operation whereby transmission from a different outlying station is initiated, momentarily completes a circuit from positive battery, through the closed contact pair 743, over conductors 744 and 746, through the stepping magnet 626 of the transmitter start sequence switch 616, to negative battery. In response to the energization of the stepping magnet 626 the transmitter start sequence switch is advanced from zero to No. 1 position. In moving to the No. 1 position contacts T–13, T–14, and T–18 close as shown in Fig. 26. A contact 747 in the distributor 741 (Fig. 24) is closed during the transmission of a message by one of the multiple transmitters 748–0, 9 (Fig. 22), all of which are the same type of transmitters as the transmitter 423 shown in Fig. 17, but the contact 747 is open during a switching sequence which occurs when transmission by one of the transmitters 748–0, 9 is completed and transmission from another is initiated. Assuming that a message is being transmitted, then in response to the closure of contact T–14 a circuit is established from positive battery, through contact 747, over a conductor 749, over a conductor 750, through closed contact T–14, over a conductor 752, through a normally closed, manually operable contact switch 753, over conductor 746, through stepping magnet 626, to negative battery. The stepping magnet 626 being energized, the transmitter start sequence switch is moved to its No. 2 position.

The multiple transmitter sequence switch 619 (Fig. 23) controls the transmission of messages by the transmitters 748–0, 9 by sequentially testing those transmitters for awaiting messages. In order to test the transmitters the MT contacts are sequentially closed thereby sequentially completing circuits through each of the operate magnets 526. When one of the transmitters 748–0, 9 completes transmitting a message, an end-of-message signal momentarily causes an end-of-message contact 754 (Fig. 24) in the transmitter distributor 741 to open, thus breaking a previously established circuit from positive battery through the end-of-message contact 754, over a lead 756, through a closed armature 904 and contact 916, through the right hand winding of a start relay 907 (Fig. 22), to negative battery. The contact 754 which opened momentarily in response to the end-of-message signal, also causes the de-energization of the left hand winding of the double wound relay 907 due to the breaking of a previously established circuit extending from positive battery, through the contact 754, over a lead 913, through a closed contact 911 and armature 909 of a time insert relay 912 (which for the present may be considered as constantly de-energized), through contact M–8 of the end-of-message sequence switch 618, over a lead 762, through a contact 763, over leads 764, 766, and 767, through closed contact T–12 of the transmitter start sequence switch 616, over leads 768 and 769A, through manual bypass contact 770, through the energized operate magnet 526, through tight tape contact 769, over a lead 771, through one of the contacts MT–1 through MT–12, over a lead 914, through the left hand winding of the double wound relay 907, to negative battery. Therefore both windings of double wound relay 907 are de-energized and the armature 904 falls back to make with a contact 906. Since the opening of contact 754 is only momentary in response to an end-of-message signal, upon its subsequent closure immediately thereafter, a circuit is established from positive battery through the contact 754, over the lead 756, through the armature 904 and contact 906, over a lead 908, through the stepping magnet 629 of the multiple transmitter sequence switch 619, to negative battery. This causes the multiple transmitter sequence switch 619 to commence stepping during which time, circuits are conditioned for successive operate magnets 526. Upon finding an operate magnet 526 associated with a transmitter 748 having an awaiting message, the left hand winding of the double wound relay 907 becomes energized and pulls up the armature 904, thereby breaking the circuit to the stepping magnet 629.

If a switching sequence among the multiple transmitters 748–0 to 748–9 is in process the contact 747 is open so that the above described circuit for energizing the stepping magnet 626 is not complete until the switching sequence is completed whereupon the contact 747 closes. If a switching sequence is in process and none of the transmitters 748–0 through 748–9 have a message ready for transmission the contact 747 remains open thereby preventing the energization of stepping magnet 626. Under these conditions since the contact 754 is closed a circuit is completed to the stepping magnet 629 of the multiple transmitter sequence switch 619 and because none of the transmitters 748–0 to 748–9 have messages ready for transmission, the stepping magnet 629 continuously causes the multiple transmitter sequence switch to rotate. As is apparent from Fig. 29, a different operate magnet of the transmitters 748-0 to 748-9 is tested until the multiple transmitter sequence switch is stepped to the point when contacts MT-13 and MT-14 are closed. Closure of the contacts MT-13 and MT-14 simulates the conditions existing when one of the transmitters 748-0, 9 is transmitting and the contact 747 is closed. Closure of contacts MT-13 completes a circuit to the stepping magnet 626 of the transmitter start sequence switch 616 from positive battery, through closed contact MT-13, over a conductor 757, over conductor 750, through presently closed contact T-14, over conductor 752, through closed switch 753, over conductor 746, through stepping magnet 626, to negative battery. This energization of the stepping magnet 626 causes the transmitter start sequence switch to be stepped to position No. 2.

At the same time that contact MT-13 closes, contact MT-14 also closes which completes a circuit to the stepping magnet 628 of the end-of-message sequence switch 618 which extends from positive battery through closed contact MT-14, over a conductor 758, through closed contact T-13, which is closed while the transmitter start sequence switch is in its No. 1 position, over conductors 759 and 761, through the stepping magnet 628 of the end-of-message sequence switch 618, to negative battery. Energization of the end-of-message sequence switch stepping magnet 628 causes the end-of-message sequence switch to advance to its No. 1 position with contact M-7 closed.

When transmission of a message by one of the multiple transmitters 748-0 to 748-9 is to be interrupted in order to initiate a switching operation to thereby permit a different outlying station to be tested for a message awaiting transmission, it becomes necessary that means be provided for determining, upon interruption, whether transmission is taking place in letters or shift position. For this purpose a contact 771 in the distributor 741 is provided which responds to shift and unshift signals as received on the magnets 612. Whenever a letters or unshift signal is received on the magnets 612 the contact 771 closes, and whenever a figures or shift signal is received the contact 771 opens. As is apparent from Fig. 26, when the transmitter start sequence switch is in its zero position contact T-19 is closed, so therefore at this time, which represents normal conditions, when the contact 771 is closed in response to an unshift signal, a circuit is established from positive battery, through closed contact T-19, over a conductor 772, through closed contact 771, over a conductor 773, through the shift relay 774 to negative battery. It is therefore apparent that under normal conditions the relay 774 is energized and de-energized in accordance with the type of signals received by magnets 612, being energized in response to an unshift or letters signal and de-energized in response to a figures or shift signal. Energization of the relay 774 causes it to pull up its armatures 776 and 777 which make respectively with contacts 778 and 779. Closure of contacts 778 and 779 with the armatures 776 and 777 while the transmitter start sequence switch 616 occupies its zero position is immaterial for contacts T-10 and T-18 are open at this time.

When the transmitter start sequence switch 616 advances to its No. 1 position contact T-18 closes, as is shown in Fig. 26, and if the relay 774 is energized due to the closure of contact 771, a locking circuit is established for the relay 774 which extends from positive battery through closed contact T-18, over a conductor 781, through closed contact 778 and armature 776, through the relay 774, to negative battery to thereby lock the relay 774 in energized condition. It will be noted that the contact T-19 opens when the transmitter start sequence switch moves to its No. 1 position; however, the falling away of the armature 776 from relay 774 does not occur until after the above described locking circuit for relay 774 is established. Obviously if the relay 774 is de-energized by reason of the fact that contact 771 is open when the transmitter start sequence switch 616 advances to No. 1 position, no locking circuit can be established for the relay 774.

When the armature 777 is pulled up to make with the contact 779 a circuit for the No. 3 magnet 612 in the distributor 741 is conditioned from positive battery, through contact T-10 which is closed at a later step of the transmitter start sequence switch 616, over a conductor 782, through closed armature 777 and contact 779, over a conductor 783, over the line 784-3, through the No. 3 magnet 612, to negative battery. Therefore, when the contact T-10 is closed the No. 3 magnet 612 is pulsed.

When the transmitter start sequence switch 616 is moved to its No. 2 position contact T-12 is opened thereby breaking the common return circuit for the operate magnets 526 of the multiple transmitters 748-0, 9 from positive battery, through contact M-8, over a conductor 762, through a contact 763, which is closed during transmission by one of the multiple transmitters, over conductors 764, 766 and 767, through now closed contact T-12, over conductors 768 and 769A through one of the manual by-pass contacts 770, through one of the operate magnets 526, through one of the normally closed tight tape contacts 769, over one of the conductors 771, through one of the MT contacts, over the lead 914, through the left hand winding of the double wound relay 907, to negative battery. Movement of the transmitter start sequence switch 616 to No. 2 position also causes contacts T-13 and T-14 to open and contact T-17 to close. Opening of contact T-14 breaks the circuit to the stepping magnet 626 through either contact MT-13 or 747. Opening of contact T-13 breaks the circuit to the stepping magnet 628 of the end-of-message sequence switch 618. Closure of contact T-17 energizes the stepping magnet 626 for steps Nos. 3, 4, 5, 6 and 7 of the transmitter start sequence switch 616, over a circuit from positive battery through contact T-17, conductor 752, closed manual switch 753, conductor 746, stepping magnet 626, to negative battery.

Position No. 3 of the transmitter start sequence switch 616 is an idle position, the function of which is to enable the transmitter distributor mechanism 741 to utilize the last signal received on the magnets 612 and to enable the transmission of such signal over the outgoing line 112. Since contact T-17 remains closed in the No. 3 position of the transmitter start sequence switch 616, the stepping magnet 626 is energized over the above described circuit and advances the transmitter start sequence switch to position No. 4.

Position No. 4 of the transmitter start sequence switch 616 causes contacts T-1 through T-6 to close. Closure of contacts T-1 through T–5 completes circuits from positive battery, through the respective contacts T–1 through T–5, over conductors 784–1 through 784–5 through magnets 612 to negative battery. Closure of contact T–6 completes a circuit from positive battery through contact T–6, over a conductor 786, through the start magnet 613, to negative battery. Energization of all the magnets 612 and 613 causes a letters signal to be transmitted over the line 112 to the outlying station receivers.

Since, in the No. 4 position of the transmitter start sequence switch 616, contact T–17 remains closed the stepping magnet 626 is energized to advance the transmitter start sequence switch 616 to position No. 5. In the No. 5 position contacts T–1, T–2, T–4, T–5 and T–6 are closed which complete circuits from positive battery to the start magnet 613 and Nos. 1, 2, 4 and 5 magnets 612. Energization of this group of magnets 612 causes a Fig. signal to be transmitted over the line 112.

In the No. 5 position of the transmitter start sequence switch 616 contact T–17 remains closed and the stepping magnet 626 is energized to advance the transmitter start sequence switch to No. 6 position. Contacts T–1, T–2, T–4, T–5 and T–6 are closed in the No. 6 position of the transmitter start sequence switch 616 and obvious circuits are completed to cause a second Fig. signal to be transmitted over the line 112. The contact T–17 remains closed in the No. 6 position of the transmitter start sequence switch 616 and the switch 616 is advanced to No. 7 position due to the energization of the stepping magnet 626. In the No. 7 position of the transmitter start sequence switch 616 the contacts T–1, T–5 and T–6 are closed to cause a Z signal to be transmitted over the line 112.

While the transmitter start sequence switch 616 advances to its No. 7 position the contact T–9 closes momentarily to energize the stepping magnet 627 of the address sequence switch 617 over a circuit extending from positive battery, through closed contact T–9, over conductors 787 and 788 through a normally closed contact RC–1, over conductor 789, through the stepping magnet 627, to negative battery. The stepping magnet 627 is, therefore, energized momentarily and in response advances the address sequence switch 617 a step. In advancing a step the contact A–6 is invariably closed momentarily for energizing the start magnet 613 and a permutation of the contacts A–1 to A–5 are closed momentarily to cause a station address signal to be transmitted over the line 112.

It will be recalled how, in the description of the transmitter control circuit shown in Fig. 15, the contact 247 closed in response to the receipt of Fig.–Fig.–Z and how the contact 249 closed in response to an Address signal. When this Address signal is transmitted by the address sequence switch 617, the outlying station responds by sending either a message or a blank signal. A universal contact 791 in the multiple reperforator transmitter closes in response to the transmission of either the message or the blank signal. A contact swinger 792 moves to the position shown, engaging a contact point 793 in response to a message transmitted from an outlying station, and moves into engagement with a contact point 794 in response to a blank signal.

When the transmitter start sequence switch 616 moves to its No. 7 position, contacts T–11, T–15 and T–16 also close. Therefore, when an outlying station transmits a message causing the swinger 792 to make with contact point 793, a circuit is established from positive battery through the universal contact 791, through contact swinger 792 and contact point 793, over a conductor 796, through closed contact T–16, over a conductor 752, through closed manual contact 753, over a conductor 748, through the transmitter start sequence switch stepping magnet 626, to negative battery. The transmitter start sequence switch 616 is then stepped to position No. 8. If, however, the outlying station does not have a message to transmit and instead transmits a blank signal, the swinger 792 makes with the contact point 794 in response thereto. A circuit in such case is established from positive battery through closed contact 791, through contact swinger 792 and contact point 794, over a conductor 797, through closed contact T–11, over conductors 787 and 788, through closed contact RC–1, over conductor 789, through stepping magnet 627 to negative battery. In response to the energization of the stepping magnet 627 the address sequence switch 617 is stepped one step and the contacts A–1 through A–5 are permutably closed to cause the transmission of an address signal corresponding to the next station on the line 112. Different stations are called normally until one of them responds with a message which causes the transmitter start sequence switch to advance to position No. 8.

With each step of the address sequence switch 617 the contact A–7 closes momentarily which establishes a circuit from positive battery through the momentarily closed contact A–7, over a conductor 798, through the round counter sequence switch stepping magnet 632, to negative battery. The round counter sequence switch 622 has the same number of stepping positions as the address sequence switch 617 and consequently when the address sequence switch 617 makes a complete revolution without having a station respond with a message, the round counter sequence switch 622 also makes a complete revolution.

Figure 31:
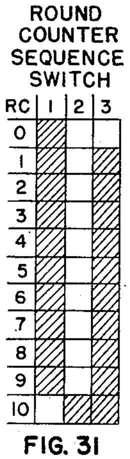

Reference to Figs. 26 and 31 will show that contact T–7 is closed in all except the Nos. 6 and 7 positions of the transmitter start sequence switch 616, whereas the contact RC–3 is closed in all except the zero position of the round counter sequence switch 622. A circuit including the two contacts T–7 and RC–3 extends from positive battery through contact T–7, over a conductor 801, through contact RC–3, through the round counter sequence switch stepping magnet 632, to negative battery. Because the contact T–7 is open in the No. 7 position of the transmitter start sequence switch 616, the stepping magnet 632 is not energized at this time over the above described circuit. It will be recalled that it is while the transmitter start sequence switch occupies its No. 7 position that the address sequence switch 617 is stepped to call the outlying stations. Since the contact A–7 is closed momentarily with each step of the address sequence switch 617, the round counter sequence switch 622 is stepped once with each step of the address sequence switch 617.

When one of the outlying stations responds by transmitting a message it will be recalled that the transmitter start sequence switch 616 is stepped to its No. 8 position, which causes contact T–7 to close. The circuit to the stepping magnet 632 is thereby completed and the round counter sequence switch 622 is stepped to its zero position. Under these conditions, since the contact T–17 is closed when the transmitter start sequence switch 616 is in its Nos. 8 and 9 positions, the transmitter start sequence switch is stepped to its zero position where it is ready for a subsequent end-of-message signal in the message transmitted by the responding outlying station whereupon another switching operation is initiated.

Under those conditions when no outlying station has a message awaiting transmission, all of the outlying station addresses are transmitted as the address sequence switch 617 is stepped through a complete revolution. Simultaneously the round counter sequence switch 622 is stepped through its positions. Upon reaching the No. 10 position, or the position corresponding to a complete revolution of the address sequence switch 617, the round counter sequence switch 622 closes contact RC–2 and opens contact RC–1. Opening of contact RC–1 breaks the circuit to the address sequence switch stepping magnet 627 so that the blank signal transmitted by the last station will not cause the stepping of the address sequence switch 617. With the contact RC–2 closed, upon the receipt of the blank signal from the last outlying station to be called a circuit is established from positive battery, through the universal contact 791, through contact swinger 792 and contact point 794, over the conductor 797, through contact T–11, over conductors 787 and 788, through contact RC–2, to a point where the circuit splits, one branch going over a conductor 802, through the stepping magnet 631 of a recycle timer sequence switch 621, to negative battery, and the other branch going over a conductor 803, through presently closed contact T–15, over the conductor 752, through the manual control contact 753, over the conductor 746, through the stepping magnet 626 to negative battery. The circuit to the stepping magnet 626 causes the transmitter start sequence switch 616 to advance to No. 8 position.

In the No. 8 position of the transmitter start sequence switch 616 contacts T–1 through T–6 close which cause current to be placed on all magnets 612 and 613. Thus a letters or end-of-address signal is transmitted to all outlying stations restoring all stations, which had been receiving when the switching operation was initiated, to receiving condition. Since the contact T–17 is closed in the No. 8 position of the transmitter start sequence switch 616 the stepping magnet 626 advances the sequence switch 616 to position No. 9. In the No. 9 position contacts T–1, T–2, T–4, T–5, T–6 and T–10 close to restore the outlying station receiver to the condition (shift or unshift) it was in when transmission was interrupted by the switching operation. Closure of contacts T–1, T–2, T–4 and T–5 place current on Nos. 1, 2, 4 and 5 of magnets 612 which causes a shift signal to be transmitted over the line 112. Recalling that in case the interrupted message at the time the switching operation was initiated was in unshift or letters condition, that the shift relay 774 was energized and locked, the closure of contact T–10 causes the No. 3 magnet 612 to be energized over a previously described circuit which includes the armature 777. Energization of the No. 3 magnet 612 together with the energization of Nos. 1, 2, 4 and 5 magnets 612 enables the transmission of a letters or unshift signal over line 112 to restore the receiving printers to unshift condition.

It should be recalled that the end-of-message sequence switch 618 was advanced to its position No. 1 when the contact MT–14 was closed and while the transmitter start sequence switch 616 occupied its No. 1 position. Under these conditions there was a switching sequence taking place among the multiple transmitters 748–0 through 748–9. Because of this switching sequence taking place the signals transmitted over line 112, immediately preceding the switching sequence of multiple transmitters 748–0 to 748–9, consisted of Fig.–Fig.–Y, an end-of-message signal. It is, therefore, necessary, upon the conclusion of the switching operation of testing the outlying stations for awaiting messages, that the line 112 be restored to the same condition as it occupied when interrupted by the switching operation. To accomplish this a contact T–8 is provided which, when the transmitter start sequence switch 616 occupies its No. 9 position, completes a circuit from positive battery, through contact T–8, over a conductor 804, through contact M–7, over a conductor 806, over the conductor 761, through the stepping magnet 628 of the end-of-message sequence switch 618, to negative battery. As a result of the completion of this circuit the stepping magnet 628 causes the end-of-message sequence switch 618 to be stepped through its positions Nos. 2, 3 and 4 which causes contacts M–1 through M–6 to be sequentially permutatably closed so as to impress Fig.–Fig.–Y, an end-of-message signal, on the magnets 612, the switch 618 coming to rest in its zero position.

When the last station in the sequence of stations called replies with a blank signal indicating no message is available for transmission, which causes the stepping magnet 631 to be pulsed, the recycle timer sequence switch 621 commences a timing operation. When the stepping magnet 631 is energized the recycle timer sequence switch rotates through a complete revolution and upon the completion thereof a contact RT–1 is closed. Closure of the contact RT–1 completes a circuit from positive battery through the contact RT–1, over a conductor 811, over the conductor 746, through the stepping magnet 626, to negative battery. The time interval required for the recycle timer sequence switch 621 to travel from its zero position to its last position is of the order of two to five minutes; however, this interval could be made to last any other length of time. By the time the circuit to the stepping magnet 626 will have been established the transmitter start sequence switch 616 will have been advanced to its zero position so, therefore, the stepping caused by the circuit through contact RT–1 initiates another switching operation. The recycle timer sequence switch 621 then remains in its zero position until the stepping magnet 631 is again energized when all of the outlying stations fail to have messages ready for transmission.

*Line monitor*

Figure 32:
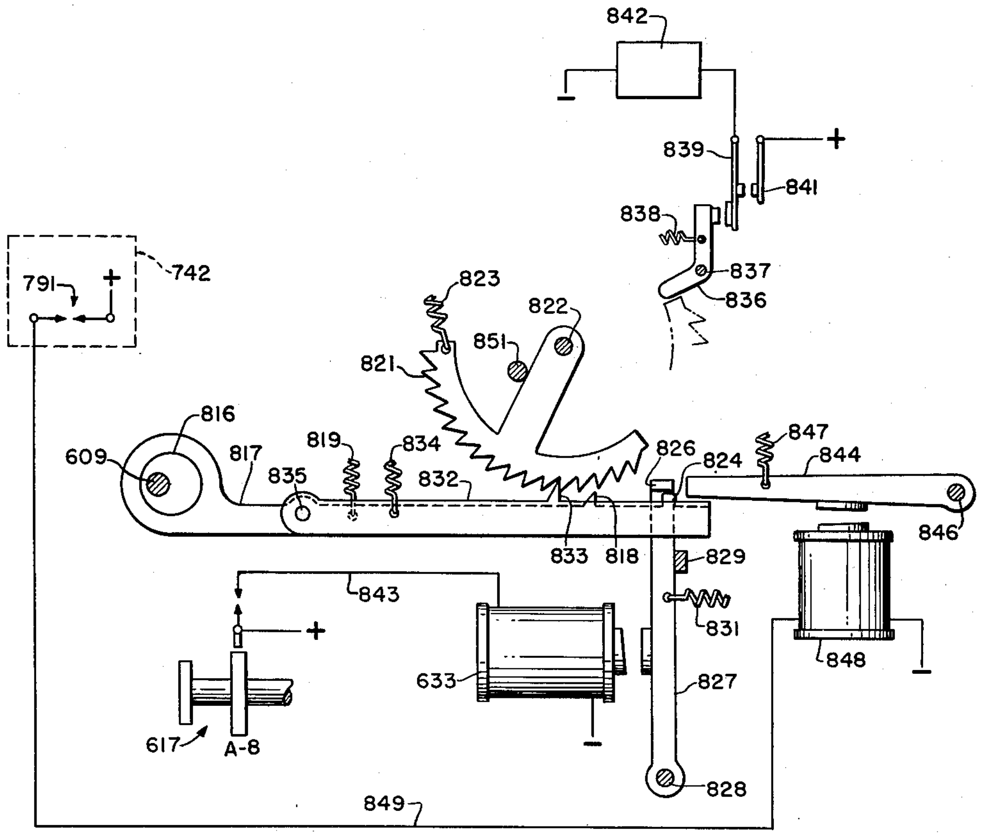
Fig. 32 is a schematic diagram of the line monitor or no-response alarm.

Reference should be made to Fig. 32 wherein a no response alarm is shown. This alarm contains a timer device which is tripped off each time an Address signal is transmitted and if, after a given time, there has been no response from the outlying station called, an alarm circuit is completed which informs an attendant that the outlying station has not responded.

In the no response alarm shown in Fig. 32 the continuously rotating shaft 609 has an eccentric cam 816 secured thereto which is adapted to reciprocate a pawl 817 having a tooth 818 thereon. The pawl 817 is continuously urged in a counterclockwise direction by means of a tension spring 819 so that the tooth 818 is urged continuously towards a ratchet 821. The ratchet 821 is mounted pivotally at 822 and is urged continuously in a clockwise direction by a spring 823. The pawl 817 has a lug 824 cooperable with a lateral portion 826 on an armature 827 mounted pivotally at 828. The armature 827 is urged continuously clockwise towards a stop 829 by a spring 831, and when the armature is against the stop 829 the projection 826 engages the lug 824 to retain the tooth 818 disengaged from the ratchet 821. Upon the energization of the magnet 633 the armature 827 is pulled up to a position so that the lug 824 is free of the projection 826 thereby permitting the tooth 818 to rise under the urging of the spring 819 into engagement with the ratchet 821.

A stop pawl or detent 832 which also has a lug 824 adapted to be engaged by the projection 826, has a tooth 833 and is urged by a spring 834 counterclockwise about pivot point 835 towards the ratchet 821. Assuming that the lug 824 is free of the projection 826, as the shaft 609 rotates the eccentric 816 causes the pawl 817 to be reciprocated whereby the tooth 818 steps the ratchet 821 counterclockwise. The tooth 833 on the stop pawl 832 engages a tooth on the ratchet 821 after each stepping operation and thereby retains the ratchet 821 in its stepped position. When the ratchet 821 has been stepped counterclockwise sufficiently it engages a bell crank 836 which is pivoted at 837. The bell crank 836 is pivoted counterclockwise by the ratchet 821 against the action of a spring 838 to permit a contact swinger 839 to close with a contact point 841. Closure of the swinger 839 with the contact 841 completes an obvious circuit to an alarm 842.

Figure 27:
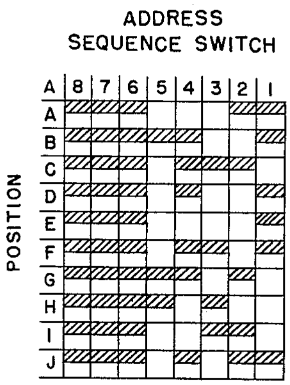
Figure 28:
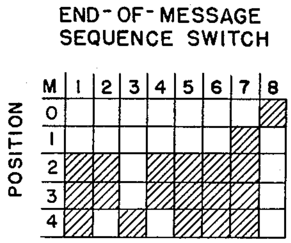
Figure 29:
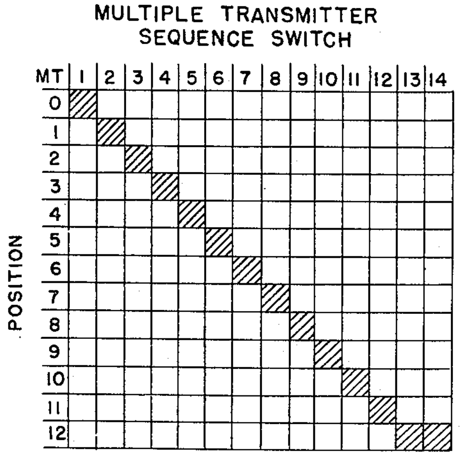
Figure 30:
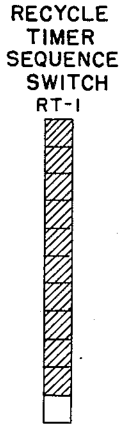

The circuit for energizing the magnet 633 which initiates the stepping operation of the ratchet 821 extends from positive battery, through the contact A–8 of the address sequence switch 617, over a conductor 843, through the magnet 633, to negative battery. Referring to Fig. 27 it is apparent that the magnet 633 is energized with each step of the address sequence switch 617, and therefore, the magnet 633 is energized each time an Address signal is transmitted over the outgoing line 112.

An armature 844 pivotally mounted at 846 and spring biased in a clockwise direction by a spring 847 is adapted to engage both pawls 817 and 832 when attracted by its magnet 848. When the armature 844 is attracted, the teeth 818 and 833 are withdrawn from engagement with the ratchet 821, and because the magnet 633 is de-energized when the magnet 848 is energized, the spring 831 moves the armature 827 against the stop 829 thereby causing the projection 826 to engage the lug 824 to retain the tooth 818 disengaged from the ratchet 821. When the projection 826 and lug 824 are engaged in this manner reciprocation of the pawl 817 by the eccentric 816 is of no effect for the reason that the lug 824 merely slides back and forth beneath the projection 826.

It is to be recalled that upon the transmission of an Address signal by the address sequence switch 617, the outlying called station, when functioning normally, transmits either its waiting message or a blank signal indicating that it has no message awaiting transmission. Under both of these conditions the universal contact 791 in the multiple reperforator transmitter 742 closes momentarily. Upon the closure of the universal contact 791 a circuit is established from positive battery, through the closed contact 791, over a lead 849 through the magnet 848, to negative battery. When the magnet 633 receives its pulse by reason of the momentary closure of contact A–8, the stepping of the ratchet 821 commences. As is apparent from Fig. 27, the contact A–8 closes only momentarily with each stepping of the address sequence switch 617 which is all that is necessary to start the stepping of the ratchet 821. When the magnet 848 is subsequently energized upon response from the outlying called station which causes the closure of the universal contact 791, the armature 844 is pulled up and thereby withdraws the teeth 818 and 833 from engagement with the ratchet 821. Freeing of the ratchet 821 from the teeth 818 and 833 permits the spring 823 to return the ratchet 821 clockwise to the point where it strikes an abutment post 851. When the armature 844 pulls the pawls 817 and 832 downwardly the projection 826 engages lug 824 to retain the pawl 817 disengaged from the ratchet 821. The transmission of a subsequent Address signal by the address sequence switch 617 then commences another operation of the timer mechanism.

The no response alarm mechanism, described immediately above provides a very efficient line monitor. When the transmitter controller address sequence switch transmits an Address signal to an outlying station, the outlying station transmitter normally responds by sending its message or by transmitting a blank signal indicating that no message is awaiting transmission. In order for one of these responses to be received correctly at the transmitter controller, the address sequence switch 617 in the transmitter controller must transmit the Address signal correctly, the selective control unit at the outlying station corresponding to the Address signal must receive the signal and respond by selecting its associated transmitter, the transmitter must function properly, and the selective control unit in the multiple reperforator transmitter must respond correctly. In the event that all of the above operations are not carried through properly the alarm 842 is actuated after a fixed time interval. It is apparent that one of these checks is made during each switching operation so that no part of the line circuit or station apparatus can be out of service for more than a few minutes before the alarm is given. Furthermore, in order to provide this line monitor, no delay or special routine in the handling of traffic is necessary.

*Group and broadcast transmission*

In smaller systems, particularly those of the single central office type as has been heretofore described, it is desirable that provision be made for handling group or broadcast transmission of messages. A group message is used herein as meaning a message directed to a group of stations and a broadcast message is one directed to all stations. By using the selective control units as heretofore described a group or broadcast message may be handled as a multiple address message. When done in this manner each station address must be listed in the address portion of the message. When the quantity of messages addressed to more than one station increases sufficiently, handling of all of these messages as multiple address messages is obviously inefficient. It becomes more practical to provide additional address function mechanisms in the various selective control units involved.

To enable group or broadcast transmission to the outlying stations on a line, the selective control units at those stations are merely equipped with group or broadcast function bars which respond to a group or broadcast signal. In response to the group or broadcast signal the stations having group or broadcast function bars are conditioned for receiving the message. The group or broadcast function bars are provided in addition to the normal Address function bar.

In the selective control units of the multiple reperforator transmitters the reperforator position corresponding to each reperforator which is to reperforate the group or broadcast messages, is provided with additional function bars which together with the normal address function bar, enable the reperforator to reperforate single station addessed, group, or broadcast messages. These additional function bars respond to the proper signals so as to render the associated reperforator operable in response to group addresses or broadcast addresses.

Referring to the basic system shown in Fig. 1, a number of variations are possible by the use of group and broadcast signals. In the basic system it will be recalled that a two letter address code is used, the first letter designating the line and the second letter designating the station on the line to which a message is addressed. By providing all stations on a line, with a broadcast function bar, a message can be transmitted to all stations on the line by using an address consisting of a line identification signal and the station broadcast signal. The reperforator associated with the line is selected by the line identification signal, and all stations on the line are selected by the station broadcast signal. By using a group line signal followed by a broadcast station signal a message can be transmitted to all stations on a group of lines, by using a broadcast line signal and a broadcast station signal a message can be sent to all stations on all lines. Another variation can be obtained by using a broadcast line signal followed by a station address signal, whereby the station having the station address on all lines receives the message. Obviously many other variations are possible.

*Single priority message service*

Figure 33:
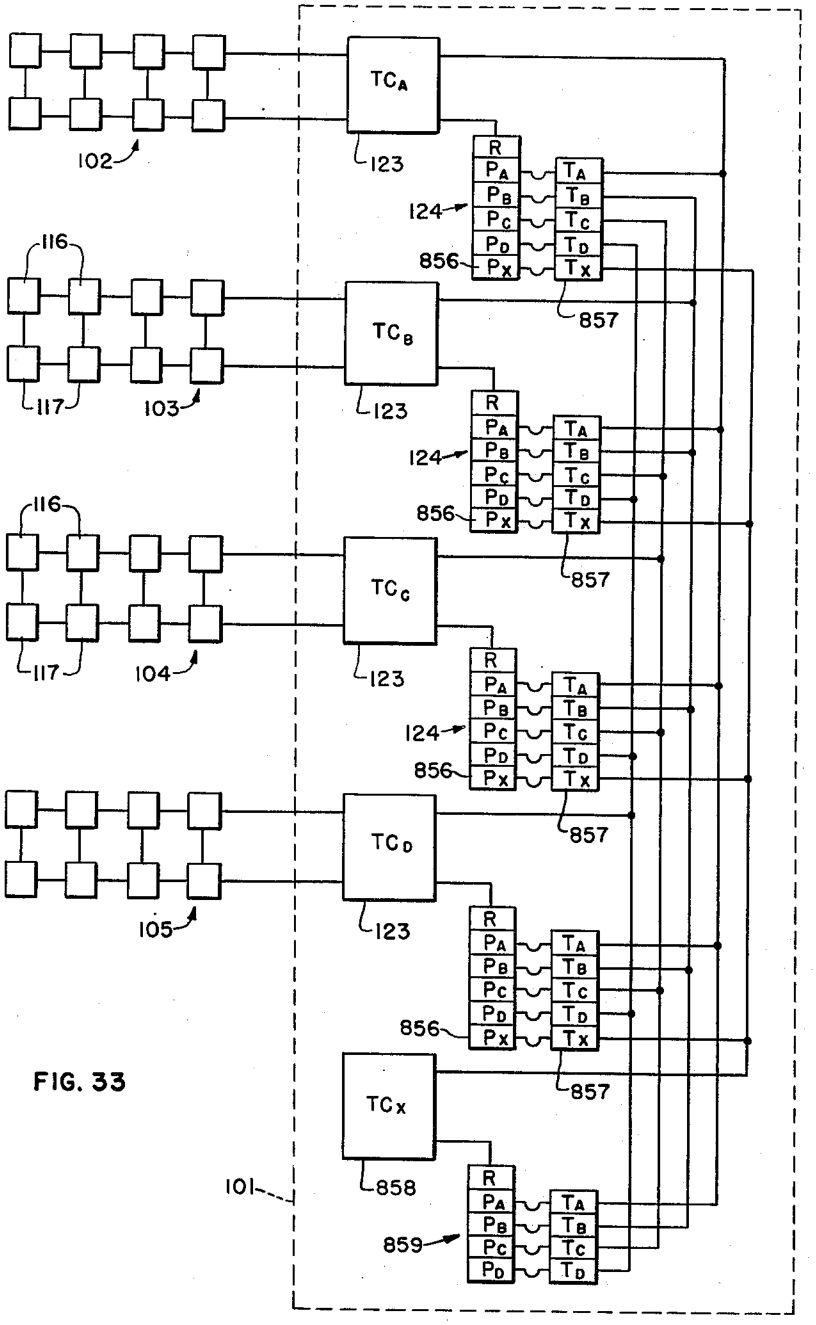
Fig. 33 is a schematic diagram of the basic system having single priority message service.
Figures 34, 35:
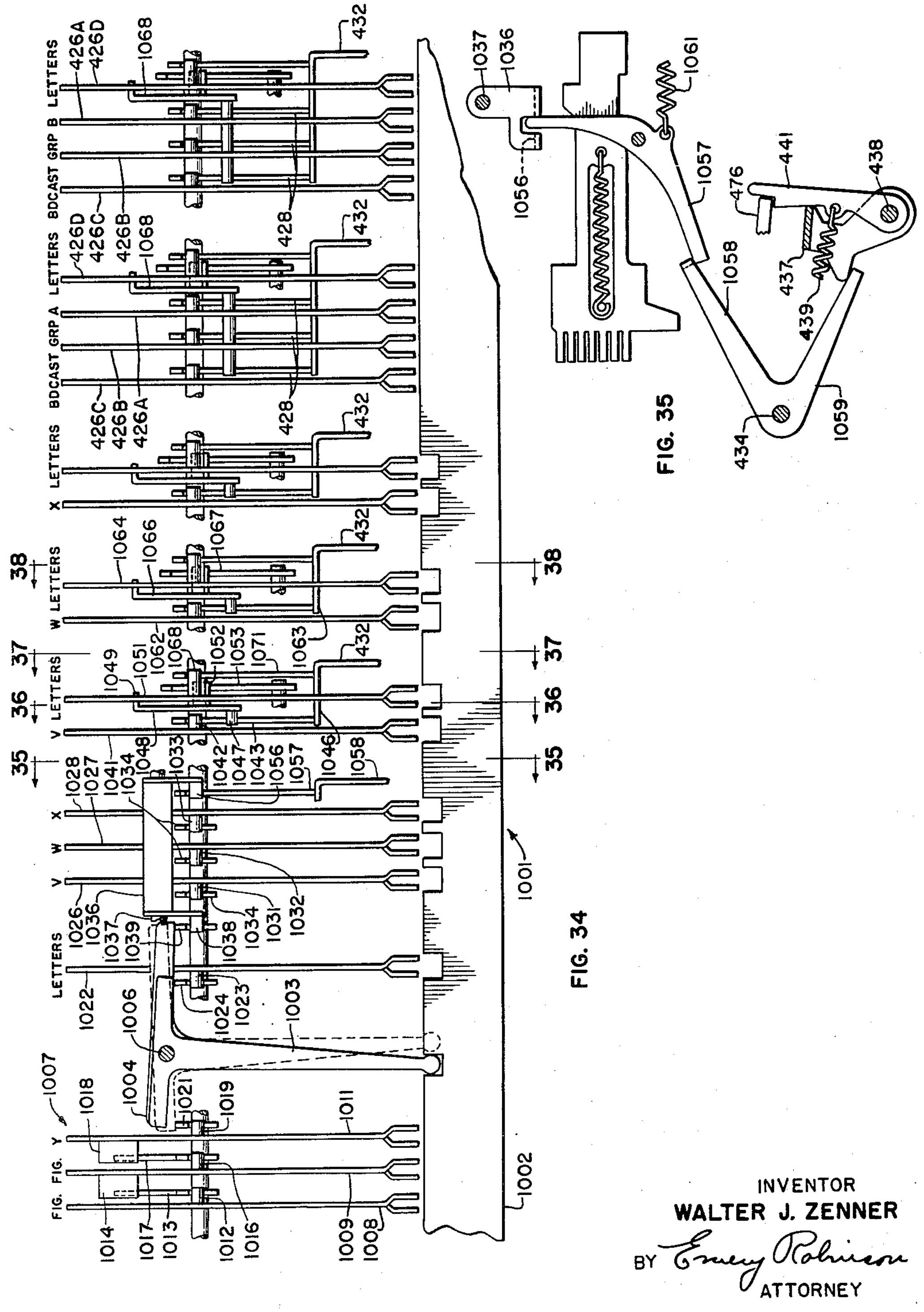
Fig. 34 is a fragmentary view of a selective control unit modified for use in the multiple reperforator transmitter used in a system providing priority and deferred message service.
Fig. 35 is a sectional view taken approximately on the line 35—35 of Fig. 34.
Figure 36:
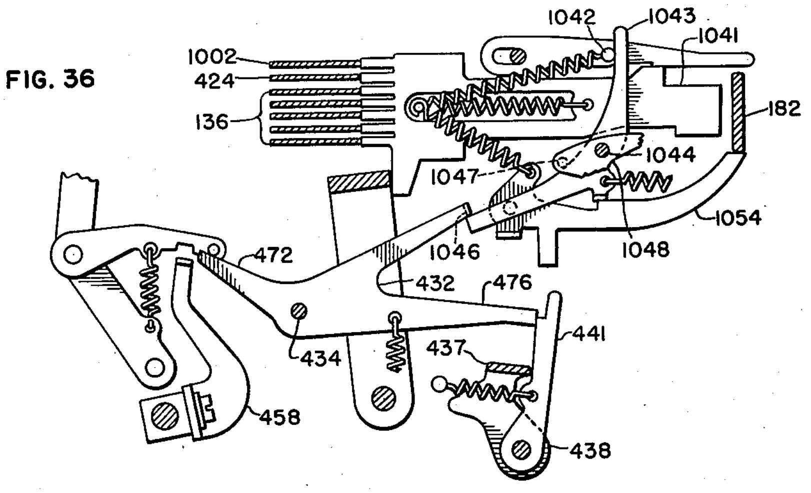
Fig. 36 is a sectional view taken approximately on the line 36—36 of Fig. 34.
Figure 37:
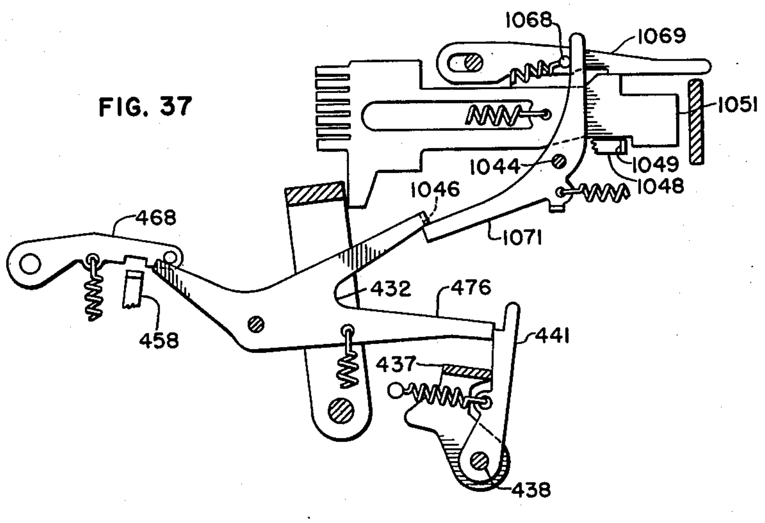
Fig. 37 is a sectional view taken approximately on the line 37—37 of Fig. 34.
Figure 38:
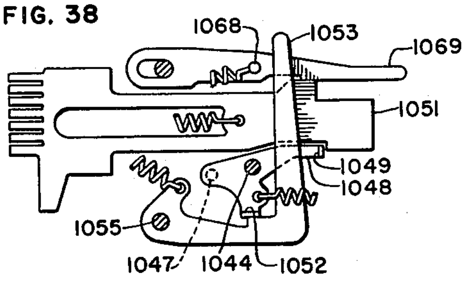
Fig. 38 is a sectional view taken approximately on the line 38—38 of Fig. 34.

Fig. 33 shows the basic system having single priority message service. The central office 101 is provided with the transmitter controllers 123 and multiple reperforator transmitters 124, and has a plurality of associated lines 102—105, each having a plurality of printing receivers 116 and transmitters 117 located at outlying stations on the lines. Each of the transmitter controllers 123 and muliple reperforator transmitters 124, however, are modified as is described immediately hereinafter.

Each multiple reperforator transmitter 124 has an extra reperforator 856 having an associated transmitter 857. The central office is provided with an extra transmitter controller 858 with an associated multiple reperforator transmitter 859. When one of the outlying transmitters 117 has a priority message to be transmitted to one of the receiving printers 116, the address of such message is preceded by an X. In response to this X signal, the selective control unit in the multiple reperforator transmitter 124 selects the reperforator 856 to perforate the message. It is understood that the normal address follows the X in the message. Priority messages from all outlying transmitters 117 are reperforated by the reperforator 856 of the multiple reperforator transmitter 124 associated with the line on which the outlying transmitter is located.

The transmitter controller 858 then tests all of the transmitters 857 sequentially for messages awaiting transmission. These messages are transmitted to the multiple reperforator transmitter 859 where they are sorted in accordance with lines to which they are addressed, and reperforated by the appropriate reperforator.

The transmitter controllers 123 are modified to the extent that the transmitters of the multiple reperforator transmitter 859 are tested alternately rather than sequentially with the transmitters of the multiple reperforator transmitters 124. Thus the sequence followed by any of the transmitter controllers 123 in testing its associated transmitters of the multiple transmitters is A, X, B, X, C, X, . . ., where A, B, C, etc. represent transmitters of multiple reperforator transmitters 124 and X represents the priority transmitter of the multiple reperforator transmitter 859.

*Priority and deferred message service*

Figs. 34–38 inclusive show a selective control unit as modified for use in the multiple reperforator transmitter used in a system providing priority and deferred message service. In the description of this modification reference should be made to Figs. 16 and 17 which show the multiple reperforator transmitter. Reference numerals in the following description of the modified selective control unit which are the same as those used in Figs. 16 and 17 refer to parts identical to those appearing in Figs. 16 and 17.

Referring to Figs. 34–38, a selective control unit, represented generally by numeral 1001, is provided with the customary series of five code bars 136 which respond to the permuted code signals. The selective control unit is also provided with the usual line punch select code bar 424 as well as with a priority punch select code bar 1002. A pair of T-levers 1003 and 1004 are mounted for pivotal movement on a shaft 1006 and are adapted to move the punch select code bars 424 and 1002, the T-lever 1003 being adapted to move the priority punch select code bar 1002 and the T-lever 1004 being adapted to move the line punch select code bar 424.

A sequential function mechanism 1007, which responds to the sequence Fig.–Fig.–Y, is provided for moving the T-levers 1003 and 1004 clockwise to thereby move the punch select code bars 424 and 1002 to the left (Fig. 34) or punch select position. The function mechanism 1007 consists of the function bars 1008, 1009, and 1011. The function bar 1008 responds to any Figures signal and in so responding a lug 1012 engages and pivots an associated function operating lever 1013 until it is disengaged from a bent over portion 1014 on the function bar 1009. Upon receipt of a second Figures signal immediately thereafter, the function bar 1009 responds and in so doing moves its lug 1016 in a manner to engage and pivot an associated function operating lever 1017 from blocking engagement with a bent over portion 1018 on the function bar 1011. Upon receipt of a Y signal, immediately following the two successive Figures signals, the function bar 1011 responds and a lug 1019 thereon engages and operates a function operating lever 1021 to cause it to pivot the T-levers 1003 and 1004 clockwise about their pivot shaft 1006 to the positions thereof as shown. When both the priority punch select code bar 1002 and line punch select code bar are moved to the left (Fig. 34) the selective control unit 1001 is in condition to select one of the punches.

The mechanism shown in Figs. 34–38 is capable of handling messages of four priority classifications. It is contemplated that four classes of priority will be sufficient to accommodate the requirements of most systems, but if more classes are required the changes necessary to accomplish such changes will readily occur to those skilled in the art. By the present disclosure a "priority" classification is provided whereby the messages are processed at a speed greater than normal messages are handled. The "normal" class of messages is handled in the manner already described. A "deferred" class of messages is processed slower than the "normal" messages and a "routine" class is provided for handling those messages where the only requirement is that a copy of the message be transmitted with no regard to the time element.

The modified multiple reperforator transmitter 1001 is provided with a plurality of normal punch positions of the same type as shown in Fig. 16. The same type of function mechanism is provided in each normal punch position with three Address function bars of the type designated by reference numeral 426. The regular function bar is designated 426A, a group function bar is designated 426B, and a broadcast function bar is designated as 426C. A Letters function bar 426D is also provided in each position. Upon receipt of an Address signal the proper function bar 426A is selected or, in case a group or broadcast Address signal is received the group or broadcast function bars 426B or 426C are selected. In any case upon selection of one of the Address function bars it is moved in a manner such that the corresponding function operating lever 428 is actuated. Upon this actuation of one of the function operating levers 428, the three armed lever 432 associated therewith is actuated to couple its punch by permitting the link 468 to drop into engagement with the bail 458. Also upon the actuation of any of the Address function bars 426A–426C, a blocking lever 1068 is actuated to unblock the associated Letters function bar 426D.

In the multiple reperforator transmitter separate positions are provided for reperforating messages of the "priority," "deferred," and "routine" classifications, whereas the "normal" messages are handled in the usual manner. The address of the "priority" messages is preceded by "X," that of the "deferred" messages by "W," and that of "routine" messages by "V." When these identifying letters are received by the selective control unit 1001, special function mechanism is actuated to cause the messages following to be reperforated by an X, W, or V punch.

After a complete address sequence a Letters signal is invariably transmitted to signify the end-of-address. A function bar 1022 responds to this Letters signal and in so doing moves its lug 1023 in a manner so that it engages and pivots an operating lever 1024. When the operating lever 1024 is moved it engages the T-levers 1003 and 1004 and pivots them counterclockwise so as to restore the code bars 1002 and 424 to a position to block further selection of any punches. Whenever a V, W, or X signal is received prior to the receipt of the Letters signal which signifies the end-of-address, the corresponding one of the function bars 1026, 1027, or 1028 responds and actuates its associated lug 1031, 1032, or 1033. When any of the lugs 1031, 1032, or 1033 is actuated in this manner, it engages one of the operating levers 1034 to cause such operating lever 1034 to engage the bail 1036 and pivot it counterclockwise (Fig. 35) slightly about its pivot shaft 1037. When the bail 1036 is pivoted in this manner a projection 1038 thereon engages an operating lever 1039 to move it against the T-lever 1004. The T-lever 1004 is thereby alone moved counterclockwise, the T-lever 1003 remaining in the punch select position shown. Thus the code bar 424 is moved to blocking position and the priority punch select code bar 1002 is in its punch select position.

For the purpose of the description it will be first assumed that the priority letter received by the selective control unit 1001 is a V signal. Upon reception of the V signal, besides causing the operation of the V function bar 1026, another V function bar 1041 also responds. Upon response of the V function bar 1041, its associated lug 1042 engages an operating lever 1043, pivoting it about its shaft 1044. The lower arm of the operating lever 1043 engages the bent over portion 1046 of the three armed lever 432 in a manner to pivot the lever 432 counterclockwise about the shaft 434. During this movement of the three armed lever 432 the arm 472 is lowered to permit the link 468 to become coupled with the operating bail 458.

When the operating lever 1043 is pivoted clockwise due to the action of the lug 1042 it engages a lug 1047 on a blocking lever 1048 and pivots the blocking lever 1048 clockwise thereby causing a projection 1049 thereon to become disengaged from a Letters function bar 1051. The blocking lever 1048 is pivoted clockwise on the shaft 1044 until a projection 1052 thereon latches with an operating lever 1053 and thus the Letters function bar 1051 is retained in its unblocked condition until the operating lever 1053 is pivoted clockwise on its shaft 1055.

When the operating lever 1043 (Figs. 34 and 36) is pivoted clockwise upon selection of the function bar 1041 it latches momentarily with a latch 1054. Remembering that at the same time the function bar 1041 is selected, the function bar 1026 (Fig. 34) is also selected, it will now be described how the selected punch is retained selected to insure that the Address characters following the V signal are reperforated in the message tape 247. Upon actuation of the V function bar 1026, the bail 1036 (Fig. 35) is pivoted counterclockwise. Because of this motion of the bail 1036, a projection 1056 engages and pivots an operating lever 1057 clockwise. Upon this clockwise movement of the operating lever 1057 it engages a bell crank lever 1058 (similar to the bell crank 436) and pivots the bell crank 1058 counterclockwise about the shaft 434. When the bell crank 1058 is moved in this manner the lower arm 1059 thereof engages and moves the bail 437 clockwise on its pivot shaft 438 to thereby pivot all of the latches 441 clockwise from engagement with the horizontal arms 476 of the three armed levers 432. The bail 1036, however, returns to its normal position (shown in Fig. 35) prior to the release of the operating lever 1043 by the latch 1054 because of the fact that the bail 182 moves upwards first to strip the pawls from engagement with the function bars and then moves downwardly to trip the latches from engagement with the operating levers (see Fig. 4). When the bail 1036 moves back to its normal position, the operating lever 1057 is moved counterclockwise under the urging of its spring 1061, thus permitting the bell crank 1058 to pivot clockwise and permitting the latch springs 439 to move the latch 441 beneath the horizontal arm 476 on the selected three armed lever 432. After the latch 441 has been positioned beneath the horizontal arm 476 on the selected three armed lever 432 the bail 182 trips the latch 1054 from latching engagement with the operating lever 1043, and therefore the selected three armed lever remains selected until the bail 437 is again moved clockwise by the bell crank 1058. Thus the address signals following the V signal are reperforated in the tape 447.

If the message is to be transmitted to other stations under a priority classification other than routine (V), then, immediately following the address signals which followed the V signal, either a W or X signal followed by the station addresses will be included in the address portion of the message. Supposing that this priority classification signal is a W signal, then in response to such signal the W function bar 1027 and another W function bar 1062 responds. Upon response of the W function bar 1027 the bail 1036 is pivoted counterclockwise and the clockwise pivotal movement of the operating lever 1057 caused thereby, causes the bail 437 to pivot clockwise to disengage the latch 441 from beneath the previously selected three armed lever 432. The routine (V) punch is thus disconnected and cannot reperforate the addresses following the W signal.

Upon selection of the W function bar 1062 the associated mechanism is actuated in the same manner as has already been described of the mechanism associated with the V function bar 1041. At this time the three armed lever 432 having the bent over portion 1063 is actuated to select the W or routine punch; the associated Letters function bar 1064 is unblocked due to the pivotal movement of a blocking lever 1066 and is retained in unblocked condition by an operating lever 1067.

If the message is also to be transmitted to one or more stations under an X priority classification then immediately following the addresses of those stations which are to receive the message under a W classification, and X signal is included in the message. The X signal causes all previously selected punches to be released and the punch in the X position to be selected. The addresses of those stations to receive the message under X priority classification immediately follow the X signal and such station addresses are reperforated in the tape 447 in the X position.

Immediately following all address signals an end-of-address (Letters) signal is included in the address portion of the message. In response to this end-of-address signal all Letters function bars in the selective control unit 1001 which have previously been unlatched and the Letters function bar 1022 are selected. Upon selection of the Letters function bar 1022 the operating lever 1024 is operated and engages the T-lever 1003 to pivot it counterclockwise and thereby move the priority punch select code bar 1002 to its rightward position. If the message has been addressed only to stations under "normal" priority classification then upon selection of the Letters function bar 1022 the operating lever 1024 pivots both T-levers 1003 and 1004 counterclockwise to thereby restore both the priority punch select code bar 1002 and the line punch select code bar 424 to their rightward positions. All other Letters function bars in the selective control unit 1001 are associated with the function mechanisms of the various punches and if such punches have been selected previously, such Letters function bars have been unblocked and are selected upon the receipt of the letters signal. All of these Letters function bars are similar to the Letters function bar 1051 shown in Fig. 37 and therefore only the description of the operation of this function bar will be given.

It will be recalled that upon selection of the V function bar 1041 the blocking lever 1048 is pivoted out of engagement from the Letters function bar 1051. Thereafter when the Letters signal is received the function bar 1051 is selected and upon its return motion to the right a lug 1068 on the associated pawl 1069 engages and pivots an operating lever 1071 clockwise. The operating lever engages the bent over portion 1046 of the three armed lever 432 and pivots the three armed lever counterclockwise until the link 468 engages the bail 458. The latch 441 is permitted to return beneath the horizontal arm 476 before the pawl 1069 is stripped from the function bar 1051 and therefore the link 468 remains operably connected with the bail 458.

When the lug 1068 is moved to the right, upon the selection of the Letters function bar 1051, it also engages the operating lever 1053. Thus the operating lever 1053 is pivoted clockwise until the blocking lever 1048 is unlatched therefrom. The blocking lever 1048 then pivots counterclockwise until the projection 1049 is in position to again block the Letters function bar 1051.

It is therefore apparent that the punches are selected in accordance with the address signals contained in the message being transmitted from an outlying station, and that each punch only reperforates in its message tape those address signals of the stations which can receive the message reperforated by such punch.

The modified reperforator transmitter has been described and at this point a typical address sequence will be described for a message which is to be transmitted under all four classes of priority. It will be supposed that the message is to be transmitted to stations AM and BT under the "normal" classification; to stations FN and GR under the "priority" classification; to stations DP and EQ under the "deferred" classification; and to stations HK and JS under the "routine" classification. This message would then have the following pattern: Fig. Fig. Y AM BT X FN GR W DP EQ V HK JS Letters Message Text Fig. Fig. Y. The first "Fig. Fig. Y" sequence of signals in the above pattern is either the start-of-address signal sequence in the present message or the end-of-message signal sequence of the message immediately preceding. It will be recalled that the signal sequence "Fig. Fig. Y" causes both the priority punch select code bar 1002 and the line punch select code bar 424 to be moved to punch select position. Immediately following the start-of-address signal are the call letters of the stations which are to receive the message under the "normal" classification. It is necessary that the "normal" addressees be listed ahead of the addressees who are to receive the message under "priority," "deferred," or "routine" because upon the reception of either an X, V, or W signal the operating lever 1039 causes the line punch select code bar 424 to be moved to the right to thus prevent selection of the "normal" line punches until the receipt of the next subsequent sequence "Fig. Fig. Y." Following the "normal" addresses is the "priority" signal X which causes the selection of the "priority" punch. The two station addresses FN and GR which immediately follow the X signal are reperforated by the "priority" punch. The W signal then causes selection of the "deferred" punch which reperforates the station addresses DP and EQ. Upon receipt of the W signal the "priority" punch is disconnected. The V signal then causes selection of the "routine" punch which reperforates the station addresses HK and JS. Upon receipt of the V signal the "deferred" punch is disconnected. The Letters or end-of-address signal then restores all the selected punches to reperforating condition so that they all reperforate the message text which follows. The end-of-message signal (Fig. Fig. Y) restores both punch select code bars 1092 and 424 to punch select condition. It is not essential that the "priority," "deferred," and "routine" addresses be listed in any particular order after the "normal" addresses.

In order to handle priority, deferred, and routine messages it is necessary that circuits at the central office be modified somewhat and also that the multiple transmitter sequence switch be modified. Reference should therefore be made to Fig. 39, which shows the modified multiple transmitter sequence switch, and to Fig. 40, which shows the modified central office circuits. In Fig. 40, in order to simplify the description, a system having only three lines is shown.

The transmitter controllers TCA, TCB, and TCC associated respectively with lines A, B, and C, also have positions in their respective multiple reperforator transmitters for receiving messages addressed to any line A, B, or C, of any of the classes of priority, and an intercept position. Messages awaiting transmission under "normal" priority are of course processed in the usual manner under control of the transmitter controllers TCA, TCB, and TCC. Priority (X classification) messages, waiting to be transmitted by any of the transmitters $Tx$ are sequentially allowed to be transmitted by any of the transmitters $Tx$ by the transmitter controller TCX. These priority messages are sorted in the usual manner by the multiple reperforator transmitter associated with the transmitter controller TCX, and reperforated in accordance with the lines to which they are addressed by the appropriate perforator $Pa$, $Pb$, $Pc$, associated with the transmitter controller TCX. Any message transmitted by one of the transmitters $Tx$ which contains an improper address is reperforated in the normal manner by the perforator $Pi$ associated with the transmitter controller TCX.

The transmitter controllers TCW and TCV sequentially test all the transmitters $Tw$ and $Tv$ respectively, the multiple reperforator transmitters associated with such transmitter controllers reperforating the messages transmitted by the transmitters $Tw$ and $Tv$ according to the lines to which the messages are addressed just as the transmitter controller TCX and its associated multiple reperforator transmitter operates.

All messages awaiting transmission by any intercept transmitter $Ti$ are controlled by the transmitter controller TCI. The transmitter controller TCI tests each transmitter $Ti$ sequentially and all such messages are reperforated by a standard typing reperforator 1076. Thereafter these messages are handled manually by an operator who controls the transmission of these messages to the appropriate line by the transmitter T.

The transmitter controllers TCA, TCB, and TCC are each designed to test the transmitters having messages awaiting transmission to the appropriate line. For example, the priority transmitter $Ta$, associated with the priority transmitter controller TCX, is tested alternately with the transmitters $Ta$ associated with the transmitter controllers TCA, TCB, and TCC. When there are no messages awaiting transmission by the normal or priority transmitters the deferred transmitter $Ta$ associated with the transmitter controller TCW is tested. If there are neither normal, priority, nor deferred messages awaiting transmission then the routine transmitter $Ta$ associated with the transmitter controller TCV is tested. The transmitter controllers TCB and TCC test their associated transmitters $Tb$ and $Tc$ respectively in the same manner as the transmitter controller TCA tests transmitters $Ta$.

Figure 39:
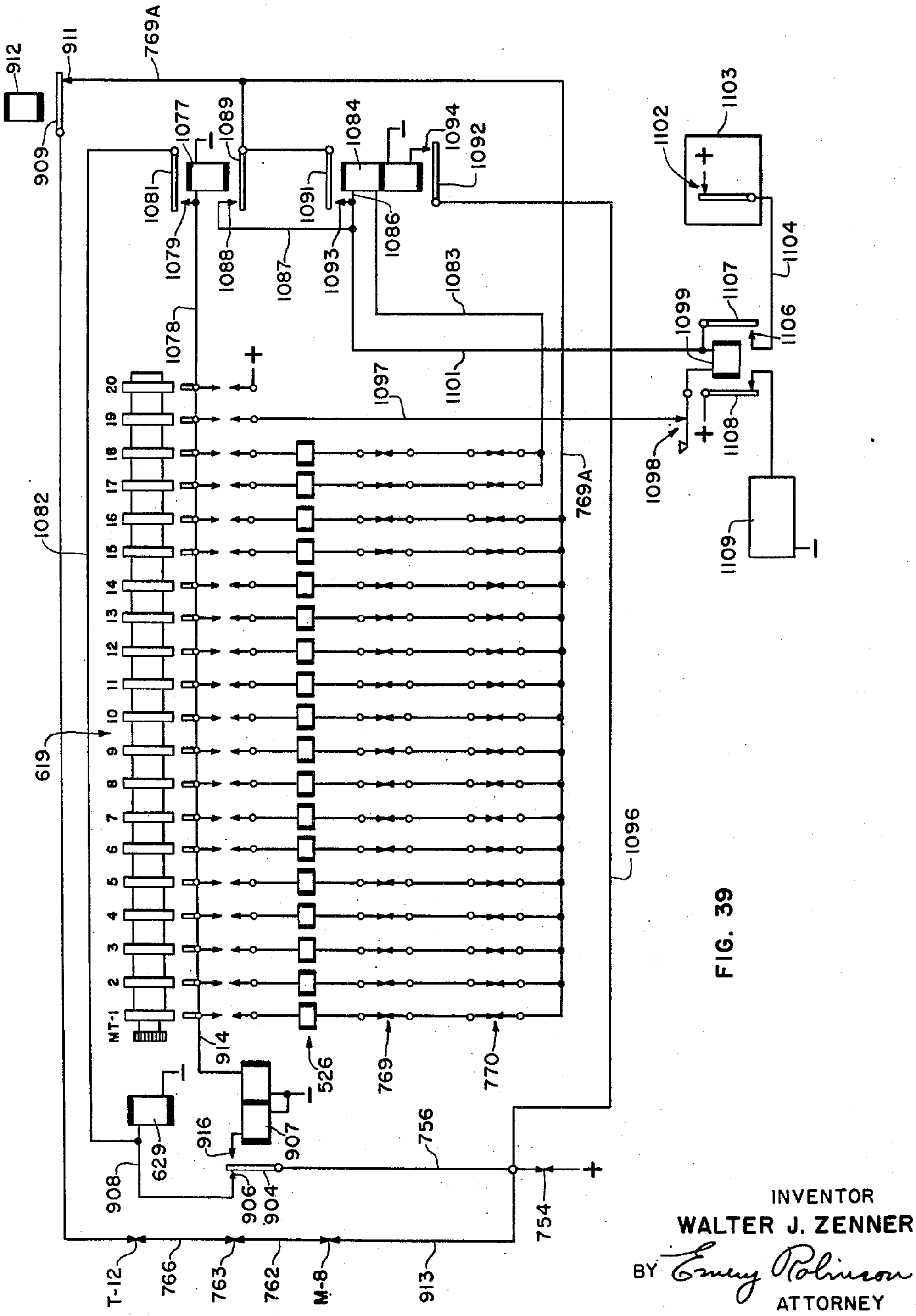
Fig. 39 is a schematic view of a multiple transmitter sequence switch designed for use in a system having priority and deferred message service.
Figure 40:
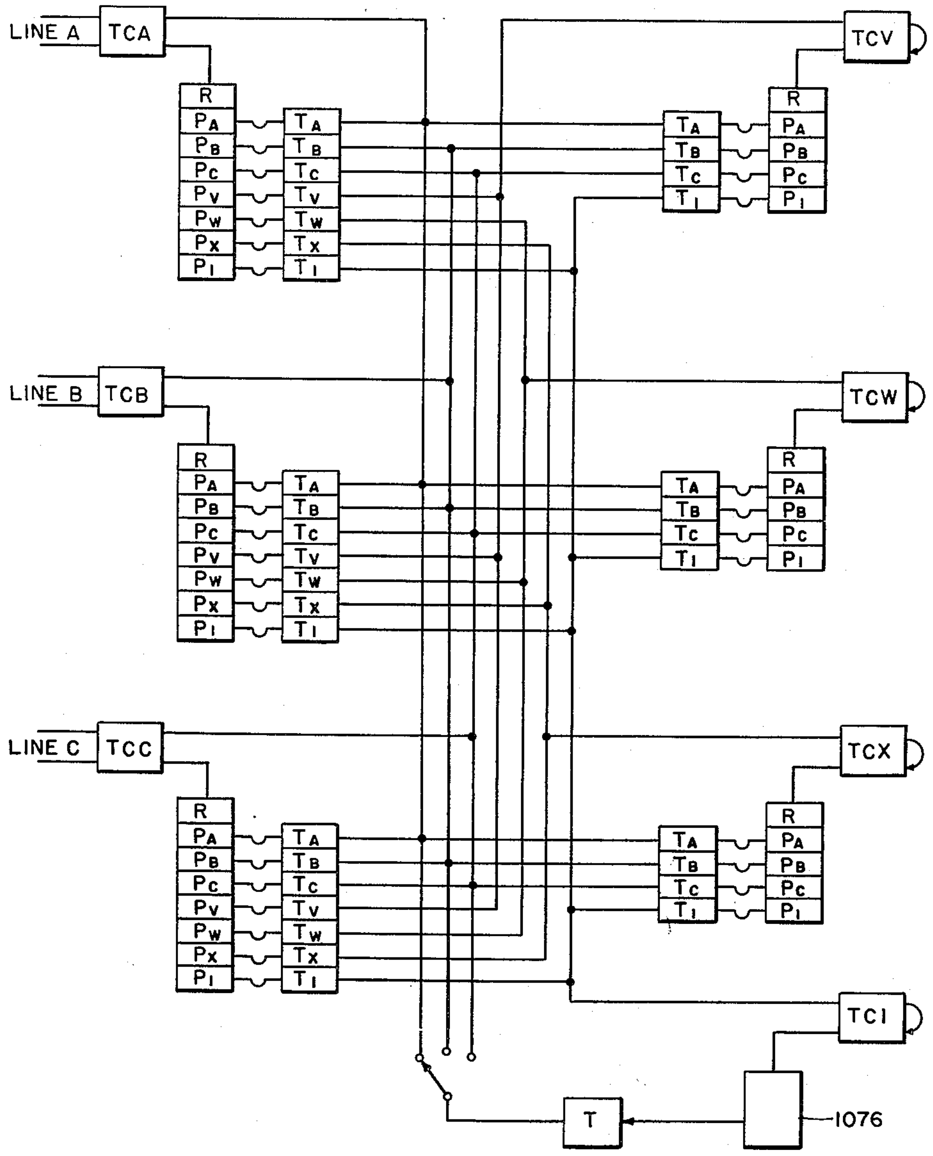
Fig. 40 is a schematic diagram of a central office of a system including priority and deferred message service.

With reference to Fig. 39 the modification of the multiple transmitter sequence switch 619 for use in the transmitter controllers TCA, TCB and TCC of Fig. 40, will now be described. In order to simplify this description the same reference numerals have been used as appear in Figs. 22–24, for all parts common to both the present modification and the standard transmitter controller shown in those figures. It will be noted that the multiple transmitter sequence switch 619 has been increased in length, there having been the cams and contacts MT–15 through MT–20 added. Cams and contacts MT–1 through MT–14 are identical to those shown in Fig. 23. MT–15 is an intercept position, MT–16 is a priority position, MT–17 is a deferred position, MT–18 is a routine position, MT–19 is a "no-traffic" position, and MT–20 is a control contact which renders deferred and routine transmission possible.

As the multiple transmitter sequence switch is stepped, the priority contact MT–16 is closed alternately with the normal contacts MT–1 through MT–12, and thereafter in the cycle of rotation the contacts MT–13, 14, 15, 17, 18, 19, and 20 are sequentially closed. When the contact MT–20 closes, a circuit is established to an idle test relay 1077 from positive battery through the closed contact MT–20, over a lead 1078, through the idle test relay 1077 to negative battery. Upon energization, the idle test relay 1077 draws down its armature 1079 against its contact 1081, to complete a locking circuit for the idle test relay 1077 extending from negative battery, through the idle test relay 1077, through closed contact 1079 and armature 1081, over a lead 1082, over the lead 908, through the closed contact 906 and armature 904, over the lead 756, through the contact 754, to positive battery. This locking circuit for the idle test relay 1077 remains established so long as the start magnet 629 remains energized. When the multiple transmitter sequence switch 619 finds one of the normal or priority transmitters with traffic awaiting transmission a circuit is established which energizes the right hand winding of the relay 907, from positive battery, through contact 754, over the lead 913, through contact M–8 over lead 762, through contact 763, over lead 766, through contact T-12, through closed armature 909 and contact 911, over lead 769A, through the contacts 770, and 769, and operate magnet 526 of the transmitter having traffic awaiting transmission, through the closed MT contact, over lead 914, through the right hand winding of the relay 907, to negative battery. Energization of the relay 907 causes the armature 904 to be pulled up against contact 916 thereby establishing an obvious locking circuit for the relay 907 through its left hand winding. When the armature 904 is pulled up the locking circuit for the idle test relay 1077 is broken and the energizing circuit for the start magnet 629 is broken. Thus the multiple transmitter sequence switch 619 stops rotating and the armature 1081 falls away.

If, when the multiple transmitter sequence switch 619 makes its cycle, it finds no normal or priority transmitter with a message awaiting transmission, then any deferred message awaiting transmission will be transmitted. The contact MT-17 is in circuit with the deferred transmitter operate magnet 526, and when the contact MT-17 closes, if the relay 1077 remains energized (because at this time the switch 619 has made a full revolution without traffic) then if contacts 769 and 770 in the deferred position are closed (which occurs when deferred traffic is awaiting transmission) a circuit will be established from negative battery through the right hand winding of the double wound relay 907, over lead 914 through contact MT-17, through the operate magnet 526 and contacts 769 and 770 in the deferred position, over a lead 1083, through a send relay 1084, over leads 1086 and 1087, through a closed contact 1088 and armature 1089 of the idle test relay 1077, over the lead 769A, through closed contact 911 and armature 909, through contact T-12, over the lead 766, through contact 763, over the lead 762, through contact M-8, over the lead 913, through the contact 754, to positive battery. The operate magnet 526 in the deferred transmitter is energized to allow the deferred transmitter to commence to transmit. Due to the energization of the double wound relay 1084 both of its armatures 1091 and 1092 are pulled up. When the armature 1091 closes with its contact 1093, the contact 1088 and armature 1089 are by-passed so that the operate magnet 526 in deferred position is maintained energized irrespective of the fact that as soon as an operate magnet 526 is energized the relay 1077 becomes de-energized. When the armature 1092 is pulled up against its contact 1094 a locking circuit is established for the lower winding of the double wound relay 1084, from negative battery, through the lower winding of relay 1084, through closed contact 1094 and armature 1092, over a lead 1096, through the contact 754, to positive battery. Therefore control of the deferred transmitter is permitted through the contacts 769 or 770.

When the sequence switch 619 makes its rotation, if it finds that no message is awaiting transmission by a normal priority or deferred transmitter, then the routine transmitter will be actuated if it has a message awaiting transmission. It will be recalled that contact MT-18 is in the routine position, and when no other transmitter has operated in the cycle of the switch 619, upon closure of contact MT-18 a circuit similar to that rendered effective for the deferred transmitter, will be effective to allow transmission by the routine transmitter. It is not deemed necessary to describe the details of this latter circuit inasmuch as it is substantially identical with the deferred transmitter actuating circuit.

If the multiple transmitter sequence switch 619 makes a complete revolution and finds no transmitter with awaiting traffic, when contact MT-19 closes, a circuit is established from negative battery through the right hand winding of the double wound relay 907, over the lead 914, through the contact MT-19, over a lead 1097, through a manual switch 1098, through a no traffic relay 1099, over a lead 1101, over the lead 1087, through closed contact 1088 and armature 1089, over the lead 769A, through closed contact 911 and armature 909, through the contact T-12, over lead 766, through contact 763, over lead 762, through contact M-8, over lead 913, through contact 754, to positive battery. As soon as the relay 907 is energized the circuit to the stepping magnet 629 and to the idle test relay 1077 is broken and consequently the sequence switch 619 stops rotating and contact 1088 and armature 1089 open. However before the armature 1089 falls away from the contact 1088, a locking circuit for the no traffic relay 1099 is established from positive battery through a switch 1102 in a timer 1103, over a lead 1104, through a closed contact 1106 and armature 1107 of the no traffic relay 1099, through the no traffic relay 1099, through the manual switch 1098, over lead 1097, through the closed contact MT-19, over the lead 914, through the right hand winding of the relay 907 to negative battery. At the same time that the no traffic relay 1099 is energized it pulls up an armature 1108 thereby completing an obvious circuit to an alarm 1109. When the attendant hears or sees the alarm he can then commence transmission of messages reperforated by the intercept reperforators, a low priority traffic on a manually controlled basis.

After an interval of time, of the order of two to five minutes generally, the switch 1102 opens and thereby de-energizes the relay 907 which reenergizes the stepping magnet 629 upon the falling away of the armature 904. Thereafter a new cycle of rotation of the sequence switch 619 takes place. If it is desired to initiate a new cycle of the sequence switch 619 the manual switch 1098 is opened which functions in the same manner as the timer switch 1102.

*Message delivery time inserter*

Figure 25:
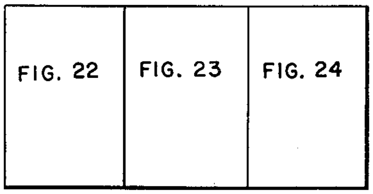
Fig. 25 shows the proper arrangement for assembling Figs. 22–24.
Figures 41, 43:
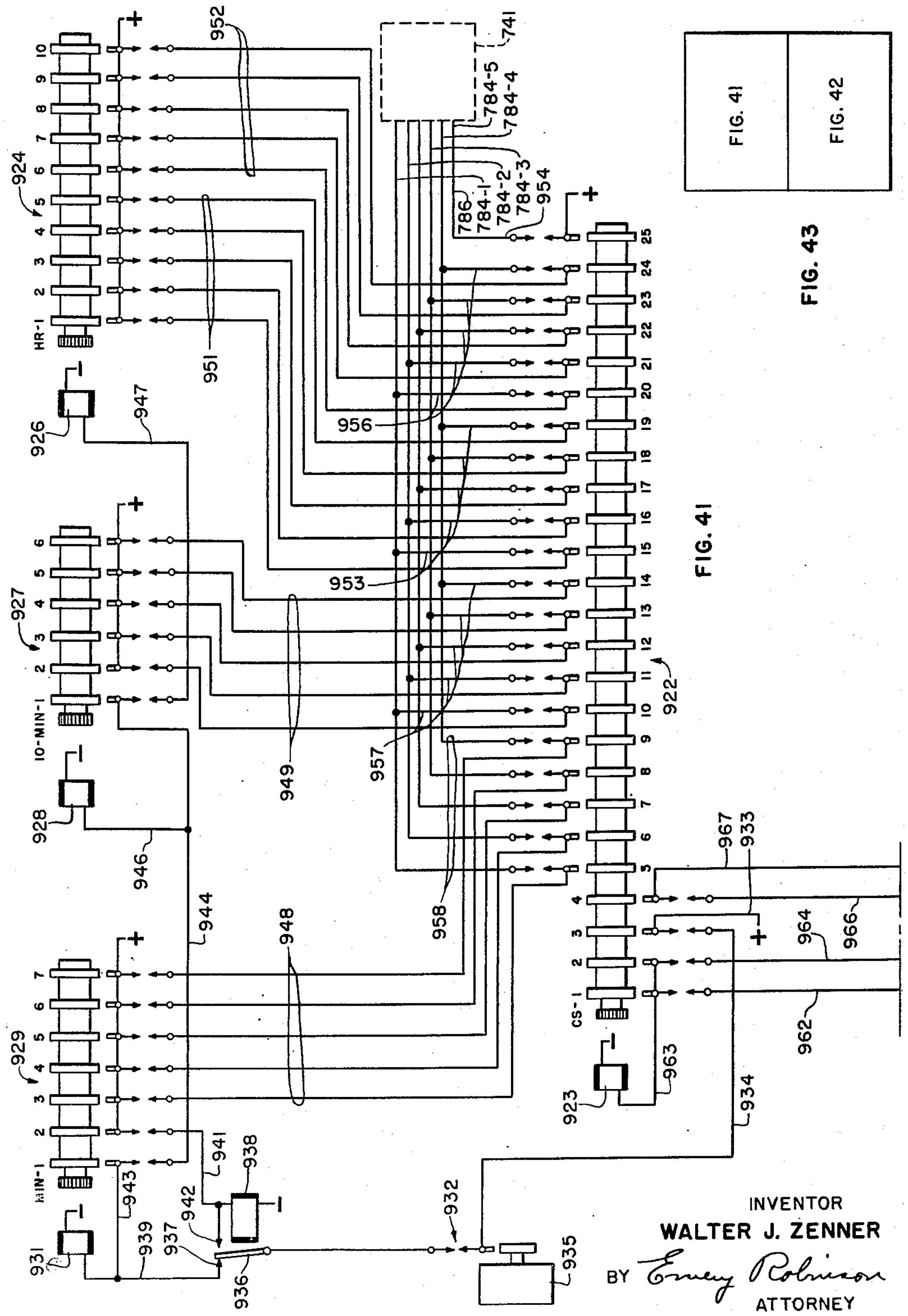
Figs. 41 and 42 represent a schematic circuit diagram of the message delivery time inserter.
Fig. 43 shows the proper arrangement for assembling Figs. 41 and 42.
Figure 42:
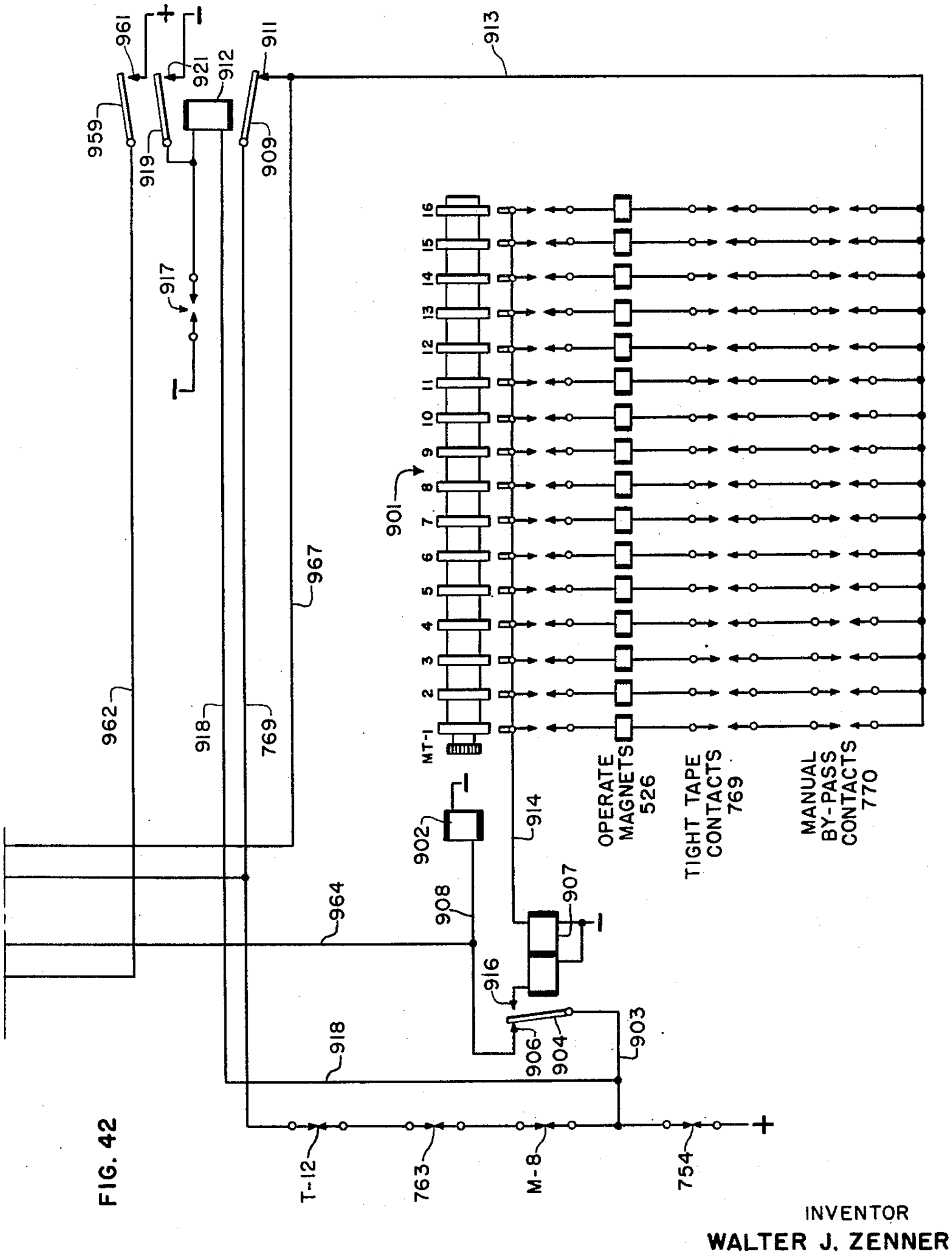

Referring now to Figs. 41 to 47, a message delivery time inserter will be described. Figs. 41 and 42 should be positioned as shown in Fig. 43. A multiple transmitter sequence switch 901 is modified somewhat from the multiple transmitter sequence switch 619 shown in Fig. 25, in that extra cams are shown for enabling priority and deferred message service. Also the circuit connections for the stepping magnet 902 are also modified slightly. By means of the present time delivery inserter, the operate magnet 526 of a transmitter 748-0, 9 is energized to cause the address of an awaiting message to be transmitted and thereafter de-energized while the message delivery time is inserted, whereupon the transmission of the message is resumed.

It will be recalled, so long as no message tape is inserted in one of the transmitters 748-0, 9 so as to cause one of the tight tape contacts 769 to close while the corresponding manual by-pass contacts 770 are closed, that the multiple transmitter sequence switch 619 continuously rotates, and the modified multiple transmitter sequence switch 901 rotates likewise. This is due to the fact that the stepping magnet 902 is retained in its energized condition at this time over a circuit from positive battery, through closed end-of-message contact 754 in the distributor 741, over a lead 903, through the closed armature 904 and back contact 906 of double wound relay 907, over a lead 908, through the stepping magnet 902, to negative battery. When one of the MT contacts closes, finding tape in a corresponding one of the transmitters 748-0, 9, a circuit is established from positive battery, through the end-of-message contact 754, through contact M-8, through contact 763, through contact T-12, over the lead 769, through the closed armature 909 and back contact 911 of a time insert relay 912, over a lead 913, through the closed manual by-pass contact 770 and tight tape contact 769, through the operate magnet 526, through the closed MT contact, over a lead 914, through the right-hand winding of the double wound start relay 907, to negative battery. The double wound start relay 907, being thus energized, pulls up its armature 904, breaking the circuit to the stepping magnet 902 to cause the multiple transmitter sequence switch to cease rotating, and making a circuit from positive battery, through contact 754, over lead 903, through the armature 904 and a front contact 916 of the relay 907, through the left-hand winding of the start relay 907, to negative battery. The double wound relay 907 is thus locked with its left-hand winding energized. The transmitter whose operate magnet 526 has been energized then begins transmitting, sending first the address followed by the end-of-address signal. Thereafter upon the receipt of the end-of-address signal by the distributor 741, an end-of-address contact 917 closes momentarily, thereby completing a circuit from positive battery, through contact 754, over lead 903, over a lead 918, through the time insert relay 912, through closed contact 917, to negative battery. The time insert relay locks up by pulling up its armature 919 which makes with a front contact 921. The relay 912 also pulls up the armature 909 thereby breaking the circuit to the transmitter operate magnet 526.

The message delivery time inserter is provided with a plurality of significant time component sequence switches; namely, a clock sequence switch 922 having a stepping magnet 923, an hour sequence switch 924 with a stepping magnet 926, a 10-minute sequence switch 927 with a stepping magnet 928, and a minute sequence switch 929 with a stepping magnet 931. The cams and contacts on the clock sequence switch 922 are identified by reference characters CS-1, CS-2, CS-3, etc., on the hour sequence switch 924 by HR-1, HR-2, HR-3, etc., on the 10-minute sequence switch 927 by 10-MIN-1, 10-MIN-2, 10-MIN-3, etc., and on the minute sequence switch 929 by MIN-1, MIN-2, MIN-3, etc. There is a master clock 935 in the time delivery inserter which is adapted to close a clock contact 932 momentarily at the end of each minute.

Figure 47:
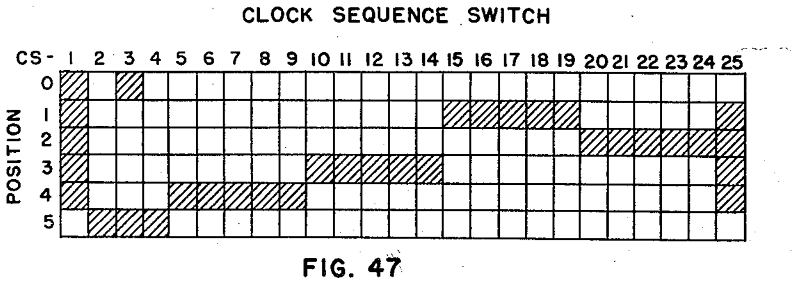
Figure 48:
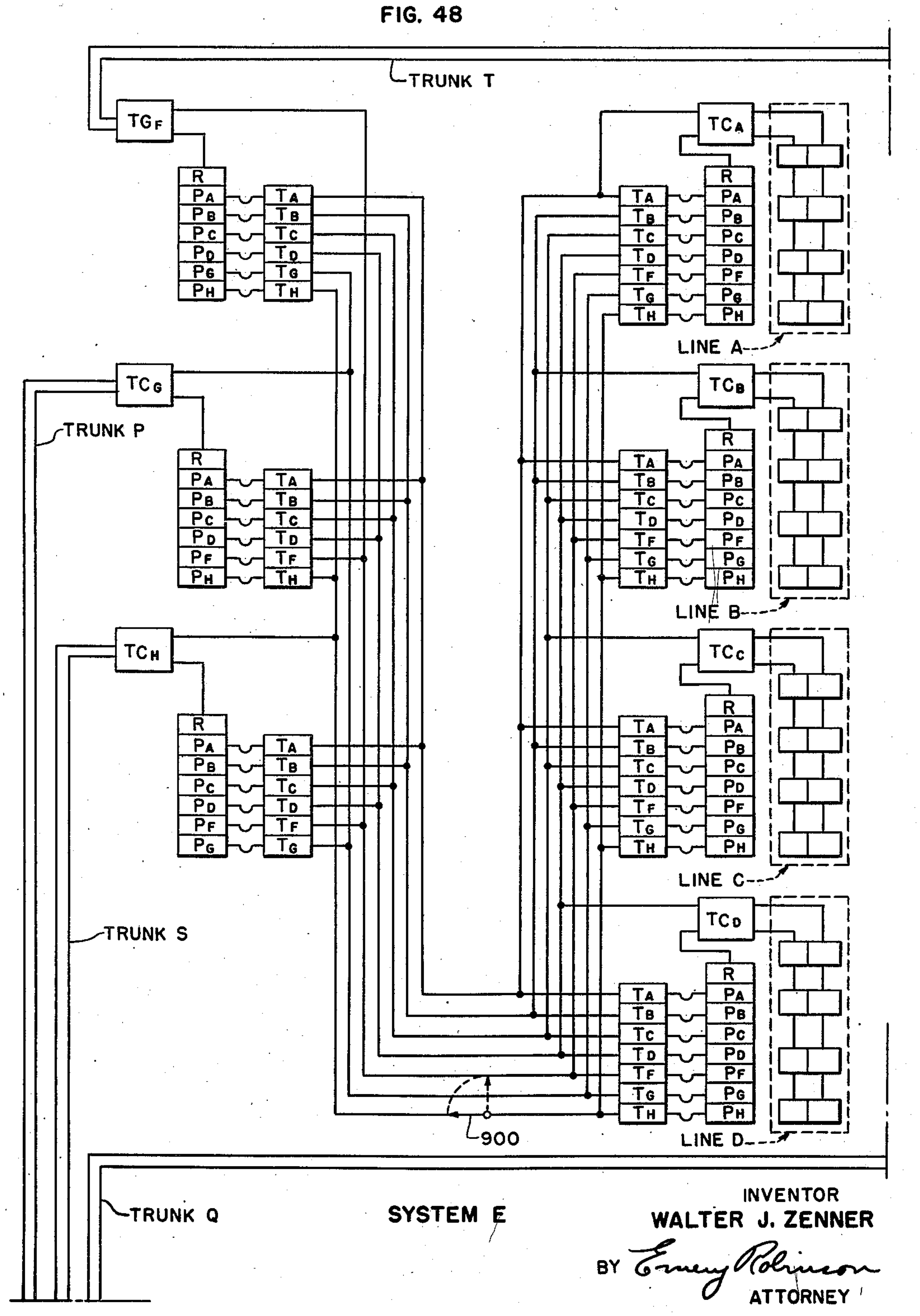
Figs. 48–51 show a schematic circuit diagram of a multiple office switching system.
Figures 49, 53:
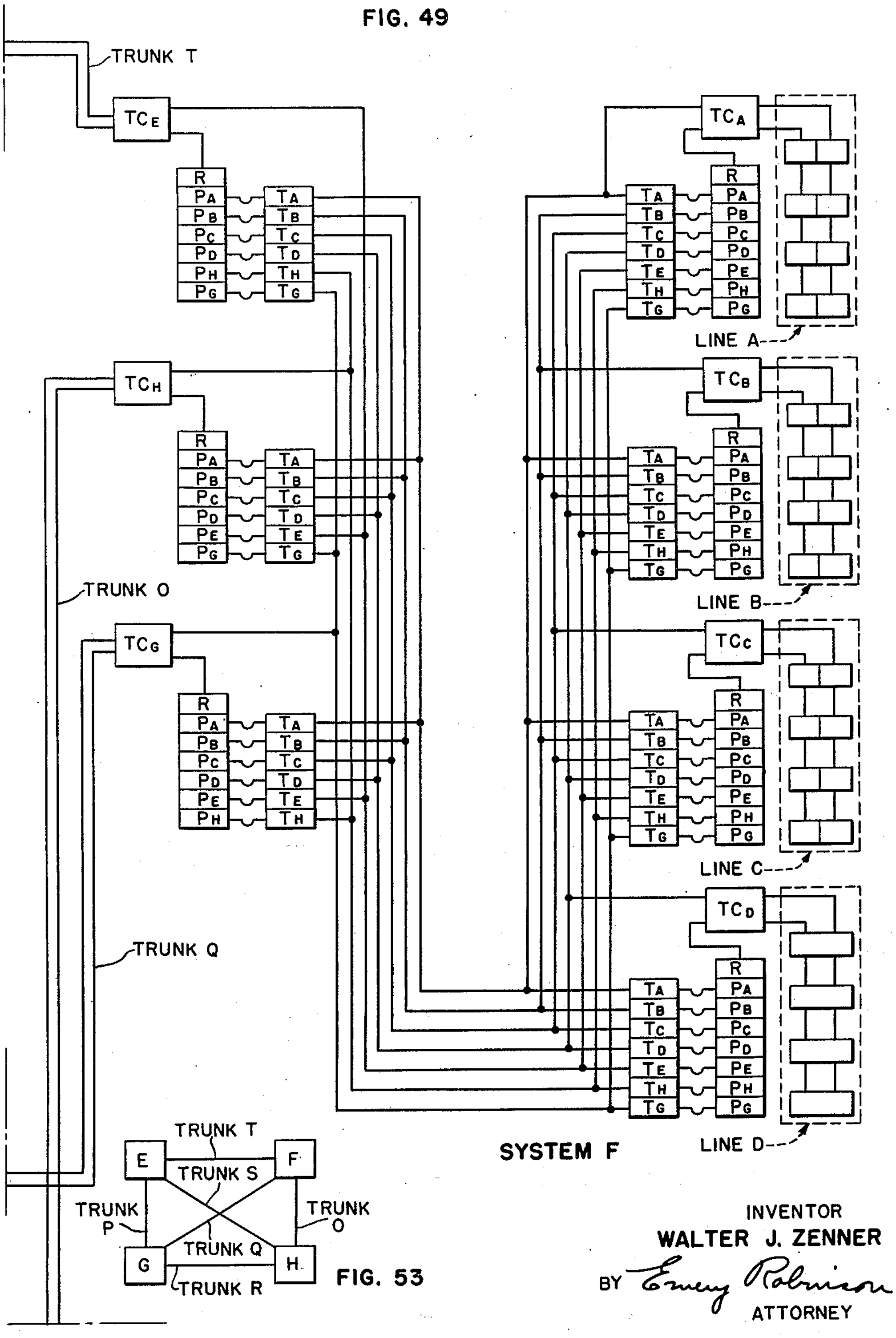
Fig. 53 is a schematic diagram of the multiple office system shown in greater detail in Figs. 48–51.
Figure 50:
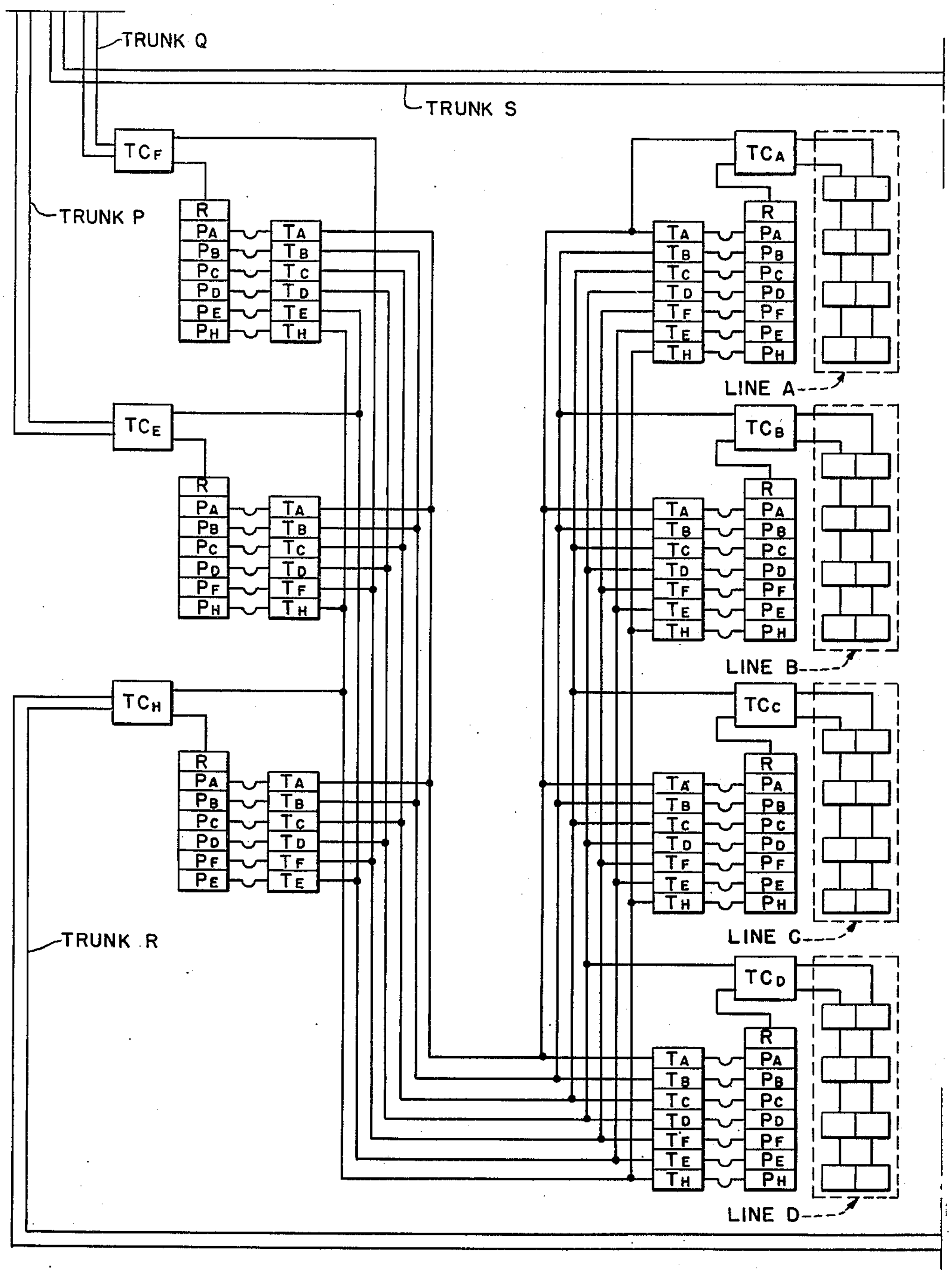

The clock contact 932 is located normally in a circuit with the stepping magnet 931 from positive battery, over a lead 933, through closed contact CS-3 (contact CS-3 being closed in the No. 5 or normal position of the clock sequence switch 922, when one of the transmitters 748 is transmitting, as shown by Fig. 47), over a lead 934, through the clock contact 932, through a closed armature 936 and back contact 937 of a cutoff relay 938, over a lead 939, through the stepping magnet 931, to negative battery. Therefore, it is obviously apparent that a momentary closure of clock contact 932 immediately energizes the stepping magnet 931 to step the minute sequence switch 929. From Fig. 44 it is apparent that contact MIN-2 is closed momentarily with each step of the minute sequence switch 929. This closure of the contact MIN-2 completes a circuit from positive battery through the contact MIN-2, over a lead 941, through the cutoff relay 938 to negative battery. Upon being energized, the relay 938 pulls up its armature 936 breaking the circuit to the stepping magnet 931 before the minute sequence switch 929 can be stepped more than one step, and momentarily locking the cutoff relay 938 in energized condition by causing closure of the armature 936 with a front contact 942 to retain the circuit to the stepping magnet 931 broken at the armature 936 and contact 937 until the clock contact 932 is opened.

Figure 44:
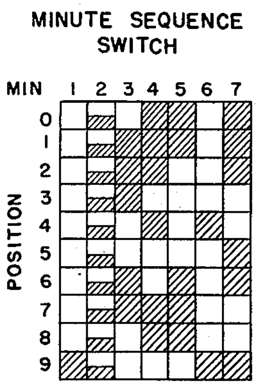
Figs. 44–47 are schematic diagrams of the various sequence switches shown in Figs. 41 and 42.
Figure 45:
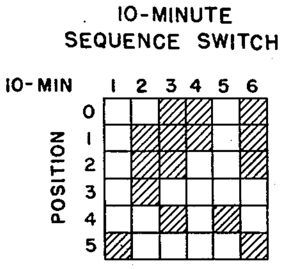

In the No. 9 position of the minute sequence switch 929, the contact MIN-1 closes as is apparent from Fig. 44. Upon the next subsequent closure of the clock contact 932, circuit is again established to the stepping magnet 931; however, the circuit is split from lead 939 and from there extends over a lead 943, through contact MIN-1, over a lead 944, over a lead 946, through the stepping magnet 928, to negative battery. As a result of this energization of the stepping magnet 928, the 10-minute sequence switch 927 is advanced a step. Obviously the 10-minute sequence switch is advanced one step in every ten minutes. Referring to Fig. 45 it is apparent that the contact 10-MIN-1 closes whenever the 10-minute sequence switch is advanced to its No. 5 position, that is the contact 10-MIN-1 closes once per hour. When the contact 10-MIN-1 is closed at a time when the contact MIN-1 is closed, the next subsequent closure of the clock contact 932 causes circuit to be established to the stepping magnets 931 and 928 as described previously, and also to the stepping magnet 926 from the lead 944, through contact 10-MIN-1, over a lead 947, through the stepping magnet 926, to negative battery.

Figure 46:
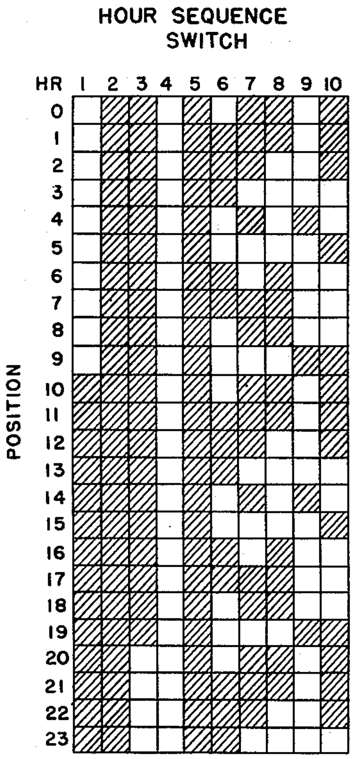

Referring to Figs. 44, 45, and 46, it is apparent that the contacts and cams HR-1, through HR-10 of the hour sequence switch 924 are adapted to transmit numbers indicating hours from 00 to 23, inclusive, the contacts and cams 10-MIN-2 through 10-MIN-6 of the 10-minute sequence switch 927 are adapted to transmit numbers indicating ten minute intervals from 0 to 5, inclusive, and the contacts and cams MIN-3 through MIN-7 of the minute sequence switch 929 are adapted to transmit numbers indicating minutes from 0 to 9, inclusive. The contacts MIN-3 through MIN-7 of the minute sequence switch 929 are connected respectively to the contacts CS-5 through CS-9 of the clock sequence switch 922 by means of a group of leads 948. The contacts 10-MIN-2 through 10-MIN-6 of the 10-minute sequence switch 927 are connected respectively to the contacts CS-10 through CS-14 of the clock sequence switch 922 by means of leads 949. The contacts HR-1 through HR-5 are connected respectively to the contacts CS-15 through CS-19 of the clock sequence switch 922 by means of a group of leads 951 and the contacts HR-6 through HR-10 are connected respectively to the contacts CS-20 through CS-24 of the clock sequence switch 922 by means of leads 952.

When the clock sequence switch is in its No. 1 position (see Fig. 47) the contacts CS-15 through CS-19 are closed, thereby enabling the transmission of a permutation signal over a circuit from positive battery, through the contacts HR–1 through HR–5, over the leads 951, through the contacts CS–15 through CS–19, over a group of leads 953, over the leads 784–1 through 784–5, to the magnets 612 in the distributor 741. At the same time a circuit is established from positive battery through the contact CS–25, which is closed while the clock sequence switch is in position No. 1, over a lead 954, over the lead 786, to the start magnet 613 in the distributor 741. When the clock sequence switch is in its No. 2 position the contacts CS–20 through CS–25 are closed, thereby enabling the transmission of a permutation signal over a circuit from positive battery, through the contacts HR–6 through HR–10, over the leads 952, through the contacts CS–20 through CS–24, over a group of leads 956, over the leads 784–1 through 784–5 to the magnets 612 in the distributor 741. A start impulse is transmitted to the start magnet 613 in the distributor 741 due to the fact that contact CS–25 is closed at this time.

When the clock sequence switch 922 advances to its No. 3 position contacts CS–10 through CS–14 and contact CS–25 are closed. At this time a permutation signal is transmitted over circuits from positive battery, through the contacts 10–MIN–2 through 10–MIN–6, over the leads 949, through the contacts CS–10 through CS–14, over a group of leads 957, and over the leads 784–1 through 784–5 to the distributor 741. The start magnet 631 in the distributor 741 is also energized due to the fact that contact CS–25 is closed. In position No. 4 of the clock sequence switch 922 contacts CS–5 through CS–9 are closed, at which time a permutation signal is transmitted over circuits from positive battery, through the contacts MIN–3 through MIN–7, over the leads 948, through the contacts CS–5 through CS–9, over a group of leads 958, over leads 784–1 through 784–5, to the magnets 612 in the distributor 741. Because contact CS–25 is also closed at this time the start magnet 613 is also energized. When the clock sequence switch 922 rotates through its Nos. 1, 2, 3, and 4 positions, the time of such rotation is therefore transmitted to the distributor 741, since the time sequence switches 924, 927, and 929 are stepped in accordance with the time.

When the time insert relay 912 is energized, it also pulls up its armature 959 which makes with a contact 961 thereby completing a circuit from positive battery through the closed contact 961 and armature 959 over a lead 962, through the contact CS–1, which is closed while the clock sequence switch 922 occupies its zero position (see Fig. 47), over a lead 963, through the stepping magnet 923, to negative battery. Remembering that the time insert relay 912 remains locked in its energized condition and noting that the contact CS–1 is closed from the zero position through the No. 4 position of the clock sequence switch 922, it is apparent that the clock sequence switch is stepped continuously to positons Nos. 1, 2, 3, 4, and 5 once the armature 959 makes with the contact 961. During the advance through positions Nos. 1, 2, 3, and 4 of the clock sequence switch 922 the time is transmitted by the time sequence switches 924, 927, and 929. When the clock sequence switch reaches its position No. 5, contact CS–1 opens, thereby breaking the circuit to the stepping magnet 923. However, at this time the contact CS–2 closes to conditon a circuit to the stepping magnet 923 from positve battery, through the contact 754, over the lead 903, through armature 904 and contact 906 (open, however, at this time), over the lead 908, over a lead 964, through the contact CS–2, over lead 963, through the stepping magnet 923, to negative battery.

When the clock sequence switch 922 reaches positon No. 5, the contact CS–4 also closes. This again completes a circuit through the operate magnet 526 of the transmitter 748–0 through 748–9 whose message was interrupted in order to transmit the time. Such circuit extends from positive battery, through the end-of-message contact 754 (closed at this time), through contacts M–8, 763, and T–12 (all normally closed at this time), over the lead 769, over a lead 966, through contact CS–4 over a lead 967 (by-passing open armature 909 and contact 911), over the lead 913, through the manual by-pass contact 770, tight tape contact 769, operate magnet 526, and one of the MT contacts, over the lead 914, through the right hand winding of the double wound relay 907, to negative battery. So long as the end-of-message contact 754 remains closed, any opening of contacts T–12, 763, M–8, 770, or 769 is immaterial insofar as concerns the selection of any particular operate magnet 526. Opening of one of these contacts merely temporarily interrupts transmission of such message, and because the left hand winding of the double wound relay 907 remains energized while contact 754 remains closed, causing the circuit to the stepping magnet 902 to be broken, there can be no stepping of the multiple transmitter sequence switch 901 and consequent energization of a different operate magnet 526 until an end-of-message signal causes contact 754 to open. Therefore the text of the message is transmitted while the clock sequence switch 922 occupies its No. 5 position.

While the clock sequence switch 922 advances through its time transmitting positions (positions Nos. 1, 2, 3, and 4) the contact CS–3 is open. This prevents completion of a circuit to the stepping magnets of the time sequence switches 924, 927, and 929 while a time transmission is in process and consequently prohibits a change in the settings of the time sequence switches 924, 927, and 929 at this time. When the time sequence is complete, that is, when the clock sequence switch 922 reaches its No. 5 position, contact CS–3 closes remaining closed during the No. 5 and zero position of the switch 922, thereby permitting stepping of the time switches 924, 927, and 929. There is no danger that the time switches 924, 927, and 929 will not be stepped during a time transmission sequence because the closure of the clock contact 932 is of sufficient duration to more than overlap the time necessary for the transmission of the time sequence.

When an end-of-message signal appears in the message being transmitted, the end-of-message contact 754 opens momentarily sufficiently long to permit the armature 904 to fall back against back contact 906. However, the opening of contact 754 is only momentary, and upon being again closed, circuit is again established to the stepping magnets 902 and 923. The clock sequence switch 922 steps once only to its zero position and then stops, because in this position the contact CS–2 is opened. The multiple transmitter sequence switch 901, however, is stepped continuously until it finds a transmitter 748–0, 9 with an awaiting message. During this period of stepping of the multiple transmitter sequence switch 901, contact CS–3 is closed (see Fig. 47) thereby enabling the time sequence switches 924, 927, and 929 to be stepped with each closure of the clock contact 932.

When the end-of-message signal causes contact 754 to open, the circuit to the time insert relay 912 is also broken so that it is de-energized and allows its armatures 909, 919, and 959 to fall back, thus, breaking the circuit to the stepping magnet 923 by way of contact CS–1, breaking its own locking circuit, and allowing armature 909 to make with contact 911. The circuit is then in condition for the next subsequent message.

It is necessary, in order that the time sequence be received in an intelligible condition by the station to which the message is addressed, that a shift or Figures signal be transmitted over the leads 784–1 through 784–5 prior to the transmission of the time sequence. This is readily accomplished either by adding a Figures signal to the end-of-address signal so that the contact 917 does not close to initiate the time sequence prior to the transmission of a shift signal or extra cams and associated contacts can be added to the clock sequence switch 922 which are adapted to transmit a shift signal between the zero and No. 1 positions of the clock sequence switch 922. For purposes of simplification of the drawings neither of these are shown.

It is noted that extra cams and contacts MT–15, 16 are shown in the multiple transmitter sequence switch 901. These cams and contacts are merely for enabling the multiple transmitter sequence switch 901 to control transmission from priority or deferred message transmitters.

*Station motor control*

In systems where the outlying stations are manned for only a limited period each day it may be desirable to stop station motors from the central office. Oftentimes there may be a sufficient number of messages stored and awaiting transmission by the central office to maintain transmission for several hours after the normal working day. It is desirable under such conditions that these messages be transmitted immediately rather than holding them for transmission during the following day. In order to transmit such messages immediately and to avoid operation of the station receiver motors after such transmission is completed, and further to avoid the necessity of retaining an attendant at the station to turn off the motors upon completion of such transmission, means are provided for automatically cutting off the station receiver motors upon completion of such transmission.

Each station is provided with any well known timer (not shown) which is designed to be zeroized by the receipt of signals at the station. After a predetermined period during which no signals are received the timer releases a power relay (not shown), thereby shutting off the station receiver motor. During normal operations the transmitter controller at the central office tests all stations for messages awaiting transmission every few minutes. Therefore, when the central office is shut down upon the completion of transmission of all awaiting messages thereat, the timers in all of the outlying stations, after the predetermined period in which no signals are received by the stations, release their associated power relays to shut off the station receiver motors. The timer can be arranged to energize the power relay again upon the receipt of signals by the station to again cause actuation of the station receiver motor. Thus it is possible for messages to be delivered to the stations solely under the control of the central office.

*Multiple office system*

Figures 51, 52:
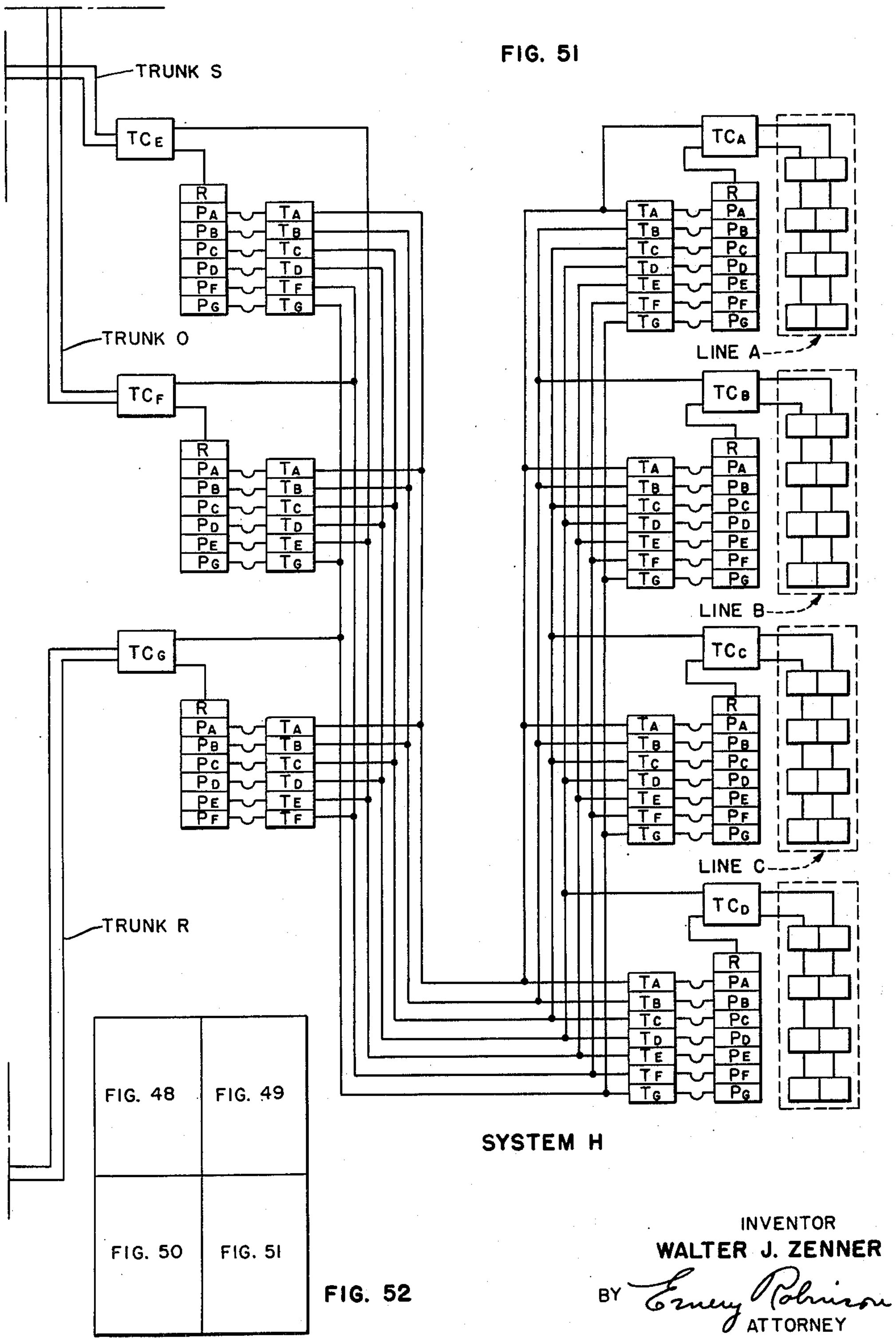
Fig. 52 shows the proper arrangement for assembling Figs. 48–51.

Fig. 53 and Figs. 48 through 51, inclusive, when assembled in the manner shown in Fig. 52, show a multiple central office telegraph system. For the sake of simplicity in the drawings the lines associated with each of the central offices are shown as having but four stations thereon. It will be understood, of course, that these lines may include more or less than four stations. Also, for the purpose of simplifying the drawings, but which is not to be construed in any way as a limitation on the system, the individual central offices are shown as having only four outgoing lines. Letters will be used in place of numbers for the reference characters in the description of the multiple office system for the reason that the description can be made more clear thereby.

Each central office together with all of its associated lines and equipment is designated as a system, of which there are four, namely, E, F, G, and H systems. It will be noted in the E system, and similarly in the other three systems, that the transmitter controllers TCA, TCB, TCC, and TCD together with their associated lines A, B, C, and D, and multiple reperforators, form essentially the basic system heretofore described. To form the multiple office system each central office has three additional transmitter controllers (TCF, TCG, and TCH in the E system) and their associated multiple reperforator transmitters. These three extra transmitter controllers are for controlling traffic directed to the other three systems.

In the multiple office system it becomes necessary for there to be a three letter address in the messages due to the fact that the office to which the message is addressed must be identified just as the line and station must be identified. Due to the fact that in the multiple office system it is contemplated that there will be a large number of offices, lines, and stations on the lines, it becomes more practicable to separate the three letter addresses by another signal, such as a space. By so doing it is thereby made possible to use any character, other than a control character (U, V, W, X, Y and Z by the present description), for line and station designation without the danger of possible false addresses, resulting from the combination of the last character of one address and the first character or characters in the following address, in multiple address messages. To utilize this latter feature, the punch function bar 426 (Fig. 17) need only be adapted to move into punch select position only when immediately cleared therefor by the space or other address separating signal.

Suppose, in the E system, that one of the stations on line B has a message to be transmitted to one of the stations on line C in the E system. Since a three letter address code is being used, and since the message is being transmitted from and directed towards a station in E system, the first character of the address is E. Obviously, the next character is C, because the message is being transmitted to line C, and the third character is the station identifying character. In this case the E has no effect as there is no reperforator responsive thereto in the multiple reperforator transmitter associated with the transmitter controller TCB and selection of the proper reperforator is controlled by the C character. When the transmitting station on line B is called by the transmitter controller TCB, such message is transmitted by the transmitter at such transmitting station and is reperforated by the reperforator *Pc* of the multiple reperforator transmitter associated with the transmitter controller TCB. Thereafter when the transmitter controller TCC sequentially calls the transmitter *Tc* such message is transmitted by the transmitter distributor in the transmitter controller TCC, and thereby transmitted over the line C where it is received by the proper station.

Suppose that a station on line D of the E system has a message to be transmitted to a station on line B of the H system. In this case a three letter address is necessary. The address of such message is H, B, followed by the proper station designator on line B. When the transmitter controller TCD of the E system calls the transmitting station on line D, the message is transmitted and reperforated by the reperforator *Ph*.

The reperforator *Ph* is selected to reperforate the message because its associated transmitter *Th* is the transmitter adapted to transmit messages directly to H system over the trunk S. Thereafter when the transmitter controller TCH of the E system sequentially calls the transmitter *Th* the message is transmitted to the distributor of the transmitter controller TCH in the E system. The distributor of the transmitter controller TCH in the E system simultaneously in turn transmits the message over trunk S where the message is reperforated by the reperforator *Pb* in the multiple reperforator transmitter associated with the transmitter controller TCE of the H system. Thereafter when the transmitter controller TCB, in the H system, sequentially calls the transmitter *Tb*, in the multiple transmitter associated with the transmitter controller TCE of the H system, the message is transmitted to the transmitter distributor in the transmitter controller TCB from which it is transmitted over the line B and received by the station thereon to which it is addressed. It is to be noted that all messages directed over the trunk S from the E system to the H system are controlled by the transmitter controller TCH in the E system rather than by the transmitter controller TCE in the H system. In this way the signals transmitted over the trunk S are start-stop signals. Transmission over any of the other trunks O, P, Q, R, or T is similarly controlled by the transmitter controller associated with the trunk and located in the system wherein the message originated.

At times it is conceivable that a particular trunk will be overloaded while others are not carrying a particularly heavy load or are not operating to capacity, and sometimes there is insufficient traffic between offices to warrant a trunk therebetween. These cases can be illustrated together. Assuming that for some reason the trunk S is unable to carry the load from E system to H system, it then becomes necessary that a message addressed to the H system traverse a path over trunks T and O or trunks P and R. It will be assumed that the path over trunks T and O is to be followed. Under these conditions it is again supposed that the message under consideration is to be transmitted from a station on line D in the E system to a station on line B of H system. The message is addressed in the same manner as before, that is H, B, followed by the station designating character on line B.

By any well known means, represented by a swinger 900, the transmitter *Th* in the multiple reperforator transmitter associated with the transmitter controller TCD in the E system is disassociated from the transmitter controller TCH and associated with the transmitter controller TCF in the E system. The swinger 900 is operated manually and by means of it the association of the transmitter *Th* with the trunk S is changed to trunk T. The representation of the swinger 900 is schematic, it being contemplated that there will be such swingers associated with any transmitter *Ta*–*Th* for the purpose of changing its association to any other trunk. This enables the operator to manually control the amount of traffic over the trunks. The transmitter controller TCF is, at the same time, conditioned so as to sequentially test this transmitter *Th* along with all of the transmitters *Tf* in the E system. When the transmitter *Th* of the multiple reperforator transmitter associated with the transmitter controller TCD is thus tested it transmits the message which has been addressed H, B, followed by a station designator. The message is therefore transmitted over the trunk T and received by the multiple reperforator transmitter associated with the transmitter controller TCE of the F system. By reason of the preliminary H character in the address of such message it is reperforated by the reperforator *Ph* in the multiple reperforator transmitter associated with the transmitter controller TCE of the F system. Thereafter when the transmitter controller TCH of the F system tests the corresponding transmitter *Th* the message is transmitted over trunk O and received by the multiple reperforator transmitter associated with the transmitter controller TCF of the H system, and reperforated by the associated reperforator *Pb*. As the corresponding transmitter *Tb* is subsequently called by the transmitter controller TCB in the H system, the message is transmitted over line B and received by the station to which it is addressed.

The present embodiment of a multiple office system is intended to be but merely one application of the invention described herein. Other applications will occur to those skilled in the art without departing from the scope of the invention.

What is claimed is:

1. In a telegraph system, a plurality of lines, a plurality of stations on each of said lines, a central office, transmitter controllers in said central office associated respectively with each of said lines, means in each of said transmitter controllers for sequentially enabling transmission of all messages addressed to stations on its associated line, and means in each of said transmitter controllers for sequentially testing each station on its associated line for messages awaiting transmission therefrom.

2. In a telegraph system, a central office, a plurality of stations on a line connecting with said central office, a receiving mechanism at each of said stations, a transmitting mechanism at each of said stations, a transmitter controller in said central office associated with said line means in said transmitter controller for sequentially transmitting a signal to successive receiving mechanisms of said plurality of stations to condition said transmitting mechanisms thereat for transmitting an awaiting message, means in each transmitting mechanism operative upon conditionment thereof by said transmitter controller to cause transmission of an awaiting message, means in each transmitter controller for sequentially testing each station on its associated line for messages awaiting transmission therefrom, and means in each transmitting mechanism operative upon conditionment thereof by said transmitter controller when no message is awaiting transmission to cause a signal indicative of such fact to be transmitted to said central office.

3. In a telegraph system, a central office, a line from said central office having a plurality of stations thereon, a transmitter controller in said central office associated with said line, a transmitter start sequence switch in said transmitter controller for transmitting start signals to successive stations on said line for initiating transmission of messages awaiting transmission at said stations, means at each of said stations responsive to a start signal for transmitting a special signal to said central office to reactivate said transmitter controller in case of absence of a message awaiting transmission, means in said central office responsive to said special signal for causing said sequence switch to transmit the next successive start signal, a permutation code controlled timer switch in said transmitter controller rendered operable upon the transmission of each start signal by said sequence switch, said timer switch being rendered inoperable upon the receipt at said central office of either a message or said special signal from a station, and an alarm associated with said timer switch and rendered operable thereby a predetermined time interval after transmission of a start signal upon failure of said central office to receive either said message or special signal.

4. In a telegraph system, a central office, a line extending from said central office having a plurality of outlying stations thereon, an address sequence switch at said central office for transmitting test signals to successive ones of said outlying stations for enabling said stations to transmit messages thereat awaiting transmission, means at each station for transmitting a special signal in the absence of an awaiting message, a round counter sequence switch for effecting disablement of said address sequence switch upon the transmission thereby of test signals to all of said outlying stations and the transmission of said special signal by all of said outlying stations, and a timing sequence switch for again initiating operation of said address sequence switch a predetermined time interval after the disablement thereof.

5. In an automatic telegraph switching system, a central office, a plurality of lines extending from said central office, a plurality of stations on each of said lines, a plurality of transmitter controllers at said central office, each of said lines having an associated transmitter controller for controlling transmission of all messages to and from stations on such line, means in said transmitter controllers for causing messages from stations on associated lines to be transmitted successively, means at said central office for sorting and storing said messages incoming from said outlying stations in accordance with an address designation at the beginning of each message, and means in each transmitter controller for causing transmission of stored messages to an associated line from successive ones of said storing means.

6. In an automatic telegraph switching system, a central office, a plurality of lines extending from said central office, a plurality of stations on each of said lines, a plurality of transmitter controllers in said central office, one of said transmitter controllers being associated with each of said lines for initiating transmission of all messages to and from stations on such associated line, a plurality of message storing means in said central office, each of said lines having an associated message storing means, a plurality of message storing positions in each of said message storing means, and means in each of said storing means for directing each incoming message to the proper storing position in accordance with an address signal at the beginning thereof.

7. In an automatic telegraph switching system, a central office, a plurality of lines extending from said central office, a plurality of stations on each of said lines, a plurality of transmitter controllers in said central office, one of said transmitter controllers being associated with each of said lines for initiating transmission of all messages to and from stations on such associated line, a plurality of message storing means in said central office, each of said lines having an associated message storing means, a plurality of message storing positions in each of said message storing means, means in each of said storing means for directing each incoming message to the proper storing position in accordance with an address signal at the beginning thereof, and a transmitter in each storing position controlled sequentially by the transmitter controller associated with the line to which the transmitter is adapted to transmit.

8. In combination with a plurality of telegraph stations having transmitters thereat, a line, and a transmitter controller connected to said stations over said line including, a multiple transmitter sequence switch for sequentially enabling transmission of all messages addressed to stations on said line, a transmitter start sequence switch for initiating a switching sequence in response to an end-of-message signal in a message being transmitted by one of said stations, and an address sequence switch effective in conjunction with said transmitter start sequence switch for transmitting successive address signals during successive switching sequences for sequentially testing each station on said line to initiate transmission of messages awaiting transmission from successive stations.

9. In combination with a plurality of telegraph stations having transmitters thereat, a line, and a transmitter controller connected to said stations over said line including, a sequence switch for initiating a switching sequence in response to an end-of-message signal in a message being transmitted by one of said stations, an address sequence switch for calling successive stations during said switching sequence to enable transmission of messages therefrom, a transmitter sequence switch for controlling transmission of all messages to said stations, said transmitter sequence switch initiating a switching operation upon completion of transmission of a message to a station to enable transmission of another message to one of said stations, and means for causing said first mentioned sequence switch to wait until the completion of a switching operation before initiating a switching sequence in response to an end-of-message signal in a message being transmitted by one of said stations.

10. In an automatic telegraph switching system, a central office, a line extending from said central office having a plurality of outlying stations thereon, a plurality of transmitters at said central office for transmitting messages to said outlying stations, a transmitter at each of said outlying stations for transmitting messages therefrom, means for automatically initiating switching operations among said transmitters at said central office for enabling successive ones of said central office transmitters to transmit awaiting messages, and a sequence switch responsive to an end-of-message signal in a message transmitted from an outlying station transmitter for interrupting transmission by a central office transmitter and initiating a switching sequence to enable a different outlying station transmitter to transmit a message.

11. In an automatic telegraph switching system, a central office, a line extending from said central office having a plurality of outlying stations thereon, a plurality of transmitters at said central office for transmitting messages to said outlying stations, a transmitter at each of said outlying stations for transmitting messages therefrom, means for automatically initiating switching operations among said transmitters at said central office for enabling successive ones of said central office transmitters to transmit awaiting messages, a sequence switch responsive to an end-of-message signal in a message transmitted from an outlying station transmitter for interrupting transmission by a central office transmitter and initiating a switching sequence to enable a different outlying station transmitter to transmit a message, means for remembering the condition of said line upon interruption of transmission by said sequence switch and means for returning said line to the condition determined by said remembering means upon completion of a switching sequence.

12. In an automatic telegraph switching system, a central office, a line extending from said central office having a plurality of outlying stations thereon, a plurality of transmitters at said central office for transmitting messages to said outlying stations, a transmitter at each of said outlying stations for transmitting messages therefrom, means for automatically initiating switching operations among said transmitters at said central office for enabling successive ones of said central office transmitters to transmit awaiting messages, a sequence switch responsive to an end-of-message signal in a message transmitted from an outlying station transmitter for interrupting transmission by a central office transmitter and initiating a switching sequence to enable a different outlying station transmitter to transmit a message, means for remembering whether said line is in shift or unshift condition upon interruption of transmission by said sequence switch, and means for transmitting a signal to return said line to the condition determined by said remembering means upon completion of a switching sequence.

13. In an automatic telegraph switching system, a central office, a line extending from said central office having a plurality of outlying stations thereon, a plurality of transmitters at said central office for transmitting messages to said outlying stations, a transmitter at each of said outlying stations for transmitting messages therefrom, means for automatically initiating switching operations among said transmitters at said central office for enabling successive ones of said central office transmitters to transmit awaiting messages, a sequence switch responsive to an end-of-message signal in a message transmitted from an outlying station transmitter for interrupting transmission by a central office transmitter and initiating a switching sequence to enable a different outlying station transmitter to transmit a message, means including a relay for remembering whether said line is in shift or unshift condition upon interruption of transmission by said sequence switch, means for retaining said relay energized if said line is in unshift condition, and means on said sequence switch cooperating with said relay to transmit a shift or unshift signal upon completion of a switching sequence to return said line to shift or unshift condition as determined by said remembering means.

14. In an automatic telegraph switching system, a central office, a line extending from said central office having a plurality of stations thereon, a plurality of transmitters at said central office for transmitting messages to said outlying stations, a transmitter at each of said outlying stations for transmitting messages therefrom, means for automatically initiating switching operations among said central office transmitters for enabling successive ones thereof to transmit awaiting messages, a sequence switch responsive to an end-of-message signal in a message transmitted from an outlying station transmitter for initiating a switching sequence to enable a different outlying station transmitter to transmit a message, said sequence switch normally interrupting transmission by a central office transmitter during a switching sequence, means normally effective to disable said sequence switch and delay a switching sequence during a switching operation, and means rendered operable successively with said central office transmitters for enabling said sequence switch and causing a switching sequence during a switching operation.

15. In an automatic telegraph switching system, a central office, a line extending from said central office having a plurality of outlying stations thereon, a plurality of transmitters at said central office for transmitting messages to said outlying stations, a transmitter at each of said outlying stations for transmitting messages therefrom, a sequence switch responsive to an end-of-message signal in a message transmitted from an outlying station transmitter for initiating a switching sequence to enable a different outlying station transmitter to transmit a message, means for initiating switching operations by automatically conditioning actuating circuits to successive ones of said central office transmitters to enable transmission of awaiting messages thereby, said sequence switch normally interrupting transmission by a central office transmitter during a switching sequence, means normally effective to disable said sequence switch and delay a switching sequence during a switching operation, and means rendered operable successively with said central office transmitters for enabling said sequence switch and causing a switching sequence during a switching operation.

16. In an automatic telegraph switching system, a central office, a line extending from said central office having a plurality of outlying stations thereon, a plurality of transmitters at said central office for transmitting messages to said outlying stations, a transmitter at each of said outlying stations for transmitting messages therefrom, a sequence switch responsive to an end-of-message signal in a message transmitted from an outlying station transmitter for initiating a switching sequence to enable a different outlying station transmitter to transmit a message, means for initiating switching operations by automatically conditioning actuating circuits to successive ones of said central office transmitters to enable transmission of awaiting messages thereby, said sequence switch normally interrupting transmission by a central office transmitter during a switching sequence, means normally effective to disable said sequence switch and delay a switching sequence during a switching operation, means rendered operable successively with said central office transmitters for enabling said sequence switch and causing a switching sequence during a switching operation, said line being in transmitting condition during transmission of a message by any of said central office transmitters and in switching condition during a switching operation, said sequence switch functioning to place said line in switching condition and return said line to transmitting condition during a switching sequence, and means operable upon completion of said switching sequence during a switching operation for returning said line to switching condition.

17. In an automatic telegraph switching system, a central office, a line extending from said central office having a plurality of outlying stations thereon, a plurality of transmitters at said central office for transmitting messages to said outlying stations, a transmitter at each of said outlying stations for transmitting messages therefrom, a sequence switch responsive to an end-of-message signal in a message transmitted from an outlying station transmitter for initiating a switching sequence to enable a different outlying station transmitter to transmit a message, means for initiating switching operations by automatically conditioning actuating circuits to successive ones of said central office transmitters to enable transmission of awaiting messages thereby, said sequence switch normally interrupting transmission by a central office transmitter during a switching sequence, means normally effective to disable said sequence switch and delay a switching sequence during a switching operation, means rendered operable successively with said central office transmitters for enabling said sequence switch and causing a switching sequence during a switching operation, said line being in transmitting condition during transmission of a message by any of said central office transmitters and in switching condition during a switching operation, said sequence switch functioning to place said line in switching condition and return said line to transmitting condition during a switching sequence, and a second sequence switch for transmitting a special signal upon completion of said switching sequence during a switching operation for returning said line to switching condition.

18. In an automatic telegraph switching system, a central office, a line extending from said central office having a plurality of stations thereon, said line having a message delivery side and a message pickup side, a receiver at each station for receiving messages directed thereto over the delivery side of said line, a transmitter at each station for transmitting messages over the pickup side of said line, a plurality of transmitters at said central office for transmitting messages over the delivery side of said line, a sequence switch responsive to an end-of-message signal in a message on the pickup side of said line for initiating a switching sequence, means operable during said switching sequence to transmit call signals over the delivery side of said line to enable successive station transmitters to transmit awaiting messages over the pickup side of said line, means for initiating switching operations by automatically conditioning actuating circuits to successive ones of said central office transmitters to enable transmission of awaiting messages over the delivery side of said line, said sequence switch normally interrupting a message being transmitted on the delivery side of said line during a switching sequence, means normally effective to disable said sequence switch and delay a switching sequence during a switching operation, and means rendered operable successively with said central office transmitters for enabling said sequence switch and causing a switching sequence during a switching operation.

19. In a telegraph system, a line having message receiving stations thereon, a transmitter for transmitting messages over said line to one of said stations, said messages containing a special signal, means for disabling said transmitter upon the transmission thereby of said special signal, transmitting means operable upon the disablement of said transmitter for transmitting a message identifying character, and other means operable upon the transmission of said identifying character for causing said transmitter to resume operation.

20. In a telegraph system, a central office, a line extending from said central office and having a plurality of stations thereon, a plurality of transmitters at said central office for transmitting messages over said line, said messages having an address signal, an end-of-address signal, and a text portion, a sequence switch for selecting successive ones of said transmitters to transmit awaiting messages over said line, means at said central office for disabling a selected transmitter upon the transmission thereby of an end-of-address signal, transmitting means operable upon the disablement of said selected transmitter for transmitting a message identifying character, and other means operable upon the transmission of said identifying character for causing said selected transmitter to resume operation.

21. In a telegraph system, a central office, a line extending from said central office and having a plurality of stations thereon, a plurality of transmitters at said central office for transmitting messages over said line, said messages containing a special signal prior to a text portion, a sequence switch for selecting successive ones of said transmitters to transmit awaiting messages over said line, means at said central office for disabling a selected transmitter upon the transmission thereby of said special signal a master clock, transmitting means comprising a series of significant time component sequence switches controlled by said master clock and operable serially upon the disablement of said selected transmitter for transmitting a time signal, and other means operable upon the completion of transmission of said time signal for causing said selected transmitter to resume operation.

22. In combination, a plurality of transmitters, a telegraph line, means for selecting a transmitter from said plurality of transmitters for transmitting a message, a telegraph message delivery time inserter including means operable in response to an end-of-address signal in a telegraph message for disabling a transmitter selected to transmit the message and for seizing control of said line over which the message is being transmitted, a master clock, a plurality of sequence switches positionable in accordance with instant time on said master clock, another sequence switch cooperating with said plurality of sequence switches while said transmitter is disabled to cause time signals to be transmitted over said line, and means on said other sequence switch operable upon completion of transmission of said time signals for releasing control of said line and causing said disabled transmitter to resume operation.

23. In combination, a plurality of transmitters, a telegraph line, means for selecting a transmitter from said plurality of transmitters for transmitting a message, a telegraph message delivery time inserter including means operable in response to an end-of-address signal in a telegraph message for disabling a transmitter selected to transmit the message and for seizing control of said line over which the message is being transmitted, a master clock, a plurality of sequence switches positionable in accordance with instant time on said master clock, another sequence switch cooperating with said plurality of sequence switches while said transmitter is disabled to cause time signals to be transmitted over said line, means for preventing a change in position of said plurality of sequence switches during a period of time signal transmission, and means on said other sequence switch operable upon completion of transmission of said time signals for releasing control of said line and causing said disabled transmitter to resume operation.

24. In a transmitter controller, a plurality of transmitters, a first sequence switch for controlling transmission of messages from said plurality of transmitters, said messages each containing an address signal, an end-of-address signal, and text signals, said first sequence switch being effective to select for operation successive ones of said plurality of transmitters, a master clock, a plurality of sequence switches positionable in accordance with the time on said master clock, means operable in response to an end-of-address signal in a message being transmitted by a selected transmitter for disabling said selected transmitter and for seizing control of a line over which said message is being transmitted, another sequence switch cooperating with said plurality of sequence switches for transmitting time signals while said selected transmitter is disabled, and means on said last mentioned sequence switch operable upon completion of transmission of said time signals for releasing control of said line and causing said disabled selected transmitter to resume operation.

25. In a telegraph message delivery time inserter, message transmitting means, an hour sequence switch, a 10-minute sequence switch, a minute sequence switch, a master clock for controlling said hour, 10-minute, and minute sequence switches in accordance with instant time, means responsive to an end-of-address signal in a telegraph message for interrupting transmission of the message, another sequence switch rendered effective by said end-of-address signal responsive means for cooperating with said hour, 10-minute, and minute sequence switches to transmit time signals, and means on said last mentioned sequence switch operable upon completion of transmission of said time signals for causing resumption of transmission of the interrupted message by said message transmitting means.

26. In an automatic telegraph switching system, a central office, a plurality of stations, a line extending from said central office and having said plurality of stations thereon, a plurality of transmitters at said central office for transmitting messages over said line to said outlying stations, each of said messages having an address portion and a text portion separated by a special signal, means for selecting successive ones of said transmitters to transmit awaiting messages, a plurality of sequence switches, a master clock for controlling said plurality of sequence switches in accordance with instant time, means responsive to said special signal in a message transmitted by a selected transmitter for interrupting transmission by said selected transmitter, other means rendered operable by said special signal responsive means cooperating with said plurality of sequence switches to transmit time signals, and means on said other means operable upon completion of transmission of said time signals for causing resumption of transmission of the interrupted message by said selected transmitter.

27. In an automatic telegraph switching system, a central office, a line, a plurality of telegraph transmitting means on said line for transmitting messages containing address signals, message reperforating means at said central office including a plurality of reperforators for receiving said messages, selective control means in said message reperforating means for selecting one of said reperforators to receive each message in accordance with said address signals therein, an extra reperforator, and means for rendering said extra perforator invariably effective to receive a message upon failure of said selective control means to select one of said first mentioned reperforators.

28. In an automatic telegraph switching system, a plurality of telegraph lines, a plurality of stations on each of said lines, transmitting means at each of said stations, receiving means at each of said stations, a central office having all of said lines extending therefrom, means in said central office for controlling all transmission from all of said station transmitting means and to all of said station receiving means, said controlling means including a transmitter controller individually associated with each of said lines, means in each of said transmitter controllers for enabling transmission from said transmitting means at successive ones of said stations on its associated line, a plurality of transmitters in said central office associated with each of said transmitter controllers for transmitting messages to said receiving means at stations on the line associated with such transmitter controller, and means in each of said transmitter controllers for enabling transmission of messages from successive associated central office transmitters.

29. In an automatic telegraph switching system, a plurality of telegraph lines, a plurality of stations on each of said lines, transmitting means at each of said stations, receiving means at each of said stations, a central office having all of said lines extending therefrom, means in said central office for controlling all transmission from all of said station transmitting means and to all of said station receiving means, said controlling means including a transmitter controller individually associated with each of said lines, means in each of said transmitter controllers for enabling transmission from said transmitting means at successive ones of said stations on its associated line, a plurality of transmitters in said central office associated with each of said transmitter controllers for transmitting messages to said receiving means at stations on the line associated with such transmitter controller, means in each of said transmitter controllers for enabling transmission of messages from successive associated central office transmitters, means in each of said transmitter controllers for interrupting transmission of each message transmitted by said central office transmitters, means operable upon said interruption of transmission for inserting message delivery time signals, and means effective upon completion of insertion of said message delivery time signals for causing resumption of transmission of said interrupted message.

30. In an automatic telegraph message switching system, a central office, a plurality of lines extending therefrom, a plurality of stations on each of said lines, a transmitter controller in said central office for each of said lines for controlling all transmission to or from such line, a first type of multiple reperforator transmitter associated with each of said transmitter controllers for reperforating messages transmitted from the line associated therewith and sorting said messages according to lines and priority classification, a transmitter controller in said central office for each of said priority classifications, and a second type of multiple reperforator transmitter in said central office associated with each of said last mentioned transmitter controllers for reperforating all priority messages and sorting them according to lines, said first mentioned transmitter controllers being effective to control transmission of all messages including said priority messages addressed to the line with which each is associated.

31. In a system for controlling transmission of telegraph messages to a line in the system, a plurality of normal transmitters for transmitting messages bearing a normal classification, a plurality of priority transmitters for transmitting messages bearing different priority classifications at least one of which is higher than said normal classification, a sequence switch for initiating transmission by all of said transmitters, means on said sequence switch for sequentially enabling said normal transmitters to transmit alternately with said transmitter which transmits messages of a priority higher than normal, and other means on said sequence switch for enabling the remainder of said transmitters to transmit messages bearing a priority classification lower than normal whenever no message is awaiting transmission by said normal or higher priority transmitters.

32. In a telegraph switching system for handling messages of a plurality of classes of priority, combined recording and transmitting means for storing messages according to priority classification and thereafter transmitting the stored messages, and control means for initiating operation of said transmitting means, said control means insuring transmission of messages of a higher priority before messages of the next lower priority.

33. In an automatic telegraph message switching system, a central office, a plurality of lines extending from said central office, a plurality of stations on each of said lines, combined recording and transmitting means for each of said lines located in said central office, means in said combined reperforating and transmitting means for sorting normal messages in accordance with addresses contained therein and for sorting priority messages in accordance with priority classifications contained therein, an additional combined reperforating and transmitting means for each priority classification for sorting all messages of such classification in accordance with addresses contained therein, and a control means in said central office associated with each of said lines for controlling transmission of all messages to its corresponding line, said control means being effective to initiate transmission of all messages to its corresponding line in accordance with the priority classification thereof.

34. In an apparatus for controlling the operation of a plurality of telegraph transmitters, a first group of which are designed to transmit messages of normal priority, and a second group of which are designed to transmit messages of priorities different from normal, a sequence switch for sequentially testing all of the transmitters for messages awaiting transmission, means on said sequence switch for enabling the testing of a transmitter for transmitting messages of priority higher than normal alternately with the testing of all normal transmitters, means associated with said sequence switch for preventing the testing of a transmitter for transmitting messages of lower priority than normal except when none of the normal and higher priority transmitters have messages awaiting transmission during a preceding cycle of testing operations.

35. In combination with an apparatus for controlling the oeration of a plurality of telegraph transmitters, a plurality of normal transmitters for transmitting messages of normal priority, a priority transmiter for transmitting messages of higher priority than normal, a plurality of low priority transmitters for transmitting messages of lower priority classifications than normal, a sequence switch for sequentially testing all of said transmitters for messages awaiting transmission, means on said sequence switch for enabling the alternate testing of said priority transmitter and all of said normal transmitters, and relay means for enabling the testing of said low priority transmitters sequentially in decreasing order of priority upon failure of any transmitter of higher priority to respond with a message.

36. In combination with an apparatus for controlling the operation of a plurality of telegraph transmitters, a plurality of normal transmitters for transmitting messages of normal priority, a priority transmitter for transmitting messages of priority higher than normal, a plurality of low priority transmitters for transmitting messages of priority lower than normal, a sequence switch for sequentially testing all of said transmitters for messages awaiting transmission, means on said sequence switch for enabling the alternate testing of said priority transmitter and all of said normal transmitters, relay means for enabling the testing of said low priority transmitters sequentially in decreasing order of priority upon failure of any transmitter of higher priority to respond with a message, and means for stopping further testing of any of said transmitters upon failure of all of said transmitters to transmit a message in response to the sequential testing thereof.

37. In a telegraph signal distributing apparatus, a plurality of selector magnets for receiving incoming signals, each of said selector magnets being adapted to receive a different impulse in said signals, a plurality of permutably positionable code bars, each of said code bars corresponding to one of said selector magnets, start-stop signal transmitting means, and means for transferring said incoming signals impulse by impulse to said transmitting means and to said code bars, whereby said start-stop signal transmitting means transmits start-stop signals corresponding to said incoming signals and said code bars are permutably positioned in accordance with said incoming signals.

38. In a telegraph signal distributing apparatus, a plurality of selector magnets for receiving incoming signals, each of said selector magnets being adapted to receive a different impulse in said signals, a plurality of permutably positionable code bars, each of said code bars corresponding to one of said selector magnets, start-stop signal transmitting means, means for transferring said incoming signals impulse by impulse to said transmitting means and to said code bars, and a start magnet effective upon energization for initiating operation of said transferring means, said start-stop signal transmitting means being effective to transmit start-stop signals corresponding to said incoming signals and said code bars being permutably positioned in accordance with said incoming signals upon initiation of operation of said transferring means.

39. In a telegraph signal distributing system, a plurality of signal transmitting devices, a sequencing device for controlling the operation of said transmitting devices, signal distributing means for receiving and retransmitting signals initially transmitted by said transmitting devices, and switching mechanism in said distributing means responsive to a predetermined signal sequence retransmitted by said distributing means for actuating said sequencing device, whereby transmission of signals by a different one of said transmitting devices is initiated.

40. In a telegraph signal distributing system, a plurality of signal transmitting devices, a sequencing device for controlling the operation of said transmitting devices, a stepping magnet effective upon successive energizations thereof to step said sequencing device successively to thereby enable sequential operation of said transmitting devices, signal distributing means for receiving and retransmitting signals initially transmitted by said transmitting devices, and switching mechanism in said distributing means responsive to a predetermined signal sequence retransmitted by said distributing means for energizing said stepping magnet, whereby transmission of signals by a different one of said transmitting devices is initiated.

41. In a telegraph signal distributing system, a plurality of signal transmitting devices for initially transmitting telegraph message signals on a multiple wire basis, a sequencing device for controlling the sequential operation of said transmitting devices, signal distributing means for receiving and converting said signals into start-stop signals and retransmitting said start-stop signals, and switching mechanism in said distributing means responsive to a predetermined signal sequence initially transmitted by one of said plurality of signal transmitting devices for actuating said sequencing device, whereby transmission of signals by a different one of said transmitting devices is initiated.

42. In a telegraph signal distributing system, a plurality of signal transmitting devices, a sequencing device for enabling sequential operation of said transmitting devices, signal distributing means for receiving and retransmitting signals initially transmitted by said transmitting devices, electromagnetic means effective upon energization for actuating said sequencing device to thereby deactivate one of said transmitting devices and activate another of said transmitting devices, a plurality of code bars in said distributing means permutably positionable in accordance with said signals initially transmitted by said transmitting devices, and means responsive to a predetermined permutation of said code bars for energizing said electromagnetic means.

43. In a telegraph signal distributing system, a plurality of signal transmitting devices, control means for rendering said transmitting devices operable singly and successively, means for retransmitting signals initially transmitted by said transmitting devices, electrical means effective upon establishment of a circuit therethrough for actuating said control means to thereby cause said control means to render a different one of said transmitting devices operable, and means in said retransmitting means responsive to said signals initially transmitted by said transmitting devices and effective in response to a predetermined signal from one of said transmitting devices to complete the circuit through said electrical means, whereby said control means is actuated.

44. In a telegraph signal distributing system, a plurality of signal transmitting devices, a stepping switch for rendering said transmitting devices operable singly and successively, a distributing device for receiving and retransmitting signals initially transmitted by said signal transmitting devices, means in said distributing device for sensing said signals, a stepping magnet effective upon energization for enabling said stepping switch to deactivate one of said transmitting devices and activate another, and a contact means under control of said sensing means and rendered effective in response to the sensing of a predetermined signal by said sensing means for energizing said stepping magnet, whereby one of said transmitting devices is deactivated and another is activated.

45. In a transmitter control circuit, a transmitter for transmitting messages contained in a preformed message control form, a conditioning circuit for said transmitter, manually operable means comprising a ready relay in said conditioning circuit for conditioning said transmitter for operation, permutation code controlled contact means responsive to a predetermined code signal for controlling actuation of said transmitter upon its being conditioned for operation prior to receipt of said predetermined code signal, and other means effective in the absence of a prior conditionment of said transmitter for operation for transmitting a different predetermined code signal, said different predetermined code signal indicating said transmitter contains no preformed message control form awaiting transmission.

46. In a telegraph transmitter control circuit, a transmitter for transmitting telegraph messages awaiting transmission, a conditioning circuit for said transmitter, a ready relay associated with said conditioning circuit, manually operable means for energizing said ready relay, said conditioning circuit being effective upon energization of said ready relay for conditioning said transmitter for operation, and permutation code controlled contact means responsive to a predetermined code signal for controlling actuation of said transmitter upon its having been previously conditioned for operation, whereby a telegraph message awaiting transmission by said transmitter is transmitted.

47. In a telegraph transmitter control circuit, a transmitter for transmitting telegraph messages awaiting transmission, a conditioning circuit for said transmitter, a ready relay associated with said conditioning circuit, manually operable means for energizing said ready relay, said conditioning circuit being effective upon energization of said ready relay for conditioning said transmitter for operation, transmitting means for transmitting a predetermined code signal indicating said transmitter has no message awaiting transmission, permutation code controlled contact means responsive to a different predetermined code signal for controlling actuation of said transmitter upon its having been previously conditioned for operation, whereby a telegraph message awaiting transmission by said transmitter is transmitted, a further permutation code controlled contact means effective in response to a further different predetermined code signal in the absence of a prior conditionment of said transmitter for operation for initiating actuation of said transmitting means.

WALTER J. ZENNER.

References Cited in the file of this patent

UNITED STATES PATENTS

| Number | Name | Date |
|---|---|---|
| 2,318,168 | Lang | May 4, 1943 |
| 2,357,297 | Wack et al. | Sept. 5, 1944 |
| 2,404,339 | Zenner | July 16, 1946 |
| 2,444,078 | Weaver | June 29, 1948 |
| 2,451,045 | Potts | Oct. 12, 1948 |
| 2,456,740 | Schuler | Dec. 21, 1948 |
| 2,486,360 | McBain | Oct. 25, 1949 |
| 2,484,838 | Light | Oct. 18, 1949 |
| 2,505,728 | Zenner | Apr. 25, 1950 |
| 2,522,453 | Keyes | Sept. 12, 1950 |
| 2,575,329 | Blanton et al. | Nov. 20, 1951 |
| 2,584,997 | Ferguson | Feb. 12, 1952 |